(12) United States Patent
Doushita et al.

(10) Patent No.: US 8,350,437 B2
(45) Date of Patent: Jan. 8, 2013

(54) DIRECT-CURRENT MOTOR WITH IMPROVED BRANCHED TOOTH ARRANGEMENT

(75) Inventors: Yoshiaki Doushita, Kosai (JP); Keita Kawai, Toyohashi (JP); Kazumitsu Moriya, Kosai (JP); Toshio Yamamoto, Kosai (JP); Masaya Horikawa, Hamamatsu (JP); Masaaki Shimizu, Toyohashi (JP)

(73) Assignee: Asmo Co., Ltd., Shizuoka-Ken (JP)

( * ) Notice: Subject to any disclaimer, the term of this patent is extended or adjusted under 35 U.S.C. 154(b) by 614 days.

(21) Appl. No.: 12/564,703

(22) Filed: Sep. 22, 2009

(65) Prior Publication Data

US 2011/0050025 A1 Mar. 3, 2011

(30) Foreign Application Priority Data

Sep. 2, 2009 (JP) ................................ 2009-203069

(51) Int. Cl.
*H02K 3/28* (2006.01)
*H02K 3/20* (2006.01)
*H02K 23/26* (2006.01)

(52) U.S. Cl. .......... 310/198; 310/216.094; 310/216.095; 310/219

(58) Field of Classification Search .................. 310/198, 310/184–185, 219
See application file for complete search history.

(56) References Cited

U.S. PATENT DOCUMENTS

| | | | | |
|---|---|---|---|---|
| 4,038,575 A | * | 7/1977 | Nordebo | 310/179 |
| 4,260,925 A | * | 4/1981 | Barrett | 310/216.095 |
| 4,591,766 A | * | 5/1986 | Takaba | 310/216.095 |
| 4,827,172 A | * | 5/1989 | Kobayashi | 310/208 |
| 4,935,653 A | * | 6/1990 | Cheng | 310/184 |
| 8,013,491 B2 | * | 9/2011 | Krauth et al. | 310/198 |
| 2006/0220489 A1 | * | 10/2006 | Osawa et al. | 310/179 |

FOREIGN PATENT DOCUMENTS

| | | |
|---|---|---|
| JP | 4340349 | 11/1992 |
| JP | 7095750 | 4/1995 |

(Continued)

OTHER PUBLICATIONS

Machine translation (abstract only) of JP2007116813A (published May 2007, translated May 2012).*

(Continued)

*Primary Examiner* — Tran Nguyen
*Assistant Examiner* — Michael Andrews
(74) *Attorney, Agent, or Firm* — Duane Morris LLP; J. Rodman Steele, Jr.; Gregory M. Lefkowitz

(57) ABSTRACT

A motor is provided that includes magnetic poles, an armature core, armature coils, a commutator, and power supply brushes. The armature core includes teeth arranged in the circumferential direction to extend in a radial pattern. The armature coils include inner layer coils and outer layer coils. Each of the inner layer coils is wound around radially proximal end portions of two circumferentially adjacent teeth or a radially proximal end portion of one of the teeth. The inner layer coils are arranged in the circumferential direction without overlapping each other in the radial direction. Each of the outer layer coils is wound around radially distal end portions of two circumferentially adjacent teeth by distributed winding. The outer layer coils are arranged radially outward of the inner layer coils and are arranged in the circumferential direction without overlapping each other in the radial direction. The circumferential center of the inner layer coils and the circumferential center of the outer layer coils are displaced in the circumferential direction.

17 Claims, 31 Drawing Sheets

FOREIGN PATENT DOCUMENTS

| | | | |
|---|---|---|---|
| JP | 2004088915 | | 3/2004 |
| JP | 2007 116813 | | 5/2007 |
| JP | 2007116813 A | * | 5/2007 |
| WO | WO 2008/019954 A1 | | 2/2008 |
| WO | WO 2008019954 A1 | * | 2/2008 |

OTHER PUBLICATIONS

Machine translation of WO2008019954A1 (published Feb. 2008, translated May 2012).*

* cited by examiner

Fig. 15
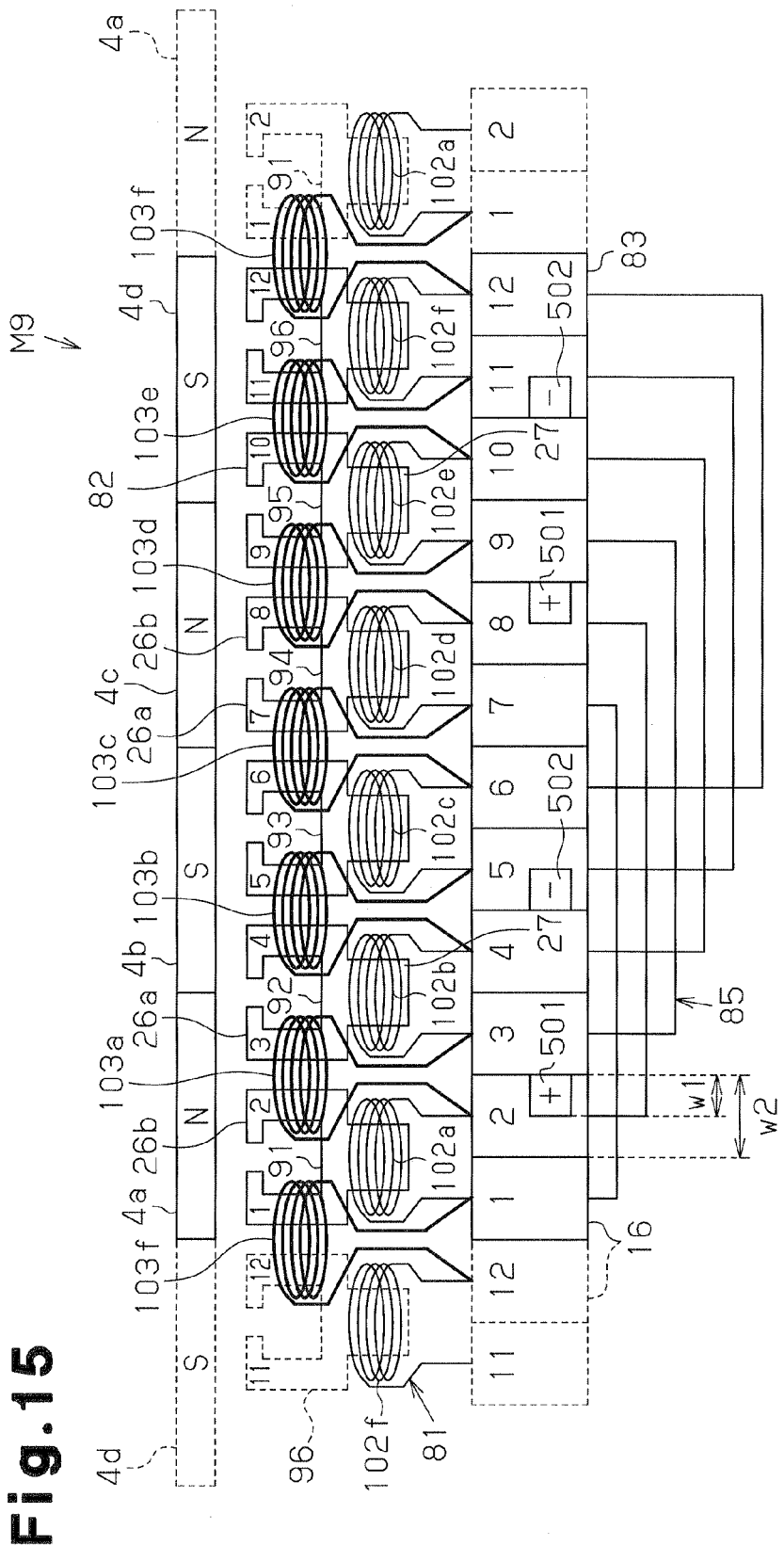
Current Waveform

| Representative Problems | Four Poles 10 Slots | Four Poles 12 Slots | Four Poles 14 Slots | Four Poles 16 Slots |
|---|---|---|---|---|
| Cogging | ○ 20 Crests | × 12 Crests | ○ 28 Crests | △ 16 Crests |
| Current Ripple | ○ 20 Crests | × 12 Crests | ○ 28 Crests | △ 16 Crests |
| Resonance Phenomenon | × Secondary Mode | ○ Fourth Mode | × Secondary Mode | ○ Fourth Mode |

DIRECT-CURRENT MOTOR WITH IMPROVED BRANCHED TOOTH ARRANGEMENT

CROSS-REFERENCE TO RELATED APPLICATIONS

This application claims priority to Japanese Patent Application No. 2009-203069, filed Sep. 2, 2009, the entire contents of which are incorporated herein by reference.

BACKGROUND OF THE INVENTION

The present invention relates to a direct-current motor and a method for manufacturing the direct-current motor.

Conventionally, direct-current motors have been proposed that include a stator, which has magnetic poles arranged along the circumferential direction, and an armature, which faces the stator in the radial direction. The armature includes an armature core, which has teeth (salient poles) extending in a radial pattern. Armature coils are wound around the armature core in such a manner that the armature coils pass through slots formed between the circumferentially adjacent teeth.

For example, Japanese Laid-Open Patent Publication No. 2007-116813 discloses a direct-current motor that includes an armature core around which armature coils are wound by distributed winding, in which the armature coils each extend over a number of teeth. Japanese Laid-Open Patent Publication No. 2004-88915 discloses a direct-current motor that includes an armature core around which armature coils are wound by concentrated winding, in which the armature coils are respectively wound around the teeth in a concentrated manner. In general, the direct-current motor including the armature coils wound by distributed winding is advantageous in reducing noise and vibration since excitation force generated by magnetism between the armature core and the magnetic poles is smaller as compared to the direct-current motor including the armature coils wound by concentrated winding. The direct-current motor including the armature coils wound by concentrated winding is advantageous in increasing the power output since the space factor of the armature coils is high.

However, in the direct-current motor including the armature core around which the armature coils are wound by distributed winding, coil end portions of the armature coils that project further axially outward than the axial end faces of the armature core overlap each other in the axial direction. Thus, the size of the direct-current motor is undesirably increased. When reducing the axial length of the coil end portions to prevent the size of the direct-current motor from increasing, the number of turns of the armature coils needs to be reduced, which reduces the power output of the direct-current motor.

In the direct-current motor including the armature core around which the armature coils are wound by concentrated winding, fluctuation of magnetic flux is rapid since the difference between the number of the magnetic poles and the number of the teeth (salient poles) is small. Thus, excitation force acts on the armature core during activation of the direct-current motor, thereby generating great vibration on the direct-current motor.

SUMMARY OF THE INVENTION

Accordingly, it is an objective of the present invention to provide a direct-current motor that is prevented from being enlarged by armature coils without reducing the power output, and that is prevented from vibrating.

To achieve the above objective and in accordance with one aspect of the present invention, a direct-current motor is disclosed. The motor includes magnetic poles, an armature core, armature coils, a commutator, and power supply brushes. The magnetic poles are arranged in a circumferential direction. The armature core includes teeth arranged in the circumferential direction to extend in a radial pattern. Distal ends of the teeth face the magnetic poles in a radial direction. The armature coils are wound around the teeth. The commutator is rotatable integrally with the armature core. The commutator includes segments arranged in the circumferential direction. The power supply brushes are pressed against the segments. The armature coils include inner layer coils and outer layer coils. Each of the inner layer coils is wound around radially proximal end portions of two circumferentially adjacent teeth or a radially proximal end portion of one of the teeth. The inner layer coils are arranged in the circumferential direction without overlapping each other in the radial direction. Each of the outer layer coils is wound around radially distal end portions of two circumferentially adjacent teeth by distributed winding. The outer layer coils are arranged radially outward of the inner layer coils and are arranged in the circumferential direction without overlapping each other in the radial direction. The circumferential center of the inner layer coils and the circumferential center of the outer layer coils are displaced in the circumferential direction.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 15 is a diagrammatic developed view illustrating a direct-current motor according to a fifth embodiment of the present invention;

DESCRIPTION OF THE PREFERRED EMBODIMENTS

A first embodiment of the present invention will now be described with reference to drawings.

Figure 1:
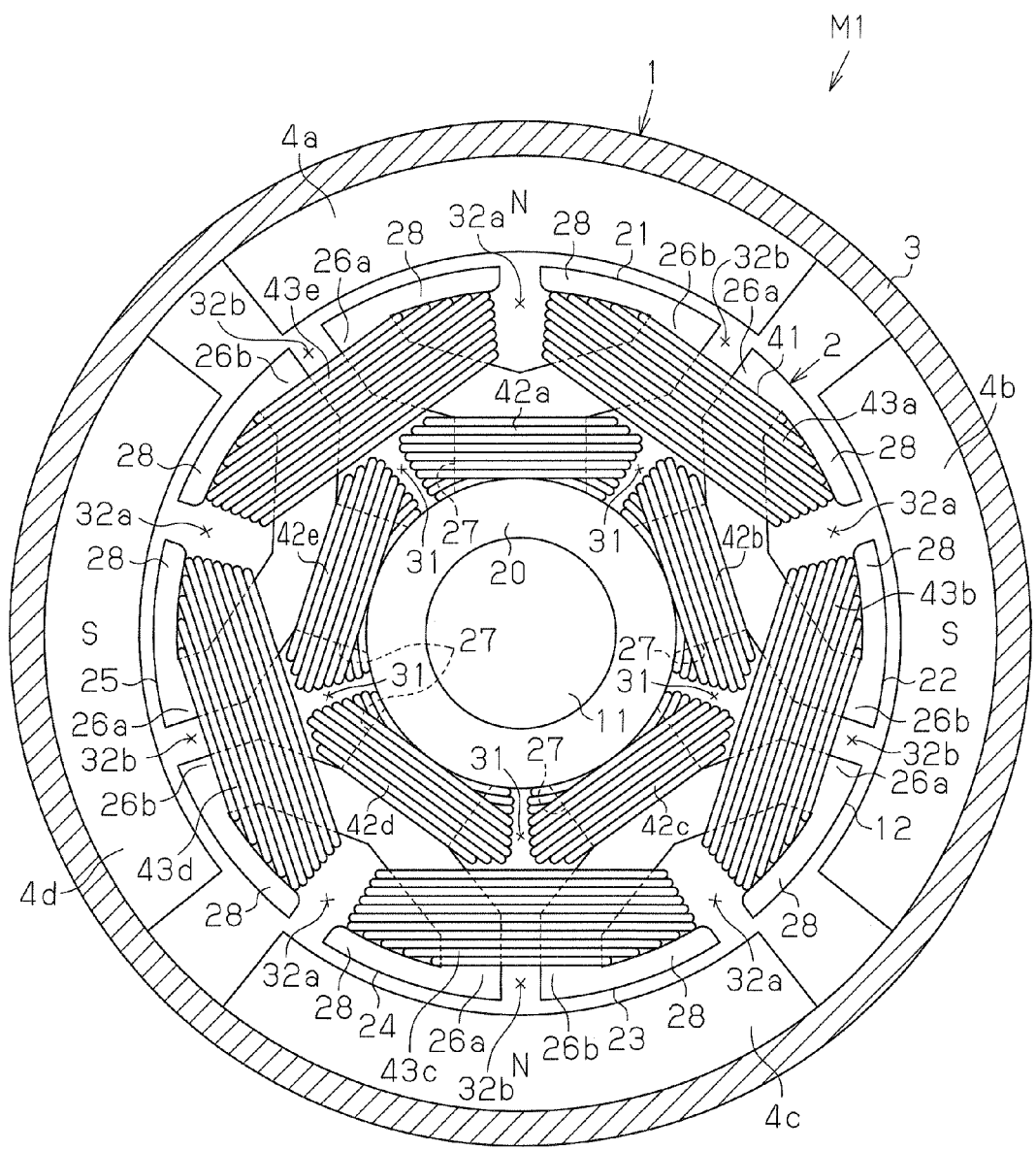
FIG. 1 is a cross-sectional view illustrating a direct-current motor according to a first embodiment of the present invention.

FIG. 1 shows a cross-sectional view of a direct-current motor M1 according to the first embodiment. The direct-current motor M1 includes a stator 1 and an armature 2 as shown in FIG. 1. The stator 1 includes a substantially cylindrical yoke housing 3. Four magnets 4a to 4d serving as magnetic poles are attached to the inner circumferential surface of the yoke housing 3. The magnets 4a to 4d are arranged at equal angular intervals (in the present embodiment, intervals of 90°) in the circumferential direction. The magnets 4a to 4d are arranged such that the north poles and the south poles are alternately arranged in the circumferential direction. The number of the magnetic poles P of the direct-current motor M1 is four.

Figure 2:
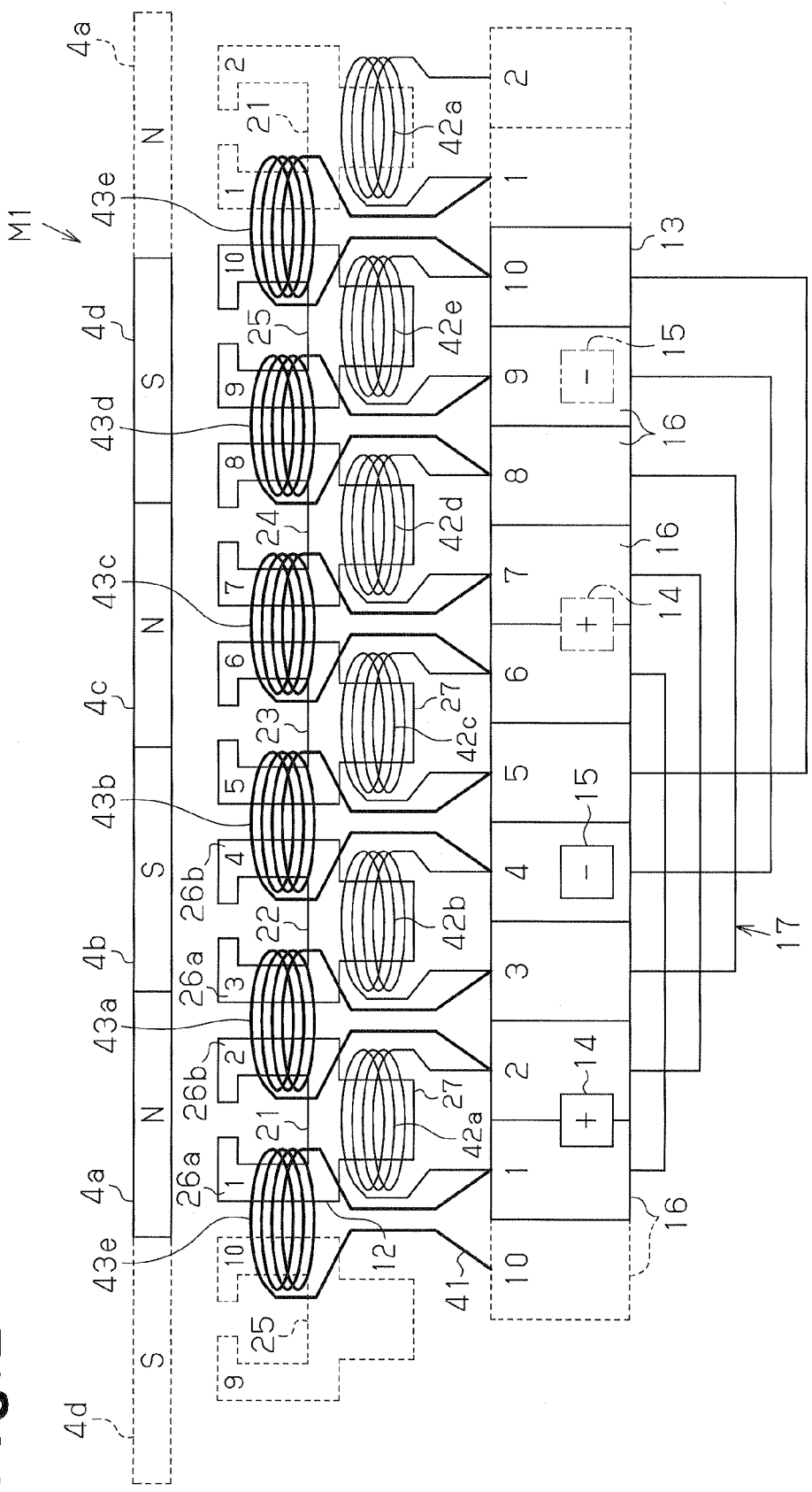
FIG. 2 is a diagrammatic developed view illustrating the direct-current motor of FIG. 1.

As shown in FIGS. 1 and 2, the armature 2 is arranged radially inward of the stator 1. The armature 2 includes a rotary shaft 11, a substantially columnar armature core 12, which is secured to the rotary shaft 11, and a substantially cylindrical commutator 13, which is secured to the rotary shaft 11. The rotary shaft 11 of the armature 2 is supported to be rotatable with respect to the stator 1. The armature core 12 and the commutator 13 rotate integrally with the rotary shaft 11. The armature core 12 faces the magnets 4a to 4d in the radial direction. A positive brush 14 and a negative brush 15 are arranged on the outer circumference of the commutator 13. The positive brush 14 and the negative brush 15 are slidably pressed against the outer circumferential surface of the commutator 13. The positive brush 14 and the negative brush 15 are arranged at an interval of 90° that is equal to the intervals between the circumferentially adjacent magnets 4a to 4d. Furthermore, the positive brush 14 is arranged at a position corresponding to the circumferential center of the north pole magnet 4a, and the negative brush 15 is arranged at a position corresponding to the circumferential center of the south pole magnet 4b. Thus, current is supplied to the armature 2 via the positive brush 14 and the negative brush 15.

The commutator 13 includes a cylindrical retaining member (not shown) formed of insulating resin material and ten segments 16 arranged along the outer circumferential surface of the retaining member as shown in FIG. 2. FIG. 2 is a diagrammatic developed view of the direct-current motor M1. The segments 16 are arranged on the outer circumferential surface of the retaining member to form a substantially cylindrical shape. The positive brush 14 and the negative brush 15 contact the segments 16 from the radially outer side of the retaining member in a pressing manner. In the present embodiment, the ten segments 16 arranged in the circumferential direction in FIG. 2 are given segment numbers 1 to 10.

In the commutator 13, the segments 16 that are arranged at an angular interval equal to the angular interval by which the magnets of the same poles are arranged are short-circuited (electrically connected) by a short-circuiting member 17 secured to an axial end of each segment 16. More specifically, in the stator 1, two north pole magnets 4a, 4c (or two south pole magnets 4b, 4d) are arranged at an interval of 180°. Thus, two segments 16 that are arranged at the interval of 180° (for example, the segment 16 of the segment number 1 and the segment 16 of the segment number 6) are short-circuited with each other by the short-circuiting member 17, and have the same electric potential. FIG. 2 illustrates imaginary brushes 14, 15 in chain double-dashed lines to schematically show that the state that is the same as the state in which the positive brush 14 and the negative brush 15 are arranged is obtained by short-circuiting the predetermined segments 16 by the short-circuiting members 17. The short-circuiting members 17 are formed by, for example, conducting wire. Alternatively, the short-circuiting members 17 may be formed by punching conductive plate material such as a copper plate into a predetermined shape.

As shown in FIG. 1, the armature core 12 includes a cylindrical core back 20 and five teeth 21 to 25, which extend radially outward from the outer circumferential surface of the core back 20 in a radial pattern. The core back 20 and the teeth 21 to 25 are integrally formed. The inner circumferential surface of the core back 20 is attached to the outer circumferential surface of the rotary shaft 11 so that the core back 20 is secured to the rotary shaft 11. As shown in FIG. 2, the number S of the segments 16 of the commutator 13 is set based on the number N of the teeth 21 to 25 of the armature core 12, and is set to satisfy S=2N in the present embodiment. Thus, the number S of the segments 16 provided on the commutator 13 of the present embodiment is set to ten.

As shown in FIG. 1, the five teeth 21 to 25 are formed integrally with the core back 20 at equal angular intervals (in the present embodiment, 72°) in the circumferential direction. The distal end portions of the teeth 21 to 25 are each bifurcated into a first branched tooth portion 26a and a second branched tooth portion 26b. The shape of the teeth 21 to 25 as seen from the axial direction is substantially Y-shaped. The proximal end portions of the teeth 21 to 25 that are radially inward of the branched tooth portions 26a, 26b are referred to as inner winding portions 27. That is, the pair of branched tooth portions 26a, 26b of each of the teeth 21 to 25 extend radially outward from the distal end portion of the associated inner winding portion 27.

Figure 3A:
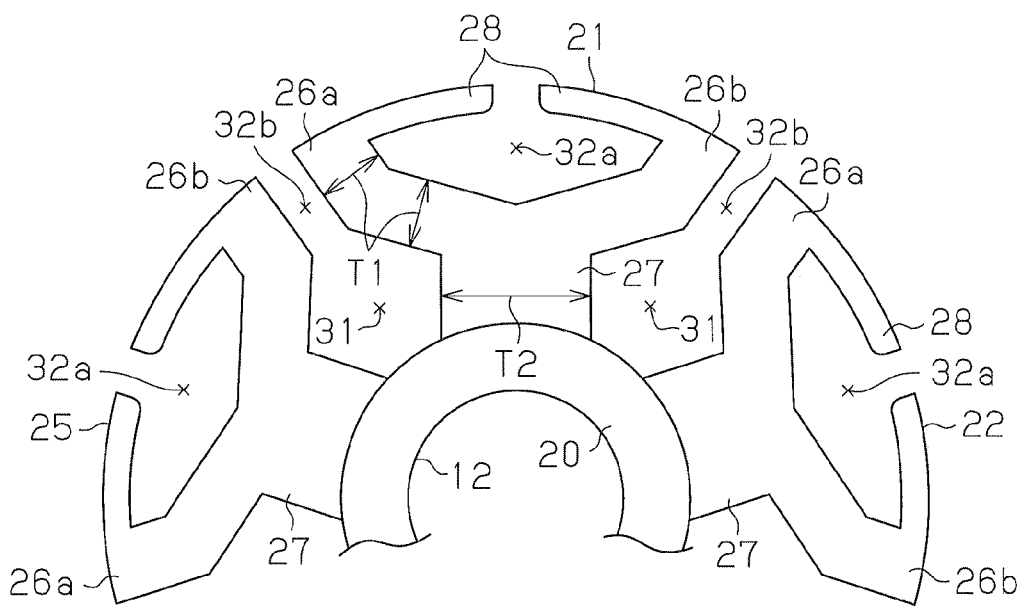
FIG. 3A is a plan view illustrating the armature core of the direct-current motor of FIG. 1.
Figure 3B:
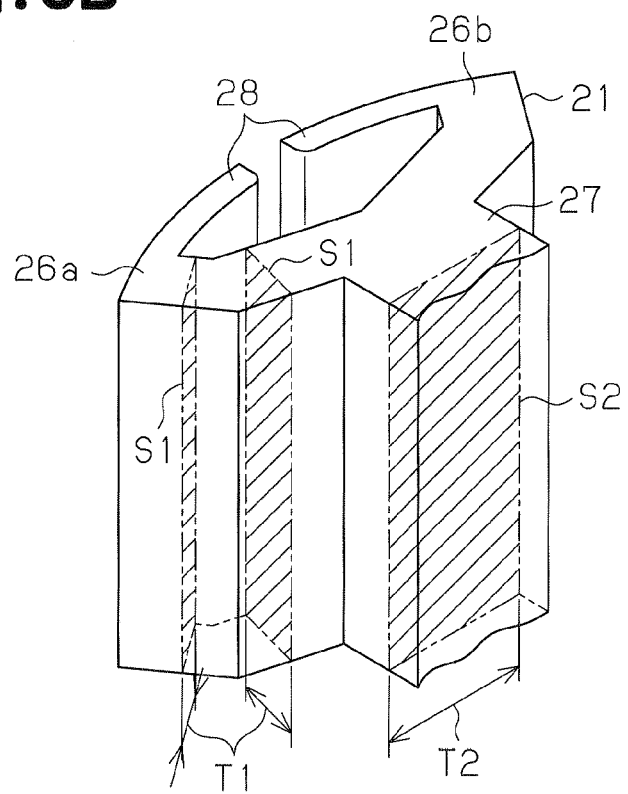
FIG. 3B is a perspective view illustrating a tooth formed on the armature core of FIG. 3A.

The pair of branched tooth portions 26a, 26b provided on each of the teeth 21 to 25 are formed to separate from each other in the circumferential direction toward the distal end. The distance between the first branched tooth portion 26a of one of two circumferentially adjacent pair of the teeth 21 to 25 and the second branched tooth portion 26b of the other tooth adjacent to the above-mentioned branched tooth portion 26a is smaller than the distance between the first branched tooth portion 26a and the second branched tooth portion 26b of each of the teeth 21 to 25. Furthermore, as shown in FIG. 3A, the branched tooth portions 26a, 26b are bent such that parts of the branched tooth portions 26a, 26b close to the proximal end are inclined with respect to the associated inner winding portion 27 by a greater amount than the parts of the branched tooth portions 26a, 26b close to the distal end. The width T1 of the branched tooth portions 26a, 26b is constant from the proximal end to the distal end. Also, the width T2 of the inner winding portions 27 is set to be greater than a value twice the width T1 of the branched tooth portions 26a, 26b. Thus, as shown in FIG. 3B, a magnetic path cross-sectional area S2 of the inner winding portions 27, that is, the area of the cross-section perpendicular to the magnetic flux that flows through the inner winding portions 27 is greater than twice a magnetic path cross-sectional area S1 of the branched tooth portions 26a, 26b, that is, the area of the cross-section perpendicular to the magnetic flux that flows through the branched tooth portions 26a, 26b.

Furthermore, a plate-like extended portion 28, which extends along the circumferential direction, is integrally formed at the distal end portion of each of the branched tooth portions 26a, 26b of the teeth 21 to 25 as shown in FIGS. 1 and 3A. The two extended portions 28 of each of the teeth 21 to 25 extend to approach each other from the distal end portions of the branched tooth portions 26a, 26b. The total of ten extended portions 28 provided in the armature core 12 are arranged at equal angular intervals in the circumferential direction, and form a substantially cylindrical shape as a whole.

Also, the armature core 12 includes inner slots 31 each formed between two inner winding portions 27 of the circumferentially adjacent teeth 21 to 25, and first and second outer slots 32a, 32b formed between the circumferentially adjacent branched tooth portions 26a, 26b. More specifically, the first outer slot 32a is a space between the first branched tooth portion 26a and the second branched tooth portion 26b of each of the teeth 21 to 25, and the second outer slot 32b is a space between the first branched tooth portion 26a of one of the circumferentially adjacent teeth 21 to 25 (for example, tooth 22) and the second branched tooth portion 26b of the other tooth (for example, tooth 21). Since the armature core 12 of the present embodiment includes five teeth 21 to 25, the armature core 12 includes five inner slots 31, five first outer slots 32a, and five second outer slots 32b. Also, the inner slots 31 and the first outer slots 32a are formed at positions that are displaced in the circumferential direction, and each of the first outer slots 32a is located between the circumferentially adjacent inner slots 31. In the present embodiment, the branched tooth portions 26a, 26b of the five teeth 21 to 25 are given tooth numbers 1 to 10 sequentially in the circumferential direction as shown in FIG. 2. The tooth numbers are shown at the distal end portions of the branched tooth portions 26a, 26b in FIG. 2.

Also, the armature core 12 includes inner slots 31 each formed between two inner winding portions 27 of the circumferentially adjacent teeth 21 to 25, and first and second outer slots 32a, 32b formed between the circumferentially adjacent branched tooth portions 26a, 26b. More specifically, the first outer slot 32a is a space between the first branched tooth portion 26a and the second branched tooth portion 26b of each of the teeth 21 to 25, and the second outer slot 32b is a space between the first branched tooth portion 26a of one of the circumferentially adjacent teeth 21 to 25 (for example, tooth 21) and the second branched tooth portion 26b of the other tooth (for example, tooth 22). Since the armature core 12 of the present embodiment includes five teeth 21 to 25, the armature core 12 includes five inner slots 31, five first outer slots 32a, and five second outer slots 32b. Also, the inner slots 31 and the first outer slots 32a are formed at positions that are displaced in the circumferential direction, and each of the first outer slots 32a is located between the circumferentially adjacent inner slots 31. In the present embodiment, the branched tooth portions 26a, 26b of the five teeth 21 to 25 are given tooth numbers 1 to 10 sequentially in the circumferential direction as shown in FIG. 2. The tooth numbers are shown at the distal end portions of the branched tooth portions 26a, 26b in FIG. 2.

As shown in FIG. 1, armature coils formed of a conducting wire 41 are wound around the armature core 12 configured as described above. The armature coils include five inner layer coils 42a to 42e respectively wound around the inner winding portions 27, which are proximal end portions of the teeth 21 to 25, and five outer layer coils 43a to 43e wound around the branched tooth portions 26a, 26b. A method for winding the inner layer coils 42a to 42e and the outer layer coils 43a to 43e around the armature core 12 will now be described with reference to FIG. 2. The inner layer coils 42a to 42e are shown by medium lines, and the outer layer coils 43a to 43e are shown by thick lines in FIG. 2. Also, the inner layer coils 42a to 42e and the outer layer coils 43a to 43e are simplified in FIG. 2, and the number of turns of the actual inner layer coils 42a to 42e and the outer layer coils 43a to 43e differ from what is shown in FIG. 2.

The conducting wire 41 is first connected to the riser of the segment 16 of the segment number 1, and starting from the segment 16 of the segment number 1, the conducting wire 41 is wound several turns around the inner winding portion 27 of the tooth 21 by concentrated winding to form the inner layer coil 42a. Then, the conducting wire 41 is hooked on the riser of the segment 16 of the segment number 2, and is wound several turns around two adjacent branched tooth portions 26a, 26b at the center among the total of four branched tooth portions 26a, 26b of the two adjacent teeth 21, 22 (that is, the branched tooth portion 26b of the tooth number 2 and the branched tooth portion 26a of the tooth number 3) by distributed winding to form the outer layer coil 43a. In this specification, the term "distributed winding" means to wind the conducting wire around more than one tooth. The inner layer coil 42a is formed such that the number of turns is greater than the outer layer coil 43a. This is to equalize the resistance value of the inner layer coil 42a and the resistance value of the outer layer coil 43a. Since the previously wound inner layer coil 42a and the subsequently wound outer layer coil 43a are formed at positions displaced in the radial direction, the inner layer coil 42a does not overlap the outer layer coil 43a in the axial direction (see FIG. 1). Furthermore, the circumferential center of the inner layer coil 42a and the circumferential center of the outer layer coil 43a are displaced in the circumferential direction of the armature core 12.

Subsequently, the conducting wire 41 is alternately wound around the inner winding portions 27 and the branched tooth portions 26a, 26b in the same manner, so that the inner layer coils 42b to 42e and the outer layer coils 43b to 43e are alternately formed. The conducting wire 41 is sequentially hooked on the riser of the corresponding segments 16 every time the inner layer coils 42b to 42e and the outer layer coils 43b to 43e are formed.

That is, after being hooked on the riser of the segment 16 of the segment number 3, the conducting wire 41 is wound several turns around the inner winding portion 27 of the tooth 22 by concentrated winding to form the inner layer coil 42b, and then hooked on the riser of the segment 16 of the segment number 4. Then, the conducting wire 41 is wound several turns around the adjacent branched tooth portions 26a, 26b at the center among the total of four branched tooth portions 26a, 26b of the two adjacent teeth 22, 23 (that is, the branched tooth portion 26b of the tooth number 4 and the branched tooth portion 26a of the tooth number 5) by distributed winding to form the outer layer coil 43b, and then hooked on the riser of the segment 16 of the segment number 5. Subsequently, after being wound several turns around the inner winding portion 27 of the tooth 23 by concentrated winding to form the inner layer coil 42c, the conducting wire 41 is hooked on the riser of the segment 16 of the segment number 6, and is wound several turns around the adjacent branched tooth portions 26a, 26b at the center among the total of four branched tooth portions 26a, 26b of the two adjacent teeth 23, 24 (that is, the branched tooth portion 26b of the tooth number 6 and the branched tooth portion 26a of the tooth number 7) by distributed winding so that the outer layer coil 43c is formed. Then, after being hooked on the riser of the segment 16 of the segment number 7, the conducting wire 41 is wound several turns around the inner winding portion 27 of the tooth 24 by concentrated winding to form the inner layer coil 42d. After being hooked on the riser of the segment 16 of the segment number 8, the conducting wire 41 is wound several turns around the adjacent branched tooth portions 26a, 26b at the center among the total of four branched tooth portions 26a, 26b of the two adjacent teeth 24, 25 (that is, the branched tooth portion 26a of the tooth number 8 and the branched tooth portion 26b of the tooth number 9) by distributed winding so that the outer layer coil 43d is formed. Then, after being hooked on the riser of the segment 16 of the segment number 9, the conducting wire 41 is wound several turns around the inner winding portion 27 of the tooth 25 by concentrated winding to form the inner layer coil 42e. After being hooked on the riser of the segment 16 of the segment number 10, the conducting wire 41 is wound several turns around the adjacent branched tooth portions 26a, 26b at the center among the total of four branched tooth portions 26a, 26b of the two adjacent teeth 25, 21 (that is, the branched tooth portion 26b of the tooth number 10 and the branched tooth portion 26a of the tooth number 1) by distributed winding so that the outer layer coil 43e is formed. The conducting wire 41 is then hooked on the riser of the segment 16 of the segment number 1, and winding of all the inner layer coils 42a to 42e and the outer layer coils 43a to 43e is completed.

As described above, all the inner layer coils 42a to 42e and the outer layer coils 43a to 43e are continuously formed using a single conducting wire 41. The inner layer coils 42a to 42e and the outer layer coils 43a to 43e are automatically wound around the armature core 12 using a non-illustrated flyer (winding jig). The conducting wire 41 hooked on the risers of the segments 16 is fused (connected) to be electrically connected to the segments 16. Thus, the winding start end and the winding finish end of each of the inner layer coils 42a to 42e and the outer layer coils 43a to 43e are electrically connected to the segments 16 on which the ends are hooked. In the present embodiment, one end of the corresponding one of the inner layer coils 42a to 42e and one end of the corresponding one of the outer layer coils 43a to 43e are connected to each segment 16.

Figure 6:
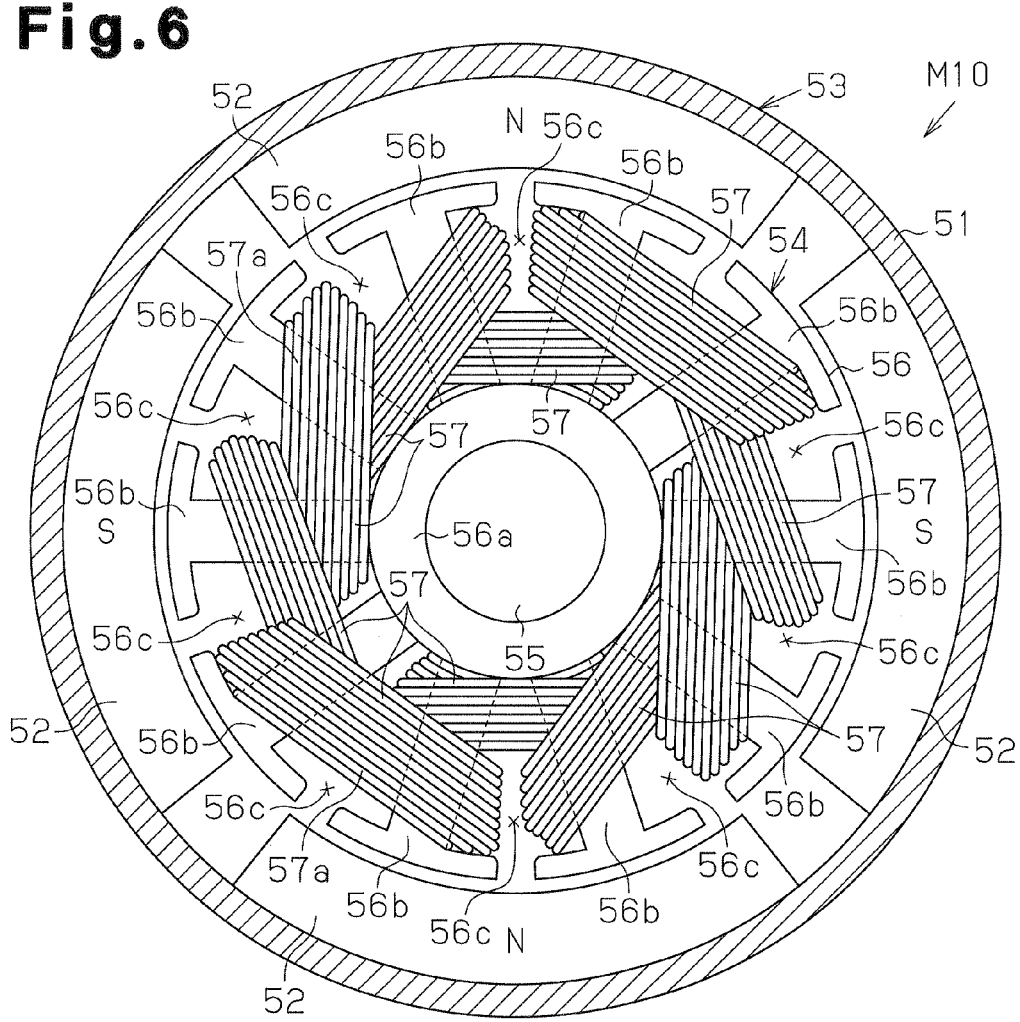
FIG. 6 is a cross-sectional view illustrating the conventional direct-current motor including the armature coils wound by distributed winding.
Figure 7:
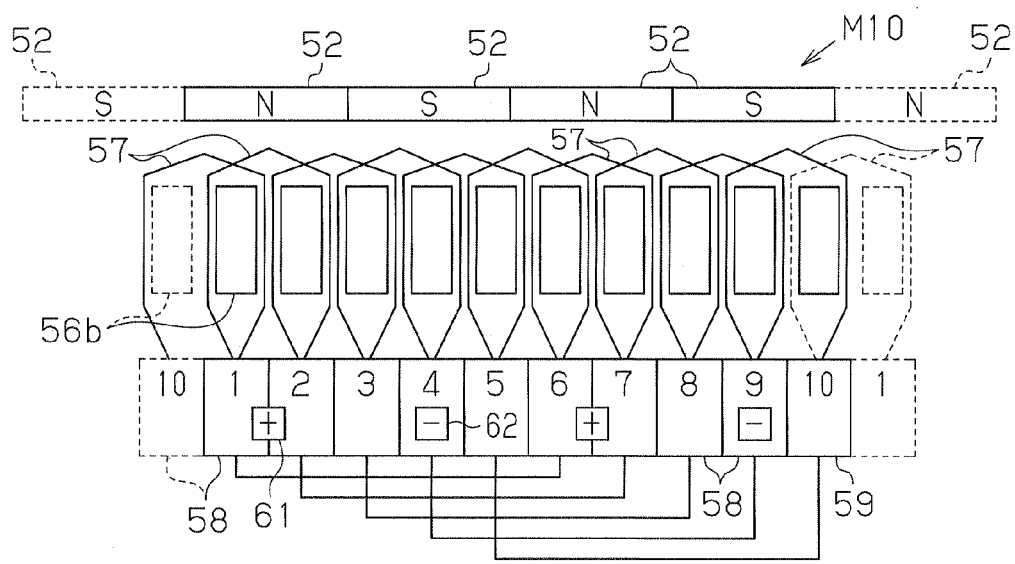
FIG. 7 is a diagrammatic developed view illustrating the direct-current motor of FIG. 6.

FIG. 6 shows a cross-sectional view of a conventional direct-current motor M10 in which the armature coils are wound around an armature core 56 by distributed winding. FIG. 7 shows a diagrammatic developed view of the conventional direct-current motor M10. As shown in FIGS. 6 and 7, the direct-current motor M10 includes a stator 53 and an armature 54, which is arranged radially inward of the stator 53. Four magnets 52 are secured to the inner circumferential surface of a substantially cylindrical yoke housing 51 of the stator 53. A rotary shaft 55 of the armature 54 is supported to be rotatable with respect to the stator 53.

Figure 5:
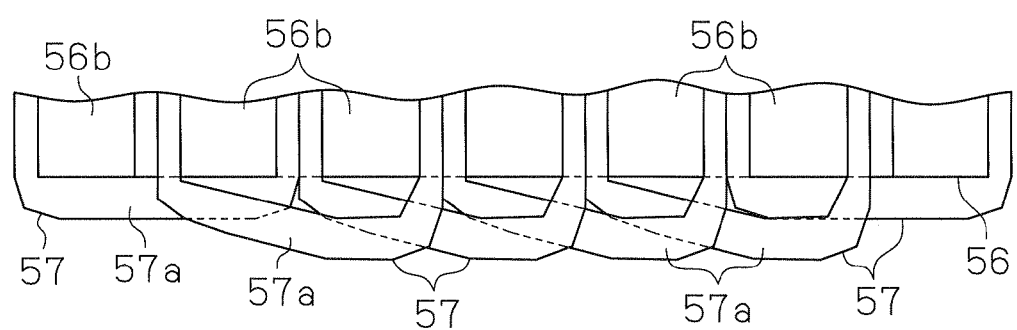
FIG. 5 is a schematic view illustrating the coil end portion of a conventional direct-current motor including armature coils wound by distributed winding.

The armature core 56, which is secured to the rotary shaft 55 of the armature 54, includes a cylindrical core back 56a and ten teeth 56b, which extend radially outward from the outer circumferential surface of the core back 56a in a radial pattern. The core back 56a and the teeth 56b are integrally formed. The inner circumferential surface of the core back 56a is attached to the outer circumferential surface of the rotary shaft 55 so that the core back 56a is secured to the rotary shaft 55. The armature core 56 includes the total of ten slots 56c between the circumferentially adjacent teeth 56b. Ten armature coils 57 are wound around the armature core 56 by distributed winding. Each armature coil 57 is wound around two teeth 56b in such a manner as to extend over one of the slots 56c. Also, a commutator 59, which includes ten segments 58 arranged along the circumferential direction, is secured to the rotary shaft 55. One end of one of the armature coils 57 and one end of another one of the armature coils 57 are connected to each segment 58. Furthermore, a positive brush 61 and a negative brush 62 for supplying current to the armature coils 57 are slidably pressed against the outer circumferential surface of the commutator 59. In such a direct-current motor M10, which includes the armature coils 57 wound by distributed winding, coil end portions 57a of the armature coils 57 overlap each other in the axial direction, and the coil end portions 57a project axially outward by a large amount as shown in FIG. 5. The coil end portions 57a are parts of the armature coils 57 that project further axially outward than the axial end face of the armature core 56.

Figure 4:
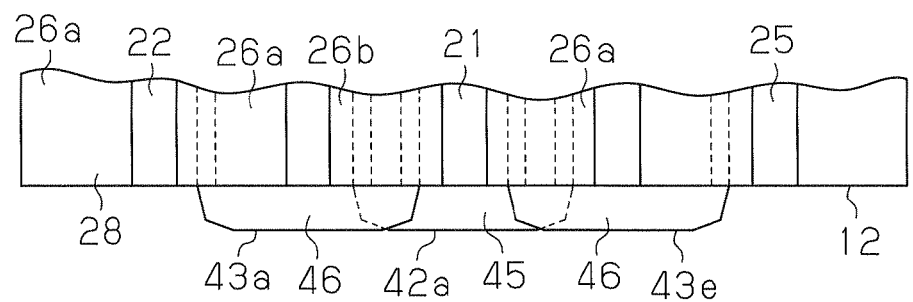
FIG. 4 is a schematic view illustrating the coil end portion of the direct-current motor of FIG. 1.

In the direct-current motor M1 of the present embodiment, however, the inner layer coils 42a to 42e do not overlap each other in the radial direction as shown in FIGS. 1 and 4 since the inner layer coils 42a to 42e are wound around the inner winding portions 27 of the teeth 21 to 25 by concentrated winding. Thus, the inner layer coils 42a to 42e do not overlap each other in the axial direction at the axial ends of the armature core 12. In addition, although the outer layer coils 43a to 43e are wound around two circumferentially adjacent branched tooth portions 26a, 26b, the outer layer coils 43a to 43e do not overlap each other in the radial direction since the outer layer coils 43a to 43e are wound around different branched tooth portions 26a, 26b. Thus, the circumferentially adjacent outer layer coils 43a to 43e do not overlap each other in the axial direction at the axial ends of the armature core 12. Furthermore, the outer layer coils 43a to 43e and the inner layer coils 42a to 42e are displaced in the radial direction since the outer layer coils 43a to 43e are wound around the teeth 21 to 25 at positions radially outward of the inner layer coils 42a to 42e. Thus, the outer layer coils 43a to 43e and the inner layer coils 42a to 42e do not overlap each other in the axial direction at the axial ends of the armature core 12. Therefore, since coil end portions 45 of the inner layer coils 42a to 42e (part of the inner layer coils 42a to 42e that projects further axially outward than the axial end face of the armature core 12) and coil end portions 46 of the outer layer coils 43a to 43e (part of the outer layer coils 43a to 43e that projects axially outward than the axial end face of the armature core 12) do not overlap in the axial direction, the axial length of the coil end portions 45, 46 is reduced as compared to the armature coils 57 of the conventional direct-current motor M10 wound by distributed winding (see FIG. 5).

The present embodiment has the following advantages.

(1) Since the outer layer coils 43a to 43e are wound around the teeth 21 to 25 at positions radially outward of the inner layer coils 42a to 42e, the outer layer coils 43a to 43e do not overlap the inner layer coils 42a to 42e in the axial direction. Thus, the coil end portions 45, 46 of the inner layer coils 42a to 42e and the outer layer coils 43a to 43e are prevented from projecting axially outward by a large amount. This prevents the direct-current motor M1 from being enlarged in the axial direction. Thus, it is not necessary to reduce the number of turns of the inner layer coils 42a to 42e and the outer layer coils 43a to 43e to prevent the axial length of the coil end portions 45, 46 from being increased. Therefore, the direct-current motor M1 is prevented from being enlarged in the axial direction without reducing the space factor of the armature coils, that is, without reducing the power output. Also, in a case with the direct-current motor M1 of the present embodiment having the size equal to the size of the conventional direct-current motor including the armature coils wound by distributed winding, the power output of the direct-current motor M1 is increased since the number of turns of the inner layer coils 42a to 42e and the outer layer coils 43a to 43e can be increased to increase the space factor of the armature coils as compared to the conventional direct-current motor. Furthermore, since the circumferential center of the inner layer coils 42a to 42e and the circumferential center of the outer layer coils 43a to 43e are displaced in the circumferential direction, fluctuation of the magnetic flux is reduced as compared to the direct-current motor including the armature coils wound by concentrated winding. Thus, vibration generated during activation of the direct-current motor M1 is reduced.

(2) The teeth 21 to 25 each include, at its distal end portion, the pair of branched tooth portions 26a, 26b, which are bifurcated to separate in the circumferential direction. Thus, the outer layer coils 43a to 43e are easily formed radially outward of the inner layer coils 42a to 42e by winding the inner layer coils 42a to 42e around the proximal end portions of the teeth 21 to 25 (that is, the inner winding portions 27) and winding the outer layer coils 43a to 43e around the two circumferentially adjacent branched tooth portions 26a, 26b over the circumferentially adjacent teeth 21 to 25. Furthermore, the circumferential center of the inner layer coils 42a to 42e and the circumferential center of the outer layer coils 43a to 43e are easily displaced in the circumferential direction. Also, since the inner layer coils 42a to 42e are wound around the proximal end portions of the teeth 21 to 25, that is, around the parts that are not branched (the inner winding portions 27) by concentrated winding, the space factor of the armature coils in the vicinity of the proximal end portions of the teeth 21 to 25 is increased. Furthermore, since the teeth 21 to 25 are substantially Y-shaped and have the pair of branched tooth portions 26a, 26b, the area of the slots is increased, which increases the space factor of the armature coils as compared to, for example, a case in which the inner layer coils 42a to 42e and the outer layer coils 43a to 43e are wound around an armature core including ten teeth that do not have the branched tooth portions 26a, 26b.

(3) In the state shown in FIG. 1, the magnetic flux of the tooth 21 is compared with that of the tooth 23 as an example. In the tooth 23, the magnetic flux that flows into the distal end of the second branched tooth portion 26b is branched to the inner winding portion 27 and the first branched tooth portion 26a. In the tooth 21, the magnetic fluxes flow into the distal ends of the pair of branched tooth portions 26a, 26b and merge at the inner winding portion 27 and flow into the core back 20. When the magnetic path cross-sectional area S2 at the inner winding portion 27 of the tooth 21 is set to a value twice the magnetic path cross-sectional area S1 of the branched tooth portions 26a, 26b, the magnetic flux flows easily in the inner winding portion 27 of the tooth 21 in the state shown in FIG. 1. That is, the magnetic flux flows easily at the inner winding portions 27 when the armature 2 is rotated by setting the magnetic path cross-sectional area S2 at the inner winding portions 27 to a value twice the magnetic path cross-sectional area S1 at the branched tooth portions 26a, 26b in the teeth 21 to 25. This reduces the difference between the amount of magnetic flux at the radially inner section of the armature core 12 where the inner winding portions 27 are provided and the amount of magnetic flux at the radially outer section where the branched tooth portions 26a, 26b are provided, thus reducing the magnetic imbalance between the radially inner section and the radially outer section. As a result, vibration generated during activation of the direct-current motor M1 is further reduced.

(4) Since the proximal end portions of the teeth 21 to 25 are connected by the core back 20, the magnetic flux that flows through the inner winding portions 27 might leak to the adjacent teeth 21 to 25 from the radially inward ends of the inner winding portions 27 via the core back 20. The difference between the amount of magnetic flux at the radially inner section of the armature core 12 where the inner winding portions 27 are provided and the amount of magnetic flux at the radially outer section where the branched tooth portions 26a, 26b are provided can be reduced by increasing the number of turns of the inner layer coils 42a to 42e to be greater than the number of turns of the outer layer coils 43a to 43e. As a result, the magnetic imbalance between the radially inner section and the radially outer section is further reduced. The magnetic excitation force is thus prevented from locally increasing, and generation of vibration is further inhibited.

(5) The inner layer coils 42a to 42e are each wound around one of the inner winding portions 27 by concentrated winding at a position radially inward of the outer layer coils 43a to 43e, and the outer layer coils 43a to 43e are each wound around two of the branched tooth portions 26a, 26b by distributed winding at a position radially outward of the inner layer coils 42a to 42e. Thus, the circumferential length of the outer layer coils 43a to 43e is longer than that of the inner layer coils 42a to 42e. When the number of turns of the inner layer coils 42a to 42e is increased to be greater than the number of turns of the outer layer coils 43a to 43e to equalize the resistance value of the inner layer coils 42a to 42e and the resistance value of the outer layer coils 43a to 43e as in the present embodiment, the current value of the inner layer coils 42a to 42e and the current value of the outer layer coils 43a to 43e are equalized. Thus, torque generated in the direct-current motor M1 is stabilized.

(6) The commutator 13 includes the segments 16 the number of which is twice the number of teeth 21 to 25. One of the ends of one of the inner layer coils 42a to 42e and one of the ends of one of the outer layer coils 43a to 43e are connected to each segment 16. Thus, all the inner layer coils 42a to 42e and the outer layer coils 43a to 43e are continuously formed by one conducting wire 41 by alternately winding the inner layer coils 42a to 42e and the outer layer coils 43a to 43e. This facilitates winding of the inner layer coils 42a to 42e and the outer layer coils 43a to 43e around the armature core 12.

(7) In the conventional direct-current motor in which all the armature coils are wound by distributed winding, the coil end portions overlap at the axial end face of the armature core causing the armature coils to project axially outward by a large amount. Since the length of the conducting wire forming the armature coils is increased, the coil resistance of the armature coils might be undesirably increased. However, since the coil end portions 45 of the inner layer coils 42a to 42e and the coil end portions 46 of the outer layer coils 43a to 43e do not overlap in the axial direction in the direct-current motor M1 of the present embodiment, the coil resistance of the armature coils is prevented from increasing.

(8) Since the coil end portions 45 of the inner layer coils 42a to 42e and the coil end portions 46 of the outer layer coils 43a to 43e do not overlap in the axial direction, the armature 2 is well-balanced as compared to the conventional direct-current motor in which all the armature coils are wound by distributed winding. Thus, vibration of the armature 2 during activation of the direct-current motor M1 is further reduced.

(9) The plate-like extended portions 28, which extend along the circumferential direction, are integrally formed at the distal end portions of the branched tooth portions 26a, 26b. Thus, the extended portions 28 prevent the outer layer coils 43a to 43e from projecting radially outward from the armature core 12.

A second embodiment of the present invention will now be described with reference to the drawings. In the present embodiment, the same reference numerals are given to those components that are the same as the corresponding components of the first embodiment, and detailed explanations are omitted.

Figure 8A:
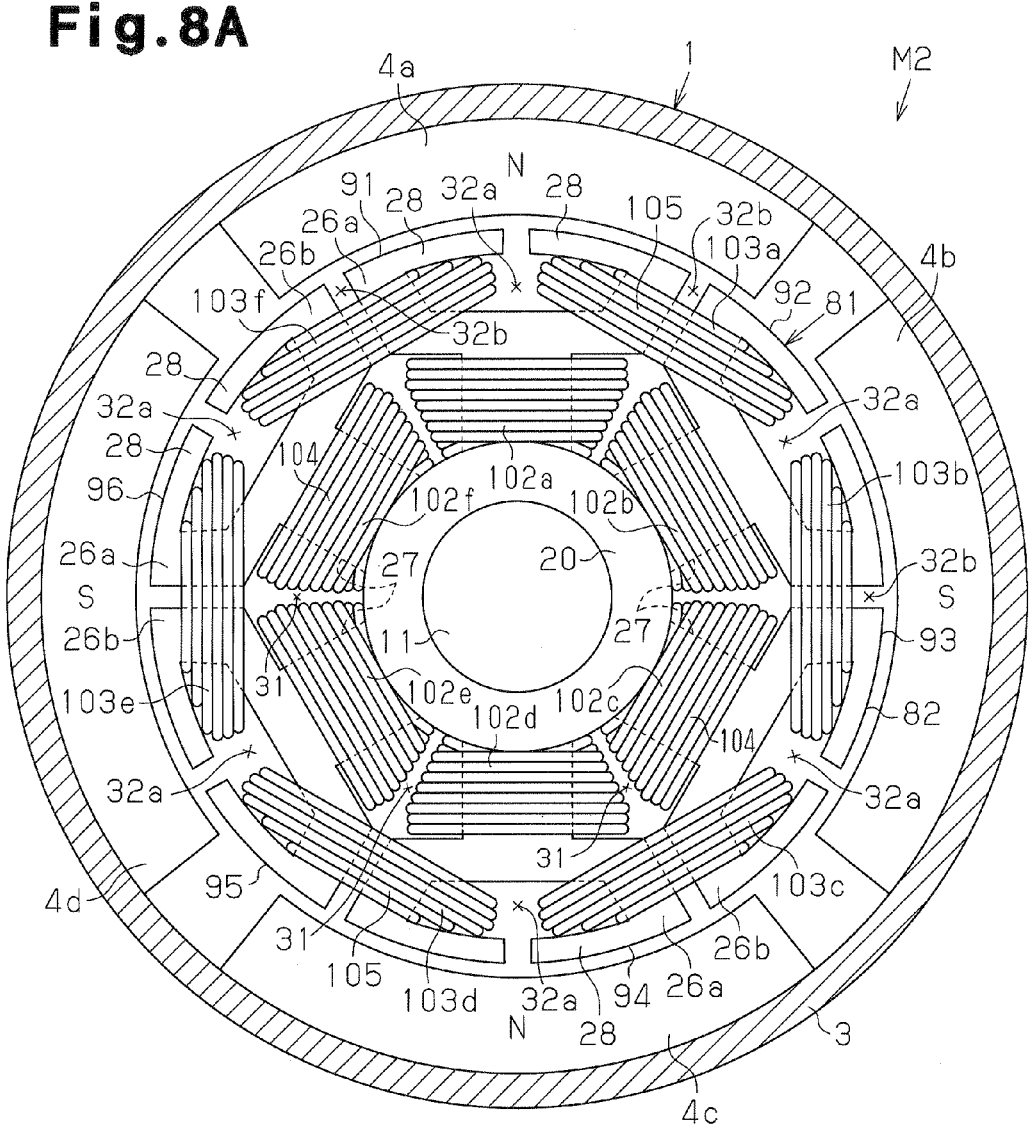
FIG. 8A is a cross-sectional view illustrating a direct-current motor according to a second embodiment of the present invention.
Figure 9:
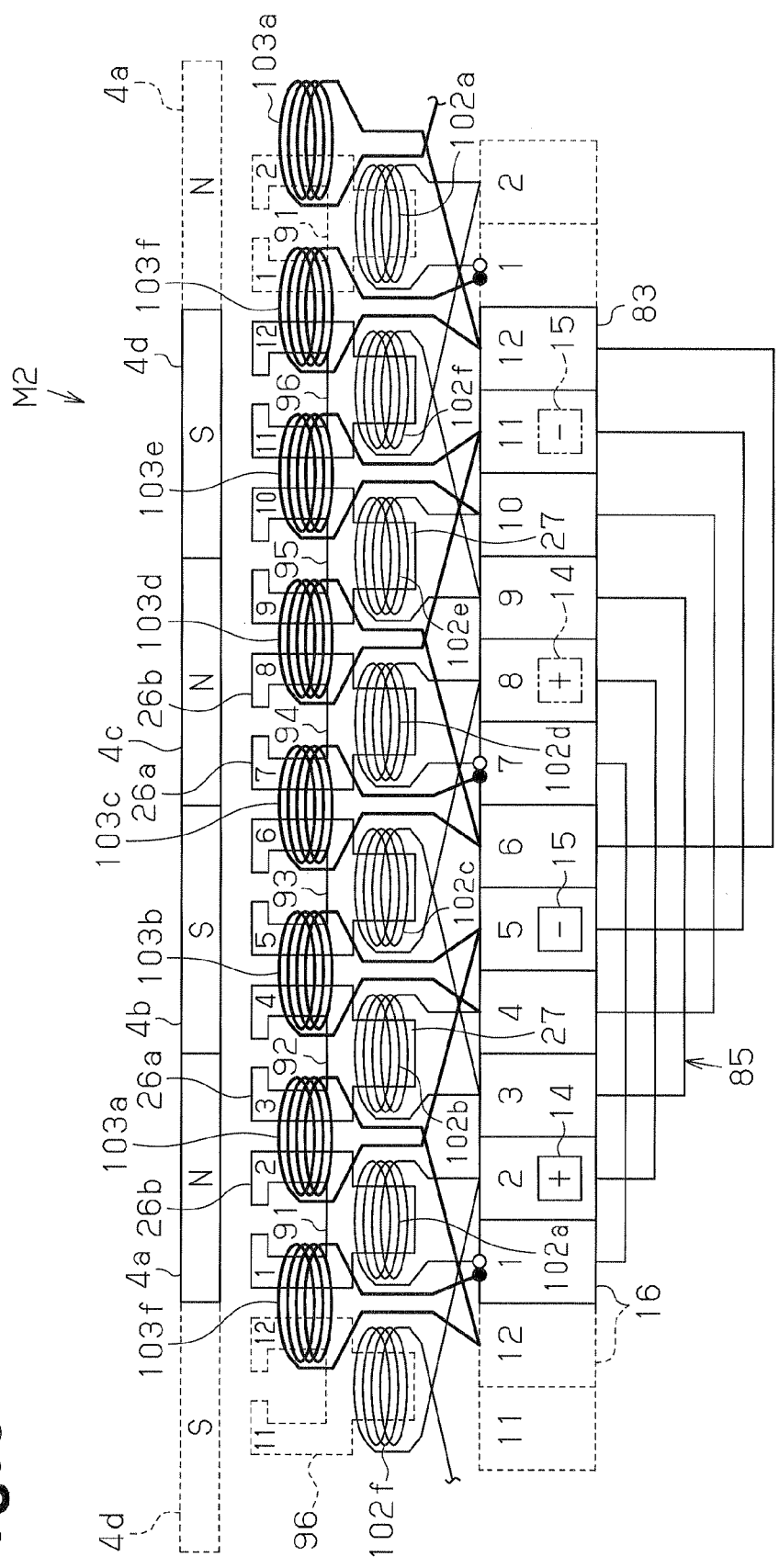
FIG. 9 is a diagrammatic developed view illustrating the direct-current motor of FIG. 1.

FIG. 8A shows a cross-sectional view of a direct-current motor M2 according to the present embodiment. FIG. 9 shows a diagrammatic developed view of the direct-current motor M2. The direct-current motor M2 of the present embodiment differs from the direct-current motor M1 of the first embodiment in the structure of the armature. As shown in FIGS. 8A and 9, an armature 81 of the direct-current motor M2 of the present embodiment includes the rotary shaft 11, an armature core 82, which is secured to the rotary shaft 11, and a substantially cylindrical commutator 83, which is secured to the rotary shaft 11. The rotary shaft 11 of the armature 81 is supported to be rotatable with respect to the stator 1. The armature core 82 faces the magnets 4a to 4d in the radial direction. The positive brush 14 and the negative brush 15 are arranged on the outer circumference of the commutator 83. The positive brush 14 and the negative brush 15 are slidably pressed against the outer circumferential surface of the commutator 83.

As shown in FIG. 9, the commutator 83 includes a cylindrical retaining member (not shown) formed of insulating resin material and twelve segments 16 arranged along the outer circumferential surface of the retaining member. In the present embodiment, the twelve segments 16 arranged along the circumferential direction are given segment numbers 1 to 12 in FIG. 9. Also, in the commutator 83, the segments 16 that are arranged at an angular interval equal to the angular interval by which the magnets of the same poles are arranged are short-circuited (electrically connected) by a short-circuiting member 85 secured to an axial end of each segment 16. More specifically, two north pole magnets 4a, 4c are arranged at an interval of 180° in the stator 1. Thus, two segments 16 that are arranged at the interval of 180° (for example, the segment 16 of the segment number 1 and the segment 16 of the segment number 7) are short-circuited with each other by the associated short-circuiting member 85, and have the same electric potential. FIG. 9 shows imaginary brushes with chain double-dashed lines to schematically show that the state that is the same as the state in which the positive brush 14 and the negative brush 15 are arranged is obtained by short-circuiting the segments 16 by the short-circuiting members 85.

As shown in FIG. 8A, the armature core 82 includes the cylindrical core back 20 and six teeth 91 to 96, which extend radially outward from the outer circumferential surface of the core back 20 in a radial pattern. The core back 20 and the teeth 91 to 96 are integrally formed. The number S of the segments 16 provided in the commutator 83 is set based on the number N of the teeth 91 to 96 provided on the armature core 82, and is set to satisfy S=2N as in the first embodiment. Thus, the number S of the segments 16 provided in the commutator 83 is set to twelve.

The six teeth 91 to 96 are formed integrally with the core back 20 at equal angular intervals in the circumferential direction (intervals of 60° in the present embodiment). The teeth 91 to 96 have the same shape as the teeth 21 to 25 of the first embodiment. That is, the first branched tooth portion 26a and the second branched tooth portion 26b that are the same as the first embodiment are provided at the distal end portion of each of the teeth 91 to 96. The proximal end portion of the teeth 91 to 96 that is radially inward of the branched tooth portions 26a, 26b is referred to as the inner winding portion 27. Furthermore, the extended portions 28 are formed integrally at the distal end portions of the branched tooth portions 26a, 26b of the teeth 91 to 96. Also, the armature core 82 includes the inner slots 31 formed between the inner winding portions 27 of the circumferentially adjacent teeth 91 to 96, and the first and second outer slots 32a, 32b formed between the circumferentially adjacent branched tooth portions 26a, 26b. Since the armature core 82 of the present embodiment includes six teeth 91 to 96, the armature core 82 includes six inner slots 31, six first outer slots 32a, and six second outer slots 32b. Also, in the armature core 82, the inner slots 31 and the first outer slots 32a are formed at positions displaced in the circumferential direction, and each first outer slot 32a is located between the circumferentially adjacent inner slots 31.

Figure 8B:
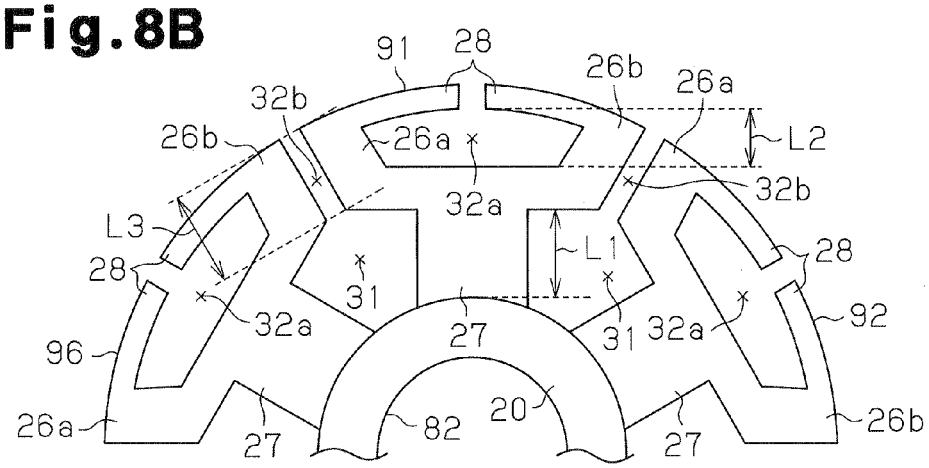
FIG. 8B is a plan view illustrating the armature core of the direct-current motor of FIG. 8A.

Also, in the armature core 82, the teeth 91 to 96 are formed such that the radial length of the inner slots 31 is greater than the radial length of the first and second outer slots 32a, 32b as shown in FIG. 8B. That is, when the radial length of the inner slots 31 is expressed by L1, the radial length of the first outer slots 32a is expressed by L2, and the radial length of the second outer slots 32b is expressed by L3, L1>L2, and L1>L3 are satisfied. Therefore, in the teeth 91 to 96, the proximal ends of the branched tooth portions 26a, 26b are located radially outward of the radial center of the teeth 91 to 96.

As shown in FIG. 8A, the armature coils formed of the conducting wire 41 is wound around the armature core 82 configured as described above. The armature coils include six inner layer coils 102a to 102f, which are wound around the inner winding portions 27, which are parts of the teeth 91 to 96 close to the proximal end portions, and six outer layer coils 103a to 103f, which are wound around the branched tooth portions 26a, 26b.

A method for winding the inner layer coils 102a to 102f and the outer layer coils 103a to 103f around the armature core 82 will be described with reference to FIG. 9. In the present embodiment, the branched tooth portions 26a, 26b of the six teeth 91 to 96 are given tooth numbers 1 to 12 sequentially in the circumferential direction as shown in FIG. 9. The tooth numbers are shown at the distal end portions of the branched tooth portions 26a, 26b in FIG. 9. Also, the inner layer coils 102a to 102f are shown by medium lines, the outer layer coils 103a to 103f are shown by thick lines, and the inner layer coils 102a to 102f and the outer layer coils 103a to 103f are simplified in FIG. 9.

In the present embodiment, two flyers arranged with an interval of 180° are simultaneously operated, and the inner layer coils 102a to 102f and the outer layer coils 103a to 103f are formed by two conducting wires 41. One of the conducting wires 41 is first connected to the riser of the segment 16 of the segment number 1 by a first flyer, and then, wound several turns around the inner winding portion 27 of the tooth 91 by concentrated winding to form the inner layer coil 102a. Then, the conducting wire 41 is hooked on the riser of the segment 16 of the segment number 2, and then wound several turns around the inner winding portion 27 of the tooth 96 that is circumferentially adjacent to the tooth 91, around which the inner layer coil 102a is wound, by concentrated winding to form the inner layer coil 102f. Subsequently, after being hooked on the riser of the segment 16 of the segment number 9, the conducting wire 41 is wound several turns around the inner winding portion 27 of the tooth 95 that is circumferentially adjacent to the tooth 96, around which the inner layer coil 102f is wound, by concentrated winding to form the inner layer coil 102e. Then, the conducting wire 41 is hooked on the riser of the segment 16 of the segment number 10, and thereafter, the conducting wire 41 is wound several turns around the second branched tooth portion 26b of the tooth 95 and the first branched tooth portion 26a of the tooth 96 (that is, the second branched tooth portion 26b of the tooth number 10 and the first branched tooth portion 26a of the tooth number 11) by distributed winding to form the outer layer coil 103e. At this time, the outer layer coil 103e is formed at a position displaced in the radial direction from the previously wound inner layer coils 102a, 102e, 102f, and does not overlap in the axial direction. Then, after being hooked on the riser of the segment 16 of the segment number 11, the conducting wire 41 is wound several turns around the second branched tooth portion of the tooth 94 and the first branched tooth portion 26a of the tooth 95 that are circumferentially adjacent to the outer layer coil 103e that is formed immediately before (that is, the second branched tooth portion 26b of the tooth number 8 and the first branched tooth portion 26a of the tooth number 9) by distributed winding to form the outer layer coil 103d. Then, after being hooked on the riser of the segment 16 of the segment number 6, the conducting wire 41 is wound several turns around the second branched tooth portion 26b of the tooth 93 and the first branched tooth portion 26a of the tooth 94 that are circumferentially adjacent to the outer layer coil 103d that is formed immediately before (that is, the second branched tooth portion 26b of the tooth number 6 and the first branched tooth portion 26a of the tooth number 7) by distributed winding to form the outer layer coil 103c. Then, the conducting wire 41 is hooked on the riser of the segment 16 of the segment number 7. Winding of the conducting wire 41 around the armature core 82 using the first flyer is thus completed.

In this manner, the first flyer continuously winds the inner layer coils 102a, 102f, 102e around the inner winding portions 27 of the three teeth 91, 96, 95 arranged successively in the circumferential direction. Thereafter, the first flyer continuously winds the outer layer coils 103e, 103d, 103c sequentially in the circumferential direction around the six branched tooth portions 26a, 26b of the four teeth 96, 95, 94, 93 arranged successively in the circumferential direction including the two teeth around which the inner layer coils 102a, 102f, 102e are wound. In this case, every time the first flyer forms the inner layer coils 102a, 102f, 102e and the outer layer coils 103e, 103d, 103c, the first flyer hooks the conducting wire 41 on the riser of the corresponding segment 16. After connecting the conducting wire 41 to the riser of the segment 16 of the segment number 7, the second flyer continuously winds the inner layer coils 102d, 102c, 102b around the inner winding portions 27 of three teeth 94, 93, 92 arranged successively in the circumferential direction. Then, the second flyer continuously winds the outer layer coils 103b, 103a, 103f sequentially in the circumferential direction around the six branched tooth portions 26a, 26b of the four teeth 93, 92, 91, 96 arranged successively in the circumferential direction including the two teeth around which the inner layer coils 102d, 102c, 102b are wound. The second flyer also sequentially hooks the conducting wire 41 on the risers of the segments 16 of the segment numbers 8, 3, 4, 5, 12 every time the inner layer coils 102d, 102c, 102b and the outer layer coils 103b, 103a are formed. When the conducting wire 41 is connected to the segment 16 of the segment number 1, winding of the conducting wire 41 around the armature core 82 performed by the second flyer is completed. In the present embodiment, the number of turns of the inner layer coils 102a to 102f is equal to the number of turns of the outer layer coils 103a to 103f.

The conducting wire 41 hooked on the riser of the segments 16 is fused (connected) and electrically connected to the segments 16. Thus, the winding start ends and the winding finish ends of the inner layer coils 102a to 102f and the outer layer coils 103a to 103f are electrically connected to the respective segments 16. In the present embodiment, two of the ends of the inner layer coils 102a to 102f and the ends of the outer layer coils 103a to 103f are connected to each segment 16. More specifically, one end of the inner layer coil and one end of the outer layer coil wound around the circumferentially adjacent two teeth are connected to each of the segments 16 of the segment numbers 1, 4, 7, 10. Also, one end of each of the two circumferentially adjacent inner layer coils is connected to each of half (four) the segments 16 among eight segments 16 other than the segments 16 of the segment numbers 1, 4, 7, 10 (in the present embodiment, the segments 16 of the segment numbers 2, 3, 8, 9). One end of each of the two circumferentially adjacent outer layer coils is connected to each of the remaining four segments 16 (in the present embodiment, the segments 16 of the segment numbers 5, 6, 11, 12).

As shown in FIG. 8A, in the direct-current motor M2 of the present embodiment, the inner layer coils 102a to 102f do not overlap each other in the axial direction at both axial ends of the armature core 82 since the inner layer coils 102a to 102f are wound around the inner winding portions 27 of the teeth 91 to 96 by concentrated winding as in the first embodiment. Also, the circumferentially adjacent outer layer coils 103a to 103f do not overlap each other in the axial direction at both axial ends of the armature core 82 since the outer layer coils 103a to 103f are wound around different branched tooth portions 26a, 26b. Furthermore, the outer layer coils 103a to 103f and the inner layer coils 102a to 102f are radially displaced and do not overlap each other in the axial direction at the axial ends of the armature core 82, since the outer layer coils 103a to 103f are wound around the teeth 91 to 96 at positions radially outward of the inner layer coils 102a to 102f. Thus, coil end portions 104 of the inner layer coils 102a to 102f (parts of the inner layer coils 102a to 102f that project axially outward than the axial end face of the armature core 82) and coil end portions 105 of the outer layer coils 103a to 103f (parts of the outer layer coils 103a to 103f that project further axially outward than the axial end face of the armature core 82) do not overlap in the axial direction. This reduces the axial length of the coil end portions 104, 105.

As described above, the present embodiment has the following advantages in addition to the advantages of the first embodiment (1) to (3), and (7) to (9).

(10) Since the inner slots 31 are located radially inward of the first and second outer slots 32a, 32b in the armature core 82, the circumferential length of the inner slots 31 is shorter than the circumferential length of the first outer slots 32a. Thus, the radial length of the inner slots 31 is set longer than the radial length of the first and second outer slots 32a, 32b so that the difference between the cross-sectional area perpendicular to the axial direction of the inner slots 31 and the cross-sectional area perpendicular to the axial direction of the first and second outer slots 32a, 32b is reduced. As a result, the number of turns of the inner layer coils 102a to 102f is prevented from being less than the number of turns of the outer layer coils 103a to 103f, and the space factor is increased in both of the inner slots 31 and the first outer slots 32a through which the conducting wire 41 is inserted. The magnetic imbalance between the radially inner section of the armature core 82 and the radially outer section of the armature core 82 is reduced by reducing the difference between the amount of magnetic flux generated by the inner layer coils 102a to 102f and the amount of magnetic flux generated by the outer layer coils 103a to 103f. As a result, generation of vibration is inhibited in the direct-current motor M2.

(11) In the commutator 83, the number of the segments 16 is twice the number of the teeth 91 to 96. One end of the inner layer coil and one end of the outer layer coil, which coils are wound around two circumferentially adjacent teeth, respectively, are connected to one of the four segments 16 among the twelve segments. Furthermore, one end of each of the two circumferentially adjacent inner layer coils is connected to one of half (four) the segments 16 among the remaining eight segments 16, and one end of each of circumferentially adjacent two outer layer coils is connected to one of the other half (four) of the segments 16. Thus, by winding the inner layer coils 102a to 102f and subsequently winding the outer layer coils 103a to 103f using two flyers simultaneously, three of the inner layer coils 102a to 102f and three of the outer layer coils 103a to 103f are continuously wound by each flyer with one conducting wire 41. In this case, the time required for winding the inner layer coils 102a to 102f and the outer layer coils 103a to 103f is reduced by simultaneously using two flyers, and the productivity of the direct-current motor M2 is improved.

A third embodiment of the present invention will now be described with reference to the drawings. In the present embodiment, the same reference numerals are given to those components that are the same as the corresponding components of the first and second embodiments, and detailed explanations are omitted.

Figure 10:
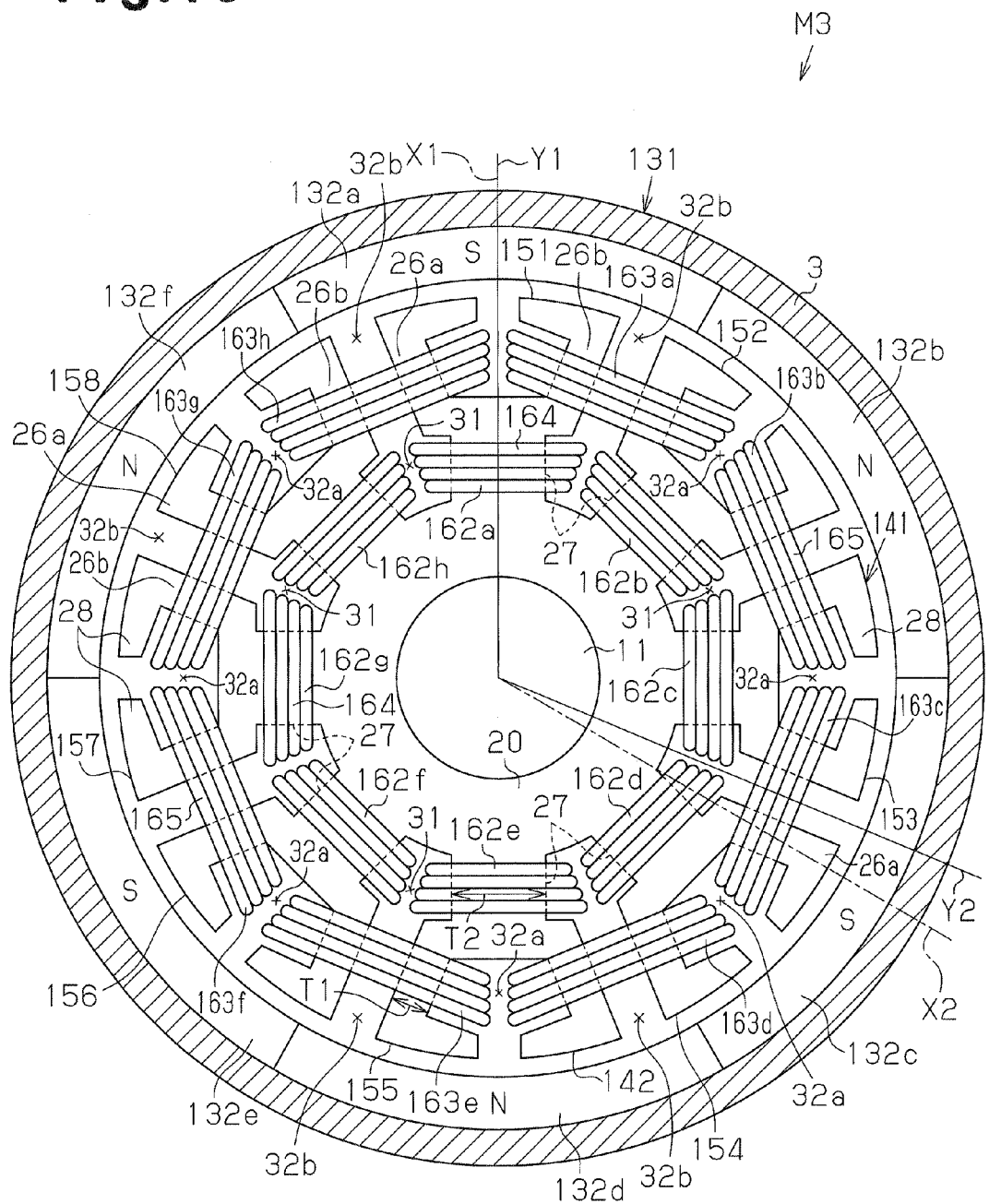
FIG. 10 is a cross-sectional view illustrating a direct-current motor according to a third embodiment of the present invention.
Figure 11:
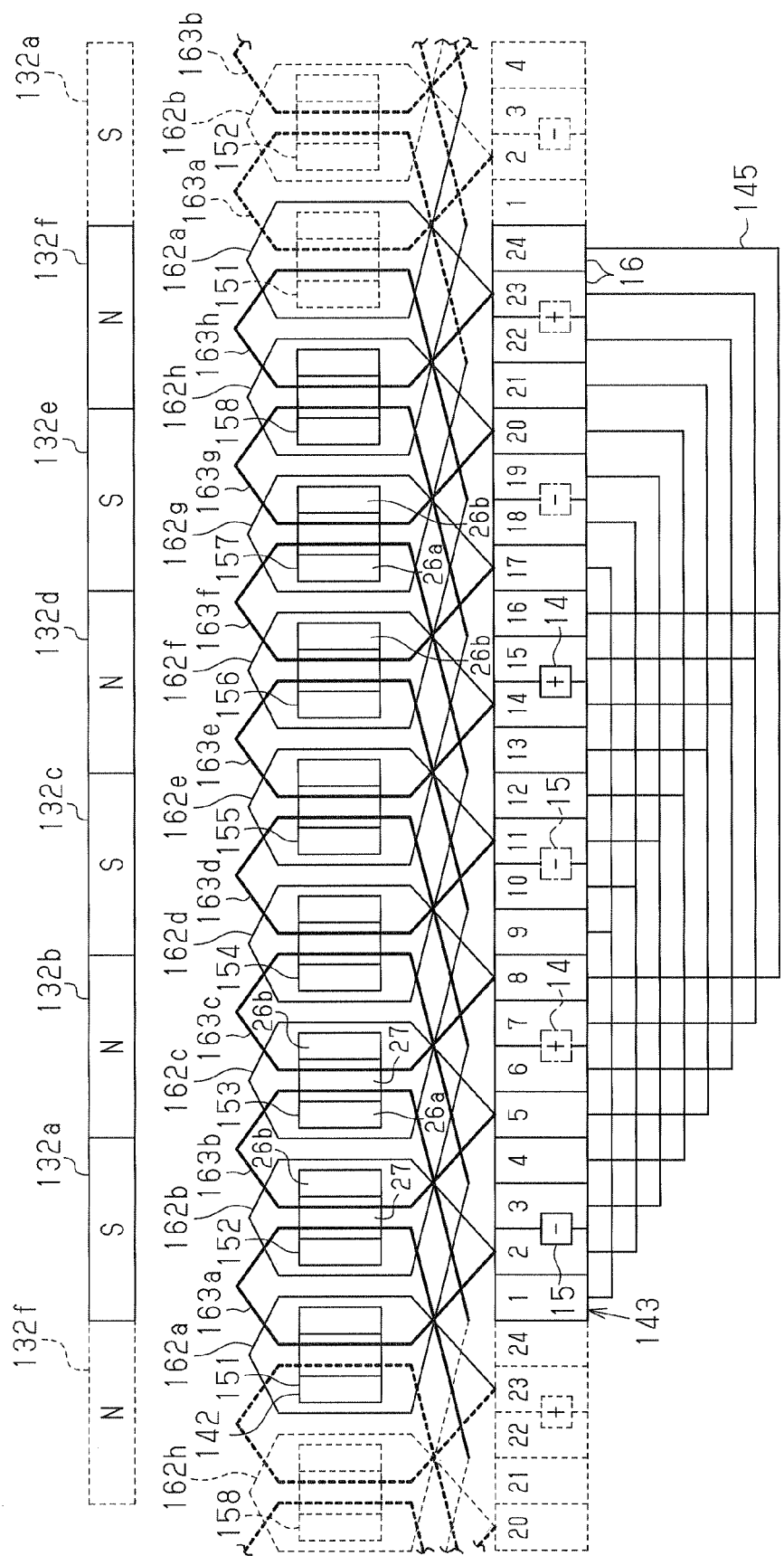
FIG. 11 is a diagrammatic developed view illustrating the direct-current motor of FIG. 10.

FIG. 10 shows a cross-sectional view of a direct-current motor M3 according to the present embodiment. FIG. 11 shows a diagrammatic developed view of the direct-current motor M3. The direct-current motor M3 of the present embodiment differs from the direct-current motor M1 of the first embodiment and the direct-current motor M2 of the second embodiment in the number of the magnets (magnetic poles) provided in the stator and the structure of the armature.

As shown in FIG. 10, six magnets 132a to 132f serving as magnetic poles are attached to the inner circumferential surface of the substantially cylindrical yoke housing 3 of a stator 131. The magnets 132a to 132f are arranged at equal angular intervals (in the present embodiment, intervals of) 60°) in the circumferential direction. The magnets 132a to 132f are arranged such that the north poles and the south poles are alternately arranged in the circumferential direction. The number P of the magnetic poles of the direct-current motor M3 is six.

As shown in FIGS. 10 and 11, an armature 141 includes the rotary shaft 11, an armature core 142, which is secured to the rotary shaft 11, and a substantially cylindrical commutator 143, which is secured to the rotary shaft 11. The rotary shaft 11 of the armature 141 is supported to be rotatable with respect to the stator 1. The armature core 142 faces the magnets 132a to 132f in the radial direction. The positive brush 14 and the negative brush 15 are slidably pressed against the outer circumferential surface of the commutator 143. The positive brush 14 and the negative brush 15 are arranged at an interval that is equal to odd multiples of an interval between the circumferentially adjacent magnets 132a to 132f, and are arranged at an interval of 180°, which is three times 60°, in the present embodiment. Also, the positive brush 14 is arranged at a position corresponding to the circumferential center of the north pole magnet 132d at the lower section of FIG. 10. The negative brush 15 is arranged at a position corresponding to the circumferential center of the south pole magnet 132a at the upper section of FIG. 10.

As shown in FIG. 11, the commutator 143 includes twenty-four segments 16, which are arranged on the outer circumferential surface of the cylindrical retaining member (not shown) formed of insulating resin material. In the present embodiment, the twenty-four segments 16 arranged in the circumferential direction are given segment numbers 1 to 24 in FIG. 11. Also, in the commutator 143, the segments 16 that are arranged at an angular interval equal to the angular interval by which the magnets of the same poles are arranged are short-circuited (electrically connected) by a short-circuiting member 145 secured to an axial end of each segment 16. More specifically, since the north pole magnets 132b, 132d, 132f are arranged at intervals of 120° on the stator 131, three segments 16 arranged at intervals of 120° (for example, the segment 16 of the segment number 1, the segment 16 of the segment number 9, and the segment 16 of the segment number 17) are short-circuited by the associated short-circuiting member 145 and are permitted to have the same electric potential. FIG. 11 shows imaginary brushes with alternate long and short dash lines to schematically show that the state that is the same as the state in which the positive brush 14 and the negative brush 15 are arranged is obtained by short-circuiting the segments 16 by the short-circuiting members 145.

As shown in FIG. 10, the armature core 142 includes the tubular core back 20, eight teeth 151 to 158, which extend radially outward from the outer circumferential surface of the core back 20 in a radial pattern. The core back 20 and the teeth 151 to 158 are integrally formed. In the present embodiment, the number N of the teeth 151 to 158 provided in the armature core 142 is set based on the number P of the magnetic poles to satisfy N=P±2 (when P=4, N=6). Since the number P of the magnetic poles is six, the number N of the teeth 151 to 158 is set to eight. Also, the number S of the segments 16 provided on the commutator 143 is set based on the number P of the magnetic poles and the number N of the teeth 151 to 158, and is set to satisfy S=N×(P/2). Thus, the number S of the segments 16 provided on the commutator 143 of the present embodiment is set to twenty-four.

The eight teeth 151 to 158 are formed integrally with the core back 20 at equal angular intervals (in the present embodiment, 45° in the circumferential direction. The teeth 151 to 158 have the same shape as the teeth 21 to 25 of the first embodiment. That is, the first branched tooth portion 26a and the second branched tooth portion 26b that are the same as the first embodiment are provided at the distal end portion of each of the teeth 151 to 158. The proximal end portion of the teeth 151 to 158 that is radially inward of the branched tooth portions 26a, 26b is referred to as the inner winding portion 27. The width T1 of the branched tooth portions 26a, 26 is constant from the proximal end to the distal end. Also, the width T2 of the inner winding portion 27 is set to be greater than a value twice the width T1 of the branched tooth portions 26a, 26b. Furthermore, the extended portions 28 are integrally formed at the distal end portions of the pairs of branched tooth portions 26a, 26b of the teeth 151 to 158.

Also, the armature core 142 includes the inner slots 31 formed between the inner winding portions 27 of the circumferentially adjacent teeth 151 to 158, and the first and second outer slots 32a, 32b formed between the circumferentially adjacent branched tooth portions 26a, 26b. Since the armature core 142 of the present embodiment includes eight teeth 151 to 158, the armature core 142 includes eight inner slots 31, eight first outer slots 32a, and eight second outer slots 32b. Also, in the armature core 142, the inner slots 31 and the first outer slots 32a are formed at positions displaced in the circumferential direction, and each first outer slot 32a is located between the circumferentially adjacent inner slots 31.

As shown in FIGS. 10 and 11, the armature coils formed of the conducting wire 41 are wound around the armature core 142 configured as described above. The armature coils include eight inner layer coils 162a to 162h wound around the inner winding portions 27, which are the proximal end portions of the teeth 151 to 158, and eight outer layer coils 163a to 163h, which are wound around the branched tooth portions 26a, 26b. In FIG. 11, the inner layer coils 162a to 162h are shown by medium lines, and the outer layer coils 163a to 163h are shown by thick lines.

First, the inner layer coils 162a to 162h are wound around the inner winding portions 27 of the teeth 151 to 158 of the armature core 142 by concentrated winding. Thereafter, the outer layer coils 163a to 163h are wound around the circumferentially adjacent two branched tooth portions 26a, 26b of the circumferentially adjacent teeth 151 to 158 (that is, the first branched tooth portion 26a of one of the circumferentially adjacent two teeth and the second branched tooth portion 26b of the other tooth adjacent to the branched tooth portion 26a) by distributed winding. All the inner layer coils 162a to 162h are wound in the same directions, and the outer layer coils 163a to 163h are wound in the same direction as the inner layer coils 162a to 162h. Also, the previously wound inner layer coils 162a to 162h and the subsequently wound outer layer coils 163a to 163h are formed at positions displaced in the radial direction, and do not overlap in the axial direction. Furthermore, the circumferential center of the inner layer coils 162a to 162h and the circumferential center of the outer layer coils 163a to 163h are displaced from each other in the circumferential direction of the armature core 142, and are arranged alternately at equal angular intervals in the circumferential direction. Moreover, the number of turns of the inner layer coils 162a to 162h is greater than that of the outer layer coils 163a to 163h. The resistance value of the inner layer coils 162a to 162h is equalized with the resistance value of the outer layer coils 163a to 163h by setting the number of turns of the inner layer coils 162a to 162h to be greater than the number of turns of the outer layer coils 163a to 163h.

The winding start ends of the eight inner layer coils 162a to 162h are respectively connected to the every third one of the segments 16 (eight segments 16) arranged in the circumferential direction. The winding finish ends of the inner layer coils 162a to 162h are respectively connected to the winding start ends of the outer layer coils 163a to 163h located at a position advanced by approximately 120° from the associated one of the inner layer coils 162a to 162h in the circumferential direction (in FIG. 10, approximately 120° in the clockwise direction from each of the teeth). Thus, each of the inner layer coils 162a to 162h is connected in series with one of the outer layer coils 163a to 163h located at a position separate from the above one of the inner layer coils 162a to 162h by approximately 120° in the circumferential direction. Furthermore, the winding finish end of each of the outer layer coils 163a to 163h is connected to the segment 16 that is connected to the winding start end of one of the inner layer coils 162a to 162h that is wound around one of the teeth 151 to 158 that includes the first branched tooth portion 26a among the two branched tooth portions 26a, 26b around which the above-mentioned each of the outer layer coils 163a to 163h is wound. Thus, the winding start ends of the inner layer coils 162a to 162h and the winding finish ends of the outer layer coils 163a to 163h are connected to every third one of the segments 16 (eight segments 16) arranged in the circumferential direction (that is, the segments 16 of the segment numbers 2, 5, 8, 11, 14, 17, 20, 23).

In the armature 141 of the present embodiment, the inner layer coil and the outer layer coil connected in series (for example, the inner layer coil 162a and the outer layer coil 163c) are arranged at an interval close to 120°, which is the interval between the magnets having the same magnetic poles (the intervals between the south pole magnets 132a, 132c, 132e (or between the north pole magnets 132b, 132d, 132f)). FIG. 10 shows a center line X1, which extends through the circumferential center of the magnet 132a serving as the upper south pole, a center line X2, which extends through the circumferential center of the magnet 132c serving as the lower right south pole, a center line Y1, which extends through the circumferential center of the inner layer coil 162a, and a center line Y2, which extends through the circumferential center of the outer layer coil 163c.

As shown in FIG. 10, in the direct-current motor M3 of the present embodiment, the inner layer coils 162a to 162h are wound around the inner winding portions 27 of the teeth 151 to 158 by concentrated winding, and the inner layer coils 162a to 162h do not overlap each other in the axial direction at both axial ends of the armature core 142 as in the first embodiment. Although the outer layer coils 163a to 163h are wound around the circumferentially adjacent two branched tooth portions 26a, 26b, the circumferentially adjacent outer layer coils 163a to 163h do not overlap each other in the axial direction at both axial ends of the armature core 142 since the outer layer coils 163a to 163h are wound around the different branched tooth portions 26a, 26b. Furthermore, since the outer layer coils 163a to 163h are wound around the teeth 151 to 158 at positions radially outward of the inner layer coils 162a to 162h, the outer layer coils 163a to 163h are displaced from the inner layer coils 162a to 162h in the radial direction and do not overlap each other in the axial direction at both axial ends of the armature core 142. Thus, coil end portions 164 of the inner layer coils 162a to 162h (part of the inner layer coils 162a to 162h that project axially outward from the axial end face of the armature core 142) and coil end portions 165 of the outer layer coils 163a to 163h (part of the outer layer coils 163a to 163h that project axially outward from the axial end face of the armature core 142) do not overlap in the axial direction. This reduces the axial length of the coil end portions 164, 165.

Figure 12:
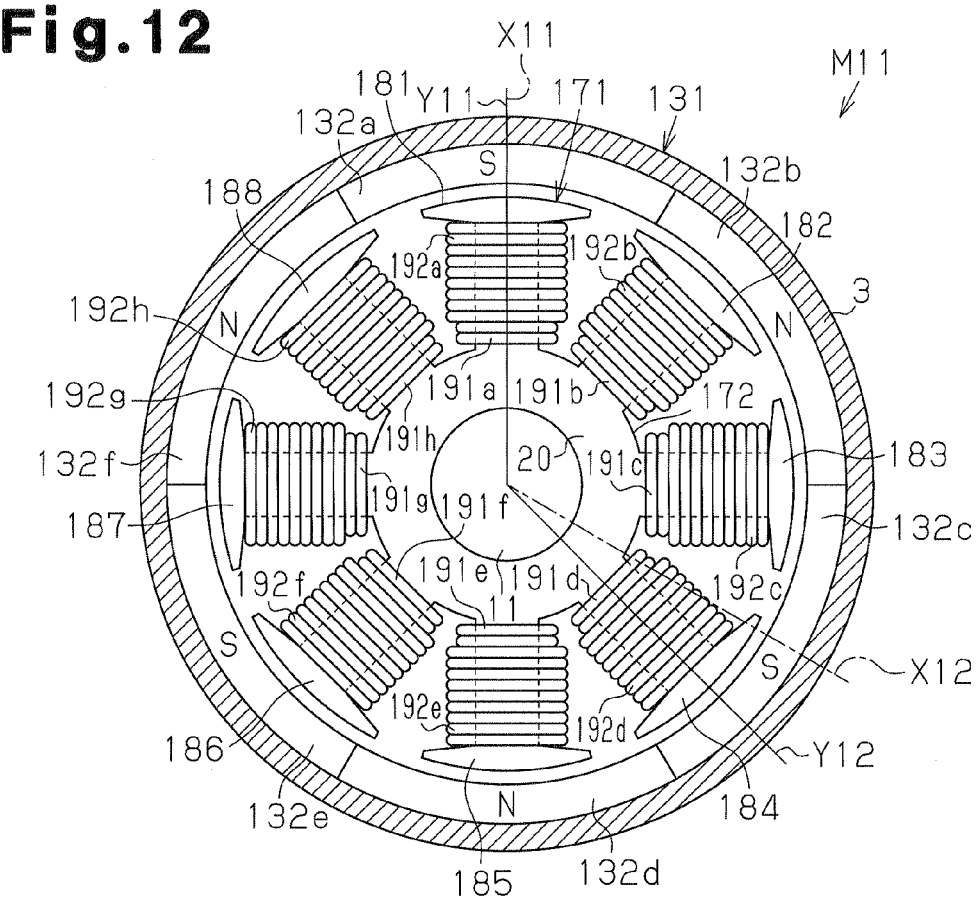
FIG. 12 is a cross-sectional view illustrating a direct-current motor including inner layer coils and outer layer coils wound by concentrated winding.
Figure 13:
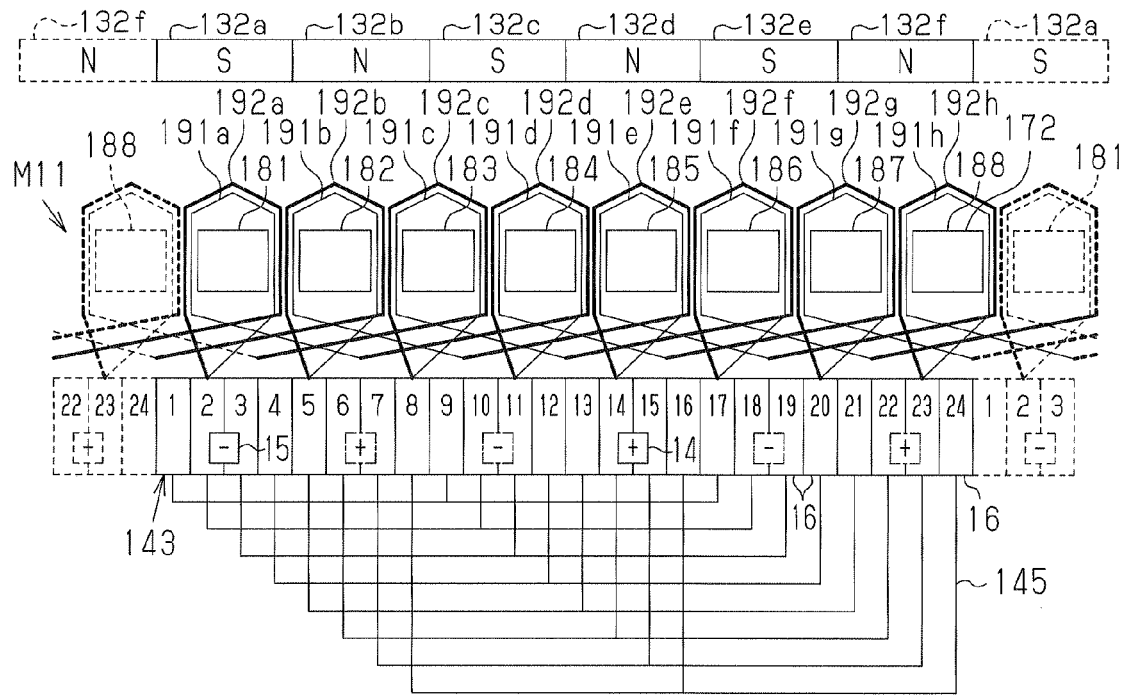
FIG. 13 is a diagrammatic developed view illustrating the direct-current motor of FIG. 12.

FIG. 12 shows a cross-sectional view of a direct-current motor M11 in which the inner layer coils and the outer layer coils are both wound by concentrated winding. FIG. 13 shows a diagrammatic developed view of the direct-current motor M11. In the direct-current motor M11 shown in FIGS. 12 and 13, the same reference numerals are given to those components that are the same as the corresponding components of the direct-current motor M3 of the present embodiment, and detailed explanations are omitted.

As shown in FIGS. 12 and 13, an armature core 172 of an armature 171 in the direct-current motor M11 includes eight teeth 181 to 188, which extend radially outward from the outer circumferential surface of the tube-like core back 20 in a radial pattern. Inner layer coils 191a to 191h are wound around the proximal end portions of the teeth 181 to 188, and outer layer coils 192a to 192h are wound around the distal end portions of the teeth 181 to 188. The winding start ends of the eight inner layer coils 191a to 191h are respectively connected to every third one the segments 16 (eight segments 16) arranged in the circumferential direction, and the winding finish ends of the inner layer coils 191a to 191h are respectively connected to the winding start ends of the outer layer coils 192a to 192h arranged at a position advanced by 120° from the associated one of the inner layer coils 191a to 191h in the circumferential direction. Thus, each of the inner layer coils 191a to 191h is connected in series with one of the outer layer coils 192a to 192h located at a position separate from the above one of the inner layer coils 191a to 191h by 120° in the circumferential direction. Furthermore, the winding finish end of each of the outer layer coils 192a to 192h is connected to the segment 16 that is connected to the winding start end of one of the inner layer coils 191a to 191h that is wound around the same one of the teeth 151 to 158. Thus, the winding start ends of the inner layer coils 191a to 191h and the winding finish ends of the outer layer coil 192a to 192h are connected to every third one of the segments 16 (eight segments 16) arranged in the circumferential direction (that is, the segments 16 of the segment numbers 2, 5, 8, 11, 14, 17, 20, 23).

In the direct-current motor M11, the positive brush 14 is arranged at a position corresponding to the circumferential center of the north pole magnet 132d, and the negative brush 15 is arranged at a position corresponding to the circumferential center of the south pole magnet 132a. Furthermore, three segments 16 arranged at intervals of 120° are short-circuited to one another by the short-circuiting members 145 and have the same electric potential. Thus, when arranged at the position where the circumferential center of the inner layer coils 191a to 191h match the circumferential center of the magnets 132a to 132f, the inner layer coils 191a to 191h are rectified such that the direction of current flow changes. That is, two of the inner layer coils 191a to 191h that face each other in the radial direction are rectified.

It is known in general that, in a direct-current motor in which rectification is performed at two locations that face each other in the radial direction, magnetic excitation force generated by current fluctuation tends to concentrate at two locations corresponding to the two armature coils that are being rectified. It is also known that, when the armature coil that is being rectified is connected in series with the subsequently rectified armature coil, the magnetic excitation force is distributed and vibration of the armature is reduced. In the direct-current motor M11 shown in FIG. 12, the inner layer coil 191a that is being rectified is connected in series with the outer layer coil 192d that is rectified subsequent to the inner layer coil 191a so that vibration of the armature 171 is reduced.

However, since the number N of the teeth 181 to 188 of the direct-current motor M11 is eight, the angle between the tooth 181 around which the inner layer coil 191a that is being rectified is wound and the tooth 184 around which the outer layer coil 192d connected in series with the inner layer coil 191a is wound is 135° in FIG. 12. Thus, the angle between a center line Y11 that passes through the circumferential center of the inner layer coil 191a and the center line Y12 that passes through the circumferential center of the outer layer 192d is 135°. Furthermore, the angle between the south pole magnet 132a that radially faces the inner layer coil 191a and the south pole magnet 132c that radially faces the outer layer coil 192d (that is, the angle between a center line X11 that passes through the circumferential center of the magnet 132a and a center line X12 that passes through the circumferential center of the magnet 132c) is 120°. Thus, the circumferential center of the subsequently rectified outer layer coil 192d that is connected in series with the inner layer coil 191a that is being rectified is displaced from the circumferential center of the south pole magnet 132c that radially faces the outer layer coil 192d. This reduces vibration reduction effect in the direct-current motor M11.

However, in the direct-current motor M3 of the present embodiment, the pair of branched tooth portions 26a, 26b, which are bifurcated to separate from each other in the circumferential direction, are provided at the distal end portion of each of the teeth 151 to 158 as shown in FIG. 10. Since the outer layer coils 163a to 163h are respectively wound around the branched tooth portions 26a, 26b to extend over two circumferentially adjacent teeth, the outer layer coils 163a to 163h are displaced from the inner layer coils 162a to 162h in the circumferential direction. Thus, for example, the circumferential center of the outer layer coil 163c that is connected in series with the inner layer coil 162a that is being rectified and is to be subsequently rectified is located between the tooth 153 and the tooth 154, since the outer layer coil 163c is wound around the second branched tooth portion 26b of the tooth 153 and the first branched tooth portion 26a of the tooth 154 as shown in FIG. 10.

Thus, the circumferential center of the outer layer coil 163c in the direct-current motor M3 approaches the circumferential center of the radially facing south pole magnet 132c as compared to the circumferential center of the outer layer coil 192d of the direct-current motor M11 shown in FIG. 12. As a result, the direct-current motor M3 of the present embodiment further reduces vibration of the rotary shaft 11 of the armature 141 compared to the direct-current motor M11.

As described above, the present embodiment has the following advantages in addition to the advantages (1) to (9) of the first embodiment.

(12) In the direct-current motor M3 of the present embodiment, the number P of the magnetic poles is six, the number N of the teeth 151 to 158 is eight, and the number S of the segments is twenty-four. Thus, radial force that acts on the armature core 142 is minimized (Japanese Laid-Open Patent Publication Nos. 2004-88916 and 2003-259582), and vibration in the direct-current motor M3 is further reduced during activation of the direct-current motor M3.

(13) Since magnetic excitation force generated by current fluctuation is distributed to four locations, vibration of the armature 141 during rectification is further reduced. Also, since the deformation mode of the yoke housing 3 is a deformation mode of a higher level than a secondary mode, resonance caused by vibration of the armature 141 is prevented from being generated in the yoke housing 3.

A fourth embodiment of the present invention will now be described with reference to the drawings. In the present embodiment, the same reference numerals are given to those components that are the same as the corresponding components of the first to third embodiments, and detailed explanations are omitted.

Figure 14:
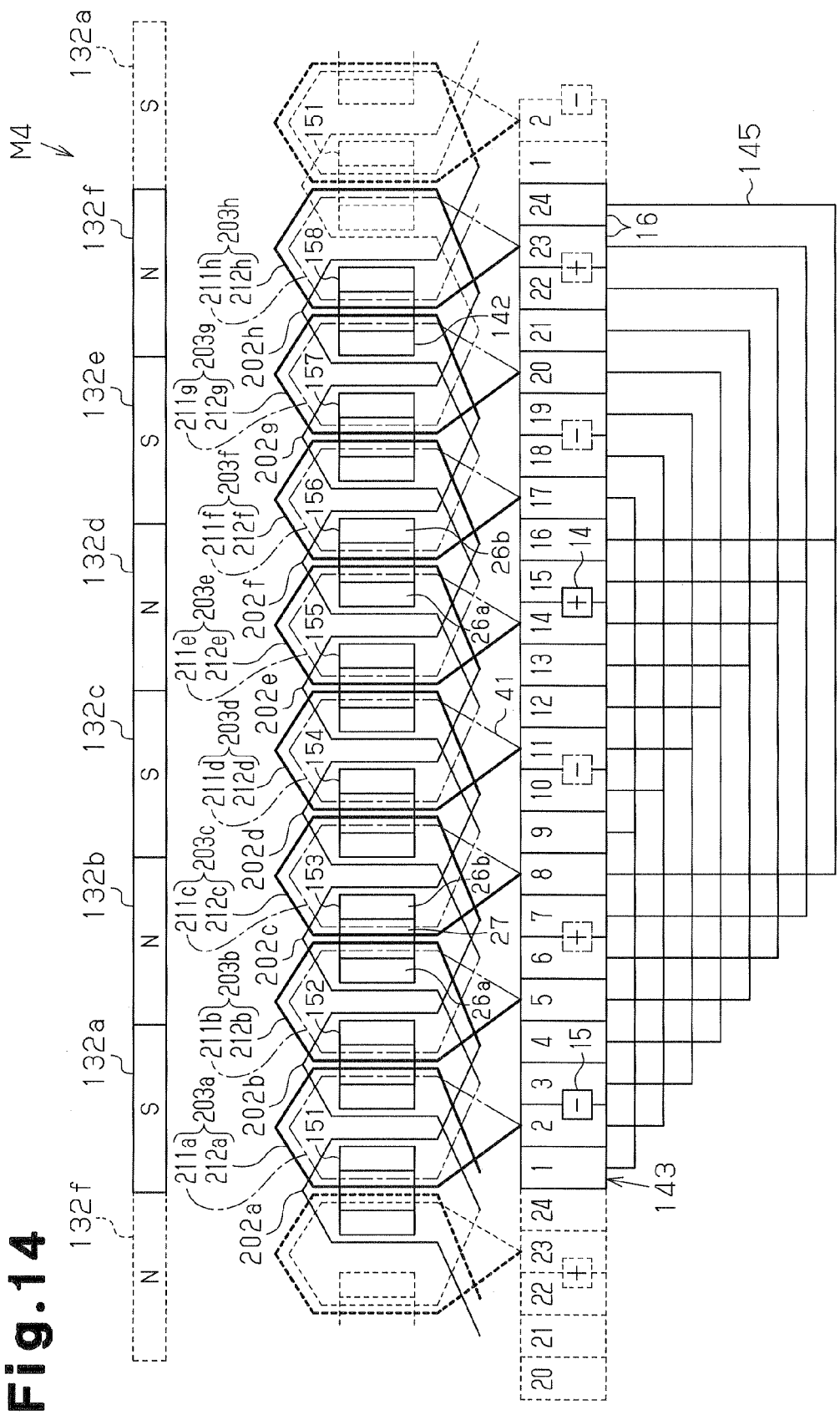
FIG. 14 is a diagrammatic developed view illustrating a direct-current motor according to a fourth embodiment of the present invention.

FIG. 14 shows a diagrammatic developed view of the direct-current motor M4. The direct-current motor M4 differs from the direct-current motor M3 of the third embodiment in the structure of outer layer coils 203a to 203h in the armature 201.

Eight inner layer coils 202a to 202h and eight outer layer coils 203a to 203h are wound around the armature core 142 as in the third embodiment. The outer layer coils 203a to 203h that are wound around the circumferentially adjacent two branched tooth portions 26a, 26b of the circumferentially adjacent teeth include inner coil portions 211a to 211h that are wound around the proximal end of the branched tooth portions 26a, 26b and outer coil portions 212a to 212h that are wound around the distal end of the branched tooth portions 26a, 26b. In FIG. 14, the inner layer coils 202a to 202h are shown by medium lines, the inner coil portions 211a to 211h are shown by alternate long and short dash lines, and the outer coil portions 212a to 212h are shown by thick lines. Also, the inner layer coils 202a to 202h, the inner coil portions 211a to 211h, and the outer coil portions 212a to 212h are simplified in the drawing.

As shown in FIG. 14, the inner layer coils 202a to 202h are first wound around the inner winding portions 27 of the teeth 151 to 158 of the armature core 142 by concentrated winding. All the inner layer coils 202a to 202h are wound in the same directions. Thereafter, the inner coil portions 211a to 211h are wound around the proximal end portions of the circumferentially adjacent two branched tooth portions 26a, 26b of the circumferentially adjacent teeth 151 to 158 (that is, the first branched tooth portion 26a of one of the circumferentially adjacent two teeth and the second branched tooth portion 26b of the other tooth that is adjacent to the branched tooth portion 26a) by distributed winding. The inner coil portions 211a to 211h are wound in the reverse direction to the inner layer coils 202a to 202h. Subsequently, the outer coil portions 212a to 212h are wound around the distal end portions of the branched tooth portions 26a, 26b around which the inner coil portions 211a to 211h are wound by distributed winding. At this time, the outer coil portions 212a to 212h are wound in the same direction as the inner coil portions 211a to 211h (that is, in the reverse direction to the inner layer coils 202a to 202h). The previously wound inner layer coils 202a to 202h and the subsequently wound outer layer coils 203a to 203h (that is, the inner coil portions 211a to 211h and the outer coil portions 212a to 212h) are displaced in the radial direction from each other, and do not overlap in the axial direction. Furthermore, the circumferential center of the inner layer coils 202a to 202h and the circumferential center of the outer layer coils 203a to 203h are displaced from each other in the circumferential direction of the armature core 142, and are arranged alternately in the circumferential direction at equal angular intervals in the circumferential direction. Also, the electric resistance of each of the inner layer coils 202a to 202h is equal to the sum of the electric resistance of one of the inner coil portions 211a to 211h and the electric resistance of one of the outer coil portions 212a to 212h.

The winding start end of each of the inner coil portions 211a to 211h is connected to every third one the segments 16 arranged in the circumferential direction, and the winding finish end of each of the inner coil portions 211a to 211h is connected to the winding start end of one of the inner layer coils 202a to 202h located at a position separate from the associated one of the inner coil portions 211a to 211h by the distance equal to the distance between the circumferentially adjacent magnets 132a to 132f (that is, approximately 60°. The winding finish end of each of the inner layer coils 202a to 202h is connected to the winding start end of one of the outer coil portions 212a to 212h located at a position separate from the associated one of the inner layer coils 202a to 202h by approximately 60°. The winding finish end of each of the outer coil portions 212a to 212h is connected to the segment 16 to which the winding start end of one of the inner coil portions 211a to 211h that is wound around the same branched tooth portions 26a, 26b as the associated one of the outer coil portions 212a to 212h is connected. Thus, the winding start end of one of the inner coil portions 211a to 211h and the winding finish end of one of the outer coil portions 212a to 212h are connected to every third one of the segments 16 (eight segments 16) arranged in the circumferential direction (that is, the segments 16 of the segment numbers 2, 5, 8, 11, 14, 17, 20, 23).

As described above, three coils are connected in series in the armature 201 of the present embodiment. The three coils are one of the inner layer coils 202a to 202h, one of the inner coil portions 211a to 211h that is wound around one of the teeth located on both circumferential sides of the associated one of the teeth 151 to 158 around which the above-mentioned one of the inner layer coils 202a to 202h is wound, and one of the outer coil portions 212a to 212h that is wound around the other one of the teeth.

The three coils connected in series are arranged at intervals that are substantially the same as the intervals between the circumferentially adjacent magnets 132a to 132f (that is, approximately 60°). Thus, in the direct-current motor M4, magnetic excitation force that acts on the armature 201 is distributed to six locations when rectifying the current supplied to the inner layer coils 202a to 202h, the inner coil portions 211a to 211h, and the outer coil portions 212a to 212h.

As described above, the present embodiment has the following advantages in addition to the advantages (1) to (3), and (6) to (9) of the first embodiment and the advantage (12) of the third embodiment.

(14) The inner layer coils 202a to 202h are wound around the inner winding portions 27 at positions radially inward of the outer layer coils 203a to 203h by concentrated winding. The outer layer coils 203a to 203h are wound around the two circumferentially adjacent branched tooth portions 26a, 26b at positions radially outward of the inner layer coils 202a to 202h by distributed winding. Thus, the outer layer coils 203a to 203h are longer than the inner layer coils 202a to 202h in the circumferential direction. Thus, when the resistance value of the inner layer coils 202a to 202h and that of the outer layer coils 203a to 203h are equalized as in the present embodiment, the current value of the inner layer coils 202a to 202h and the current value of the outer layer coils 203a to 203h are equalized, thereby stabilizing torque generated in the direct-current motor M4.

(15) Since the magnetic excitation force caused by the current fluctuation is distributed to six locations, vibration of the armature 201 during rectification is further reduced. Also, the deformation mode of the yoke housing 3 is set to a deformation mode of a higher level than the secondary mode. This facilitates preventing the resonance of the yoke housing 3.

A fifth embodiment of the present invention will now be described with reference to the drawings. In the present embodiment, the same reference numerals are given to those components that are the same as the corresponding components of the first to fourth embodiments and detailed explanations are omitted.

Figure 16:
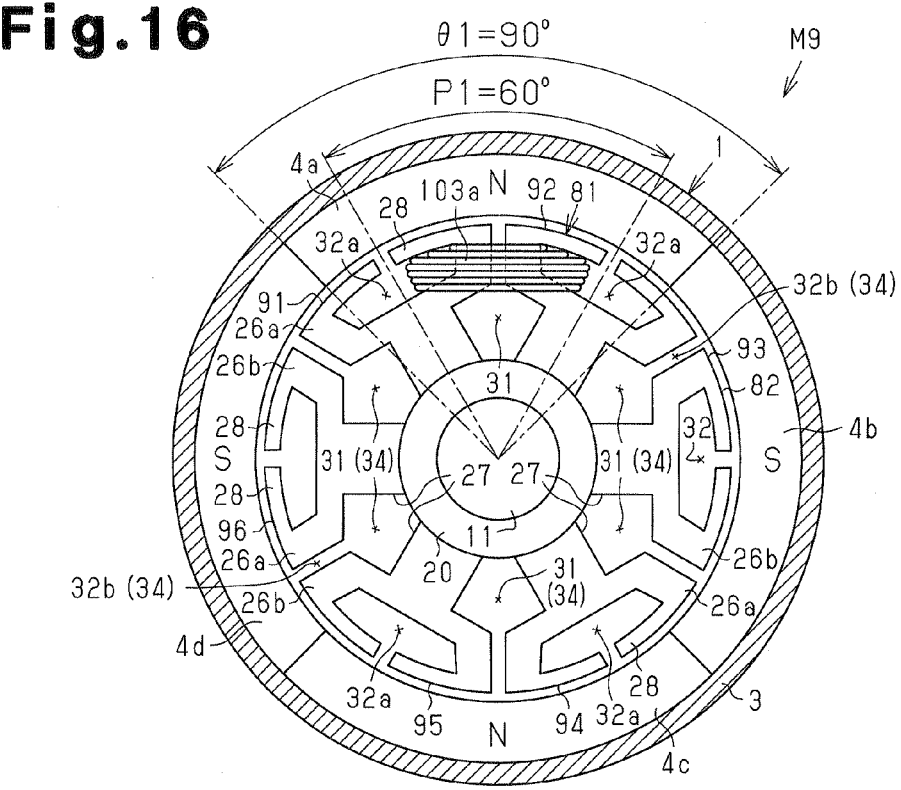
FIG. 16 is a cross-sectional view illustrating the direct-current motor of FIG. 15.

FIG. 15 shows a diagrammatic developed view of the direct-current motor M9 of the present embodiment. The direct-current motor M9 of the present embodiment has almost the same structure as the direct-current motor M2 of the second embodiment. More specifically, the direct-current motor M9 includes the stator 1 and the armature 81, which is rotatably arranged radially inward of the stator 1 as shown in FIG. 16. Since four magnets 4a to 4d are secured to the inner circumferential surface of the yoke housing 3 of the stator 1, the number P of the magnetic poles of the direct-current motor M9 is four. Also, the four magnets 4a to 4d are arranged at equal angular intervals in the circumferential direction, and the opening angle θ1 of the magnets 4a to 4d (the angle corresponding to the circumferential range of the magnets 4a to 4d with the center at the rotational center of the rotary shaft 11) is 90°.

The axial end portions of the rotary shaft 11, which forms the armature 81, are rotatably supported by the stator 1. The armature core 82 that is the same as the armature core 82 of the direct-current motor M2 according to the second embodiment is secured to the rotary shaft 11 to rotate integrally with the rotary shaft 11. The armature core 82 includes six teeth 91 to 96 each including the pair of branched tooth portions 26a, 26b at its distal end portion. Thus, the armature core 82 includes six inner slots 31 and six first and second outer slots 32a, 32b. Also, in the armature core 82, when each of the inner slots 31 and the associated one of the second outer slots 32b connected to the inner slot 31 are regarded as one slot (combined slot) 34, the armature core 82 includes six combined slots 34 (that is, the space between the circumferentially adjacent teeth 91 to 96) for permitting the conducting wire 41 to extend through to wind the inner layer coils 102a to 102f, and six first outer slots 32a (that is, the space between the pair of branched tooth portions 26a, 26b of each of the teeth 91 to 96) for permitting the conducting wire 41 to extend through to form the outer layer coils 103a to 103f. That is, the armature core 82 includes twelve slots through which the conducting wire 41 is actually inserted to wind the armature coils (that is, the inner layer coils 102a to 102f and the outer layer coils 103a to 103f). That is, the total number M of the slots of the armature core 82 is three times the number P (four) of the magnetic poles.

As shown in FIGS. 15 and 16, the inner layer coils 102a to 102f wound around the armature core 82 are wound around the inner winding portions 27, which are the proximal end portions of the teeth 91 to 96, by concentrated winding. Also, the outer layer coils 103a to 103f wound around the armature core 82 are wound over two circumferentially adjacent branched tooth portions 26a, 26b. Thus, the circumferentially adjacent outer layer coils 103a to 103f do not overlap each other in the axial direction at the axial ends of the armature core 82. Furthermore, since the outer layer coils 103a to 103f are wound around the teeth 91 to 96 at positions radially outward of the inner layer coils 102a to 102f, the outer layer coils 103a to 103f and the inner layer coils 102a to 102f are radially displaced and do not overlap each other in the axial direction at the axial ends of the armature core 82. Thus, the coil pitch P1 of the inner layer coils 102a to 102f and the outer layer coils 103a to 103f (the angle corresponding to the circumferential range of the coils with the center at the rotational center of the rotary shaft 11) is 60°. FIG. 16 shows only one of the outer layer coils 103a as a representative.

Figure 17:
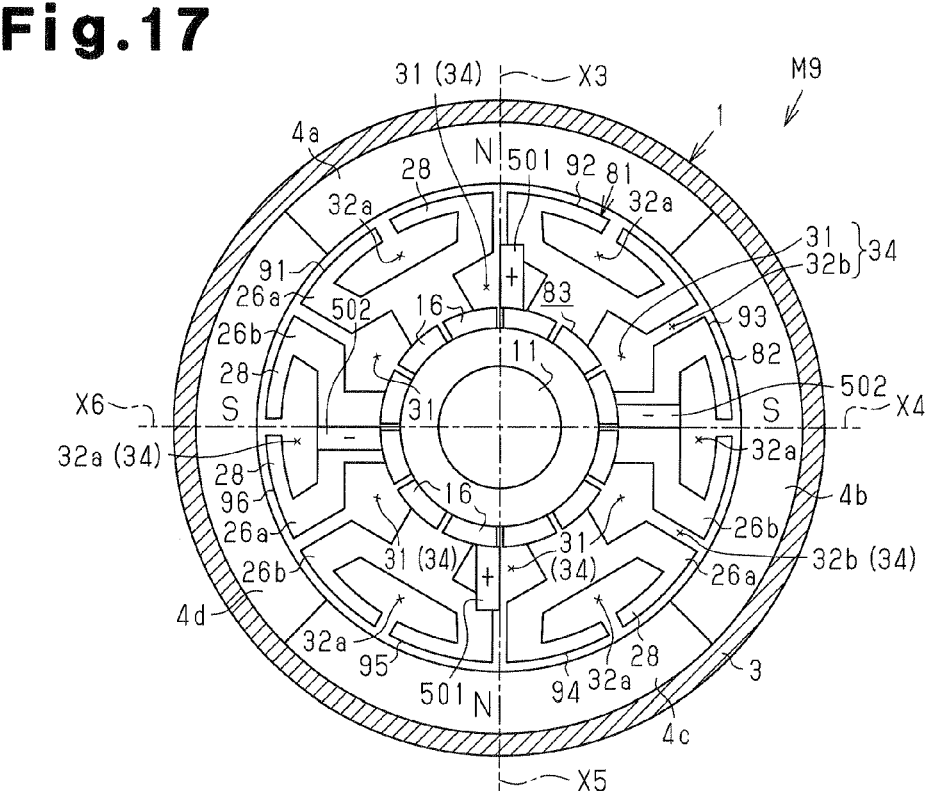
FIG. 17 is a cross-sectional view illustrating the direct-current motor of FIG. 15.

Also, as shown in FIGS. 15 and 17, the commutator 83, which is secured to the rotary shaft 11 and forms the armature 81, includes twelve segments 16 arranged in the circumferential direction. The number S of the segments 16 is three times the number P (four) of the magnetic poles. One end of one of the inner layer coils 102a to 102f wound around one of the inner winding portions 27 of the armature core 82 is connected to each segment 16, and one end of one of the outer layer coils 103a to 103f wound around the associated branched tooth portions 26a, 26b is connected to each segment 16.

Two positive brushes 501 and two negative brushes 502 are arranged on the outer circumference of the commutator 83. Substantially square column like positive brushes 501 and the negative brushes 502 are alternately arranged in the circumferential direction. The distal end surfaces of the positive brushes 501 and the negative brushes 502 that face the commutator 83 are slidably pressed against the segments 16 provided on the outer circumference of the commutator 83. The distal end surfaces of the positive brushes 501 and negative brushes 502 are sliding portions that slide along the segments 16 of the commutator 83.

The circumferential width w1 of the positive brushes 501 and the negative brushes 502 is set to half the circumferential width w2 of the segments 16. The positive brushes 501 are arranged at positions corresponding to substantially the circumferential center of the north pole magnets 4a, 4c, and the negative brushes 502 are arranged at positions corresponding to substantially the circumferential center of the south pole magnets 4b, 4d.

In general, the positive brushes and the negative brushes are arranged at normal positions where the circumferential center of each brush is located on the magnetic pole center line of the associated magnet (a straight line extending radially through the circumferential center of each magnet). In the direct-current motor M9 of the present embodiment, however, the positive brushes 501 and the negative brushes 502 are displaced in the opposite directions to each other along the circumferential direction from the positions (normal positions) on magnetic pole center lines X3 to X6 that pass through the circumferential center of the magnets 4a to 4d. That is, the positive brush 501 arranged corresponding to the north pole magnet 4a at the upper section of FIG. 17 is displaced in the clockwise direction from the position on the magnetic pole center line X3 of the magnet 4a (normal position), and the positive brush 501 arranged corresponding to the north pole magnet 4c at the lower section of FIG. 17 is displaced in the clockwise direction from the position on the magnetic pole center line X5 of the magnet 4c (normal position). The end surfaces on the counter-clockwise side of the two positive brushes 501 are respectively located on the magnetic pole center lines X3, X5. The negative brush 502 arranged corresponding to the south pole magnet 4b on the right side in FIG. 17 is displaced in the counter-clockwise direction from the position on the magnetic pole center line X4 of the magnet 4b (normal position), and the negative brush 502 arranged corresponding to the south pole magnet 4d on the left side in FIG. 17 is displaced in the counter-clockwise direction from the position on the magnetic pole center line X6 of the magnet 4d (normal position). The end surfaces on the clockwise side of the two negative brushes 502 are respectively located on the magnetic pole center lines X4, X6. Thus, when current is supplied to the armature 81 through the positive brushes 501 and the negative brushes 502 so that the armature 81 is rotated, rectification is performed alternately in the positive brushes 501 and the negative brushes 502 according to the rotation of the armature 81.

Figure 18:
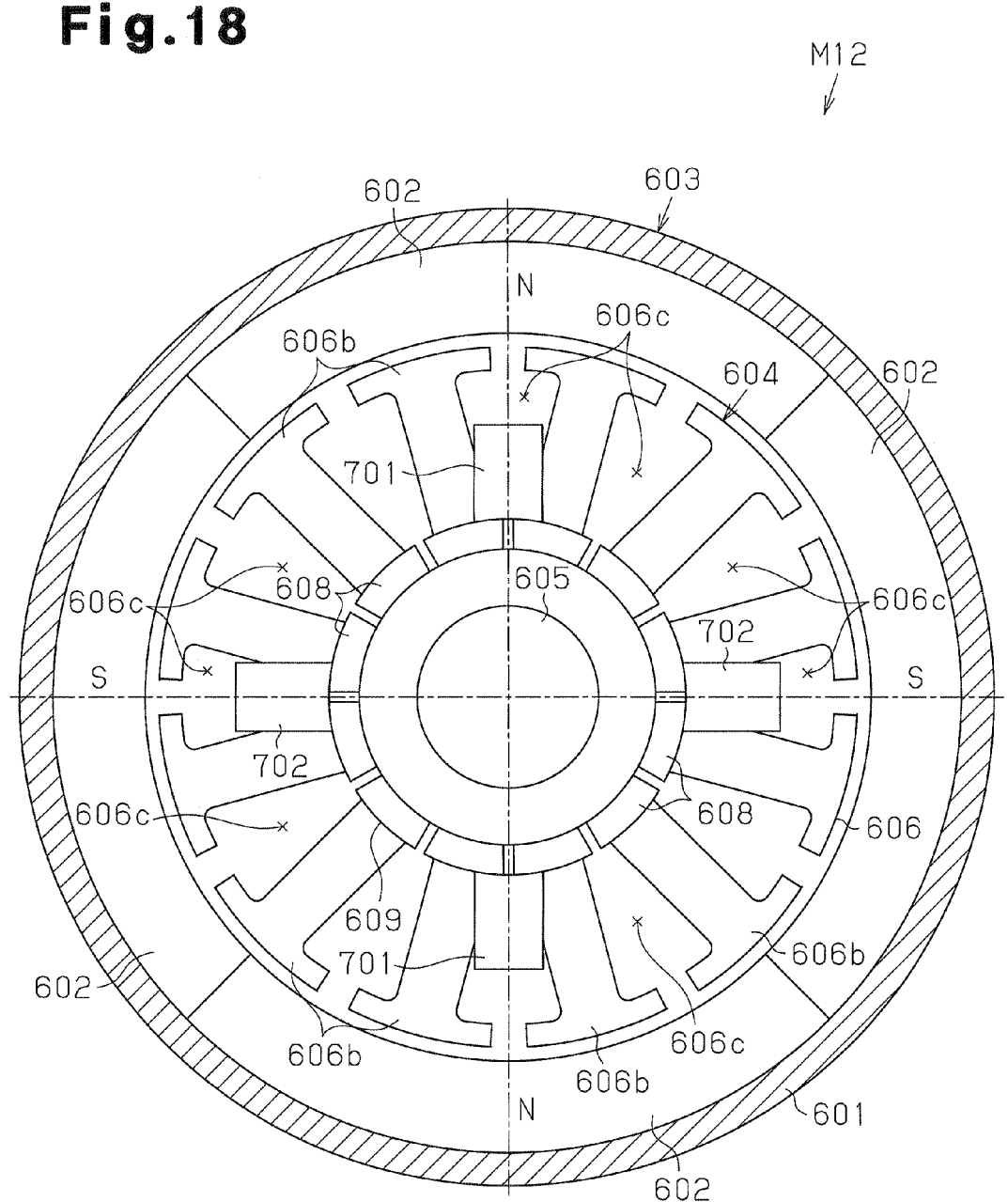
FIG. 18 is a cross-sectional view illustrating a conventional direct-current motor.
Figure 19:
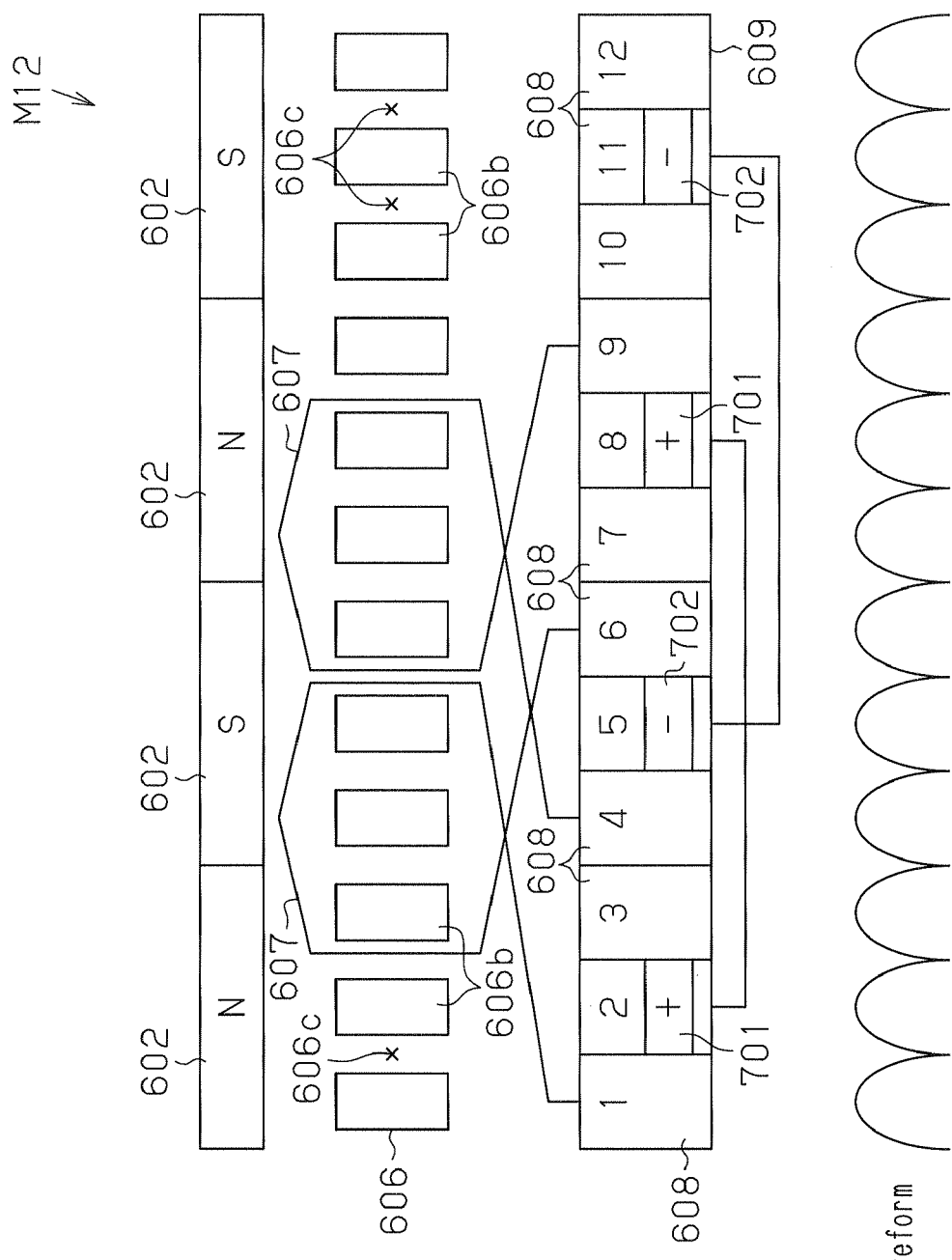
FIG. 19 is a diagrammatic developed view illustrating the conventional direct-current motor.
Figures 20, 21:
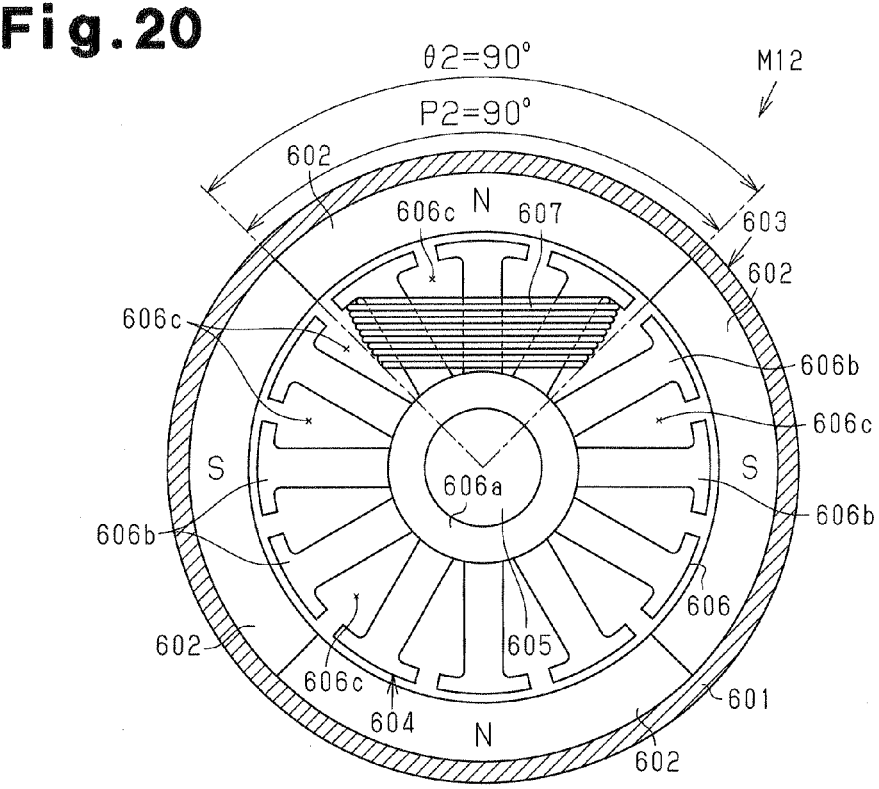
FIG. 20 is a cross-sectional view illustrating the conventional direct-current motor of FIG. 19.
FIG. 21 is a diagram for explaining the relationship between the total number of slots and the number of magnetic poles with respect to problems.

FIGS. 18 and 20 are schematic views of the conventional direct-current motor M12 in which the armature coils are wound by distributed winding. FIG. 19 shows a diagrammatic developed view of the direct-current motor M12. As shown in FIGS. 18 to 20, the direct-current motor M12 includes a stator 603, which includes four magnets 602 attached to the inner circumferential surface of a substantially cylindrical yoke housing 601, and an armature 604, which is arranged radially inward of the stator 603 to be rotatable with respect to the stator 603. An armature core 606, which is secured to a rotary shaft 605 of the armature 604, includes a cylindrical core back 606a, which is secured to the outer circumferential surface of the rotary shaft 605, and twelve teeth 606b, which extend radially outward from the outer circumferential surface of the core back 606a in a radial pattern. The core back 606a and the teeth 606b are integrally formed. The armature core 606 includes twelve slots 606c formed between the circumferentially adjacent teeth 606b. Twelve armature coils 607 are wound around the armature core 606 by distributed winding. Each armature coil 607 is wound around three of the teeth 606b to extend over a number of slots. FIG. 19 shows only two of the twelve armature coils 607 as a representative. FIG. 20 shows only one of the twelve armature coils 607 as a representative. Also, a commutator 609, which includes twelve segments 608 arranged along the circumferential direction, is secured to the rotary shaft 605. One end of each of two armature coils 607 is connected to each segment 608. Furthermore, two positive brushes 701 and two negative brushes 702 are arranged around the commutator 609 for supplying current to the armature coils 607. The circumferential width of the positive brushes 701 and the negative brushes 702 is equal to the circumferential width of the segments 608. The distal end faces of the positive brushes 701 and negative brushes 702 are slidably pressed against the segments 608 of the commutator 609. The positive brushes 701 and the negative brushes 702 are arranged alternately in the circumferential direction, and are arranged at positions (normal positions) where the circumferential center of each of the brushes 701, 702 is arranged on the magnetic pole center line that passes through the circumferential center of each of the four magnets 602 (shown by alternate long and short dash line in FIG. 18).

Figure 22A:
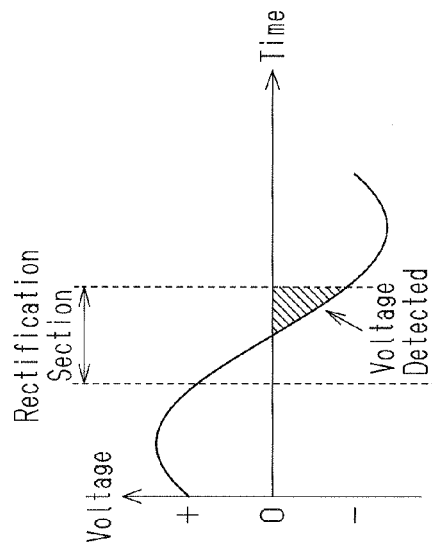
FIG. 22A is a graph showing the relationship between time and induced voltage in the direct-current motor of FIG. 15.
Figure 23A:
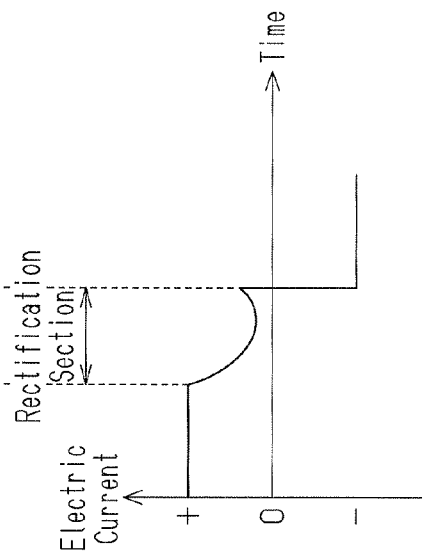
FIG. 23A is a graph showing the relationship between time and induced voltage in the conventional direct-current motor.
Figure 22B:
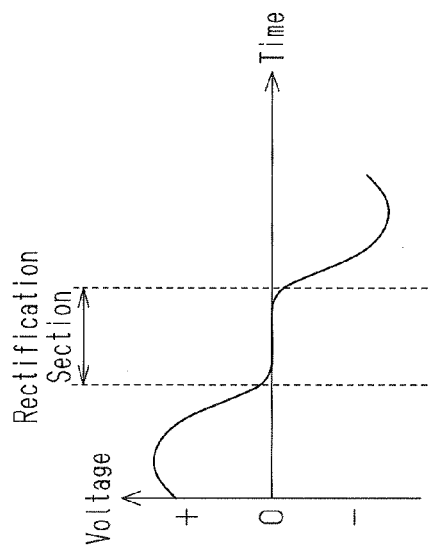
FIG. 22B is a graph showing the relationship between time and current supplied to the armature coils in the direct-current motor of FIG. 15.
Figure 23B:
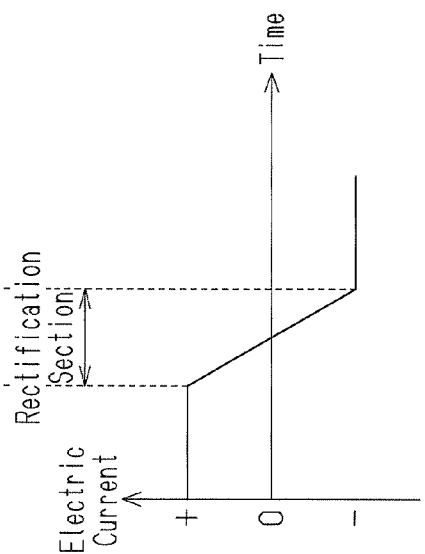
FIG. 23B is a graph showing the relationship between time and current supplied to the armature coils in the conventional direct-current motor.

In such a conventional direct-current motor M12, the number of the slots and the number of the armature coils are twelve as in the direct-current motor M9 of the present embodiment. As shown in FIG. 20, the opening angle 82 of the magnets 602 of the direct-current motor M12 is 90° like the opening angle 81 of the magnets 4a to 4d of the direct-current motor M9. In the direct-current motor M12, since each armature coil 607 is wound around three of the teeth 606b, the coil pitch P2 of the armature coils 607 (the angle corresponding to the circumferential range of the coils with the center at the rotational center of the rotary shaft 11) is 90°. However, the direct-current motor M9 of the present embodiment has a smaller coil pitch P1 (see FIG. 16) compared to the conventional direct-current motor M12 including the armature coils 607 wound by distributed winding. In the conventional direct-current motor M12, induced voltage is generated in a rectification section as shown in FIG. 23A, and insufficient rectification is caused as shown in FIG. 23B. In the direct-current motor M9 of the present embodiment, however, generation of induced voltage is inhibited in the rectification section as shown in FIG. 22A, and as a result, generation of insufficient rectification is inhibited and rectification is performed in a suitable manner as shown in FIG. 22B.

Also, as shown in FIG. 21, when the total number M of the slots is divisible by the number P of the magnetic poles, rectification is simultaneously performed in the positive brushes and the negative brushes. Thus, the number of crests of the current ripple (current waveform) tends to be small, and the size of the current ripple tends to be large (fluctuation of current waveform is increased). When the current ripple is increased, vibration and noise of the direct-current motor during activation is increased.

In the direct-current motor M9 of the present embodiment (corresponding to the region surrounded by thick lines in FIG. 21), since the number P of the magnetic poles is four and the total number M of the slots is twelve, the total number M of the slots is divisible by the number P of the magnetic poles. However, in the direct-current motor M9 of the present embodiment, rectification is alternately performed in the positive brushes 501 and the negative brushes 502 since the positive brushes 501 and the negative brushes 502 are displaced in the opposite directions to each other along the circumferential direction from the positions (normal positions) on the magnetic pole center lines X3 to X6 that pass through the circumferential center of the magnets 4a to 4d. Thus, although the total number M of the slots is divisible by the number P of the magnetic poles, the variation amount of the current value is reduced and the current ripple is reduced in the direct-current motor M9 as compared to the conventional direct-current motor M12 as apparent from the current waveforms in FIGS. 15 and 19. This reduces vibration and noise during activation.

As described above, the present embodiment has the following advantages in addition to the advantages (1) to (3), and (7) to (10).

(16) Although the direct-current motor M9 is configured such that the sum of the combined slots 34 and the first outer slots 32a (that is, the total number M of the slots) is divisible by the number P of the magnetic poles, rectification performed by the positive brushes 501 and the rectification performed by the negative brushes 502 are alternately carried out. Thus, variation of current value during activation is reduced as compared to the conventional direct-current motor M12 in which rectification is simultaneously performed in the positive brushes 701 and the negative brushes 702. Accordingly, vibration and magnetic noise are reduced.

The embodiments of the present invention may be modified as follows.

Figure 24:
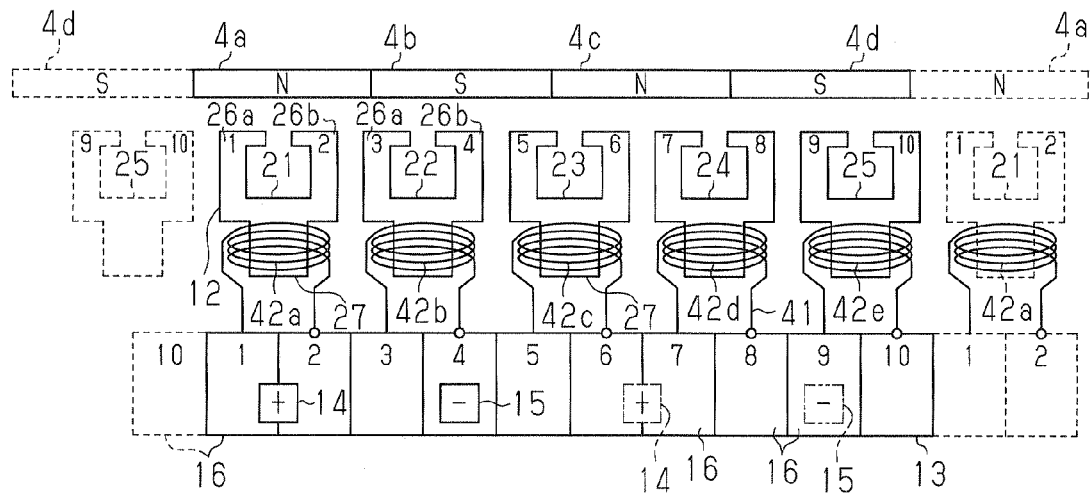
FIG. 24 is a developed view for explaining a method for winding the armature coils according to a modified embodiment.

In the first embodiment, the method for winding the inner layer coils 42a to 42e and the outer layer coils 43a to 43e is not limited to the method described in the first embodiment. For example, an inner layer coil winding process is first performed to form the inner layer coils 42a to 42e according to the method shown in FIGS. 24 to 27. In the inner layer coil winding process, non-illustrated nozzles (winding jigs) for supplying the conducting wires 41 around the armature core 12 are arranged, and the number of the nozzles is the same as the number of the teeth 21 to 25 (five). Then, as shown in FIG. 24, the conducting wires 41 supplied from the five nozzles are connected to every second one of the segments 16 (five segments 16) arranged in the circumferential direction. In FIG. 24, the starting positions of the inner layer coils 42a to 42e wound by the five nozzles are denoted by "○". Thereafter, the conducting wires 41 supplied from the five nozzles are simultaneously wound around the respective inner winding portions 27 to form the inner layer coils 42a to 42e. Subsequently, the winding finish ends of the inner layer coils 42a to 42e are connected to the segments 16 that are different from the segments 16 at the starting position. The winding finish end of each of the inner layer coils 42a to 42e is connected to the segment 16 that is adjacent to the segment 16 to which the winding start end of the above-mentioned one of the inner layer coils 42a to 42e is connected. That is, the winding finish ends of the inner layer coils 42a to 42e are connected to every second one of the segments 16 in the circumferential direction. More specifically, after connecting the conducting wire 41 to the segment 16 of the segment number 2, the first nozzle winds the conducting wire 41 around the inner winding portion 27 of the tooth 21 to form the inner layer coil 42a, and connects the winding finish end of the inner layer coil 42a to the segment 16 of the segment number 1. After connecting the conducting wire 41 to the segment 16 of the segment number 4, the second nozzle winds the conducting wire 41 around the inner winding portion 27 of the tooth 22 to form the inner layer coil 42b, and then connects the winding finish end of the inner layer coil 42b to the segment 16 of the segment number 3. After connecting the conducting wire 41 to the segment 16 of the segment number 6, the third nozzle winds the conducting wire 41 around the inner winding portion 27 of the tooth 23 to form the inner layer coil 42c, and then connects the winding finish end of the inner layer coil 42c to the segment 16 of the segment number 5. After connecting the conducting wire 41 to the segment 16 of the segment number 8, the fourth nozzle winds the conducting wire 41 around the inner winding portion 27 of the tooth 24 to form the inner layer coil 42d, and connects the winding finish end of the inner layer coil 42d to the segment 16 of the segment number 7. After connecting the conducting wire 41 to the segment 16 of the segment number 10, the fifth nozzle winds the conducting wire 41 around the inner winding portion 27 of the tooth 25 to form the inner layer coil 42e, and connects the winding finish end of the inner layer coil 42e to the segment 16 of the segment number 9.

Figure 25:
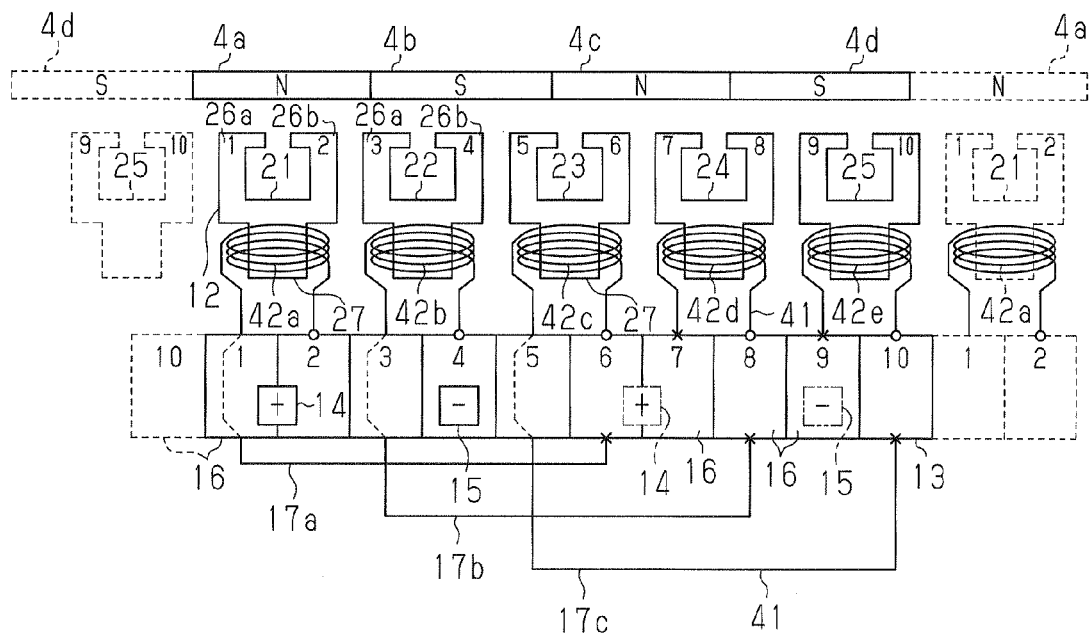
FIG. 25 is a developed view for explaining the method for winding the armature coils according to a modified embodiment.
Figure 26:
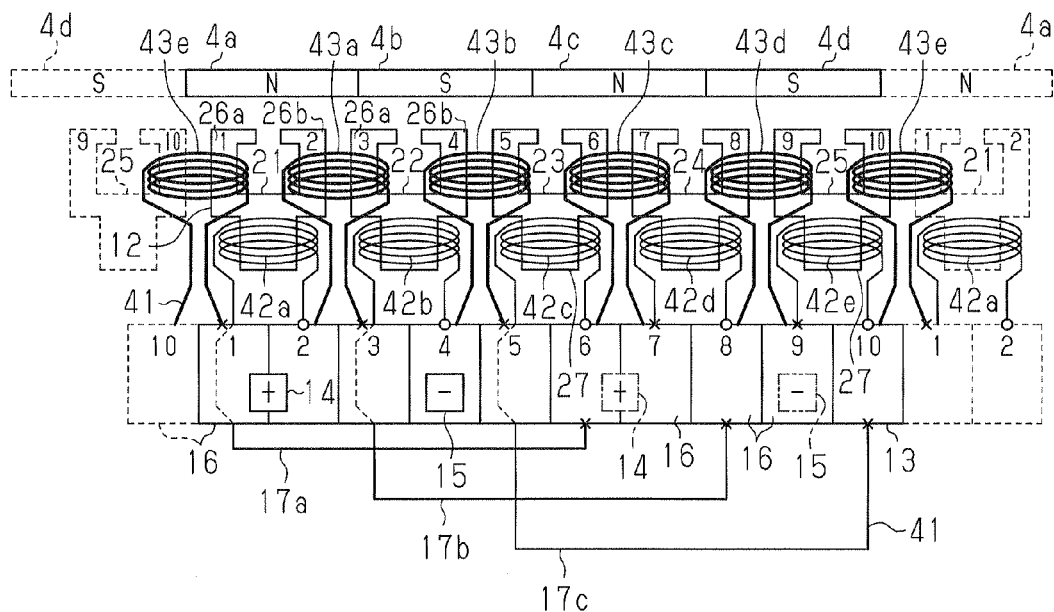
FIG. 26 is a developed view for explaining the method for winding the armature coils according to a modified embodiment.
Figure 27:
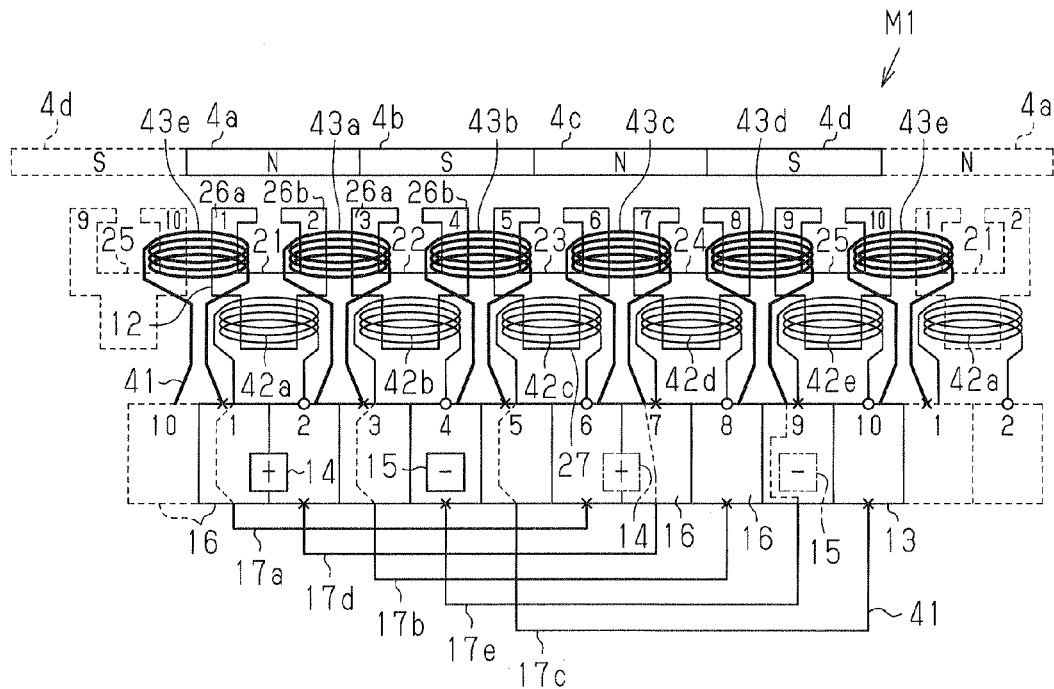
FIG. 27 is a developed view for explaining the method for winding the armature coils according to a modified embodiment.

Next, in a first cutting process, the winding finish end of the inner layer coil 42d connected to the segment 16 of the segment number 7 and the winding finish end of the inner layer coil 42e connected to the segment 16 of the segment number 9 are cut away from the corresponding segments 16 as shown in FIG. 25. In FIGS. 25 to 27, parts where the conducting wires 41 are cut away from the corresponding segments 16 are denoted by "×".

Then, in a first short-circuiting process, the first to third nozzles continuously supply conducting wires 41 from the winding finish ends of the inner layer coils 42a to 42c connected to the segments 16 of the segment numbers 1, 3, 5 to form short-circuit lines 17a to 17c. That is, the first nozzle passes the conducting wire 41 from the segment 16 of the segment number 1 to the segment 16 of the segment number 6 that is at a position separated by 180° to form the short-circuit line 17a. Then, after being connected to the segment 16 of the segment number 6, the conducting wire 41 is cut away from the associated segment 16. The second nozzle passes the conducting wire 41 from the segment 16 of the segment number 3 to the segment 16 of the segment number 8 that is at a position separated by 180° to form the short-circuit line 17b. Then, after being connected to the segment 16 of the segment number 8, the conducting wire 41 is cut away from the associated segment 16. The third nozzle passes the conducting wire 41 from the segment 16 of the segment number 5 to the segment 16 of the segment number 10 that is at a position separated by 180° to form the short-circuit line 17c. Then, after being connected to the segment 16 of the segment number 10, the conducting wire 41 is cut away from the associated segment 16. During the first short-circuiting process, the fourth and fifth nozzles are stopped.

Then, an outer layer coil winding process for forming the outer layer coils 43a to 43e is performed as shown in FIG. 26. In the outer layer coil winding process, the conducting wires 41 supplied from the five nozzles are first connected to every second one of the segments 16 (five segments 16) arranged in the circumferential direction. Thereafter, the five nozzles simultaneously wind the outer layer coils 43a to 43e over the circumferentially adjacent two branched tooth portions 26a, 26b. Subsequently, the winding finish ends of the outer layer coils 43a to 43e are connected to the segments 16 that are different from the segments 16 to which the winding start ends are connected. The winding finish end of each of the outer layer coils 43a to 43e is connected to the segment 16 that is adjacent to the segment 16 to which the winding start end is connected. That is, the winding finish ends of the outer layer coils 43a to 43e are connected to every second one of the segments 16 in the circumferential direction. More specifically, after connecting the conducting wire 41 to the segment 16 of the segment number 2, the first nozzle winds the conducting wire 41 around the second branched tooth portion 26b of the tooth 21 and the first branched tooth portion 26a of the tooth 22 to form the outer layer coil 43a, and then connects the winding finish end of the outer layer coil 43a to the segment 16 of the segment number 3. After connecting the conducting wire 41 to the segment 16 of the segment number 4, the second nozzle winds the conducting wire 41 around the second branched tooth portion 26b of the tooth 22 and the first branched tooth portion 26a of the tooth 23 to form the outer layer coil 43b, and then connects the winding finish end of the outer layer coil 43b to the segment 16 of the segment number 5. After connecting the conducting wire 41 to the segment 16 of the segment number 6, the third nozzle winds the conducting wire 41 around the second branched tooth portion 26b of the tooth 23 and the first branched tooth portion 26a of the tooth 24 to form the outer layer coil 43c, and then connects the winding finish end of the outer layer coil 43c to the segment 16 of the segment number 7. After connecting the conducting wire 41 to the segment 16 of the segment number 8, the fourth nozzle winds the conducting wire 41 around the second branched tooth portion 26b of the tooth 24 and the first branched tooth portion 26a of the tooth 25 to form the outer layer coil 43d, and then connects the winding finish end of the outer layer coil 43d to the segment 16 of the segment number 9. After connecting the conducting wire 41 to the segment 16 of the segment number 10, the fifth nozzle winds the conducting wire 41 around the second branched tooth portion 26b of the tooth 25 and the first branched tooth portion 26a of the tooth 21 to form the outer layer coil 43e, and connects the winding finish end of the outer layer coil 43e to the segment 16 of the segment number 1.

The winding finish end of the outer layer coil 43e connected to the segment 16 of the segment number 1, the winding finish end of the outer layer coil 43a connected to the segment 16 of the segment number 3, and the winding finish end of the outer layer coil 43b connected to the segment 16 of the segment number 5 are then cut away from the corresponding segments 16 in a second cutting process.

Then, the third and fourth nozzles continuously supply the conducting wires 41 from the winding finish ends of the outer layer coils 43c, 43d connected to the segments 16 of the segment numbers 7, 9 to form the short-circuit lines 17d, 17e in a second short-circuiting process as shown in FIG. 27. That is, the third nozzle passes the conducting wire 41 from the segment 16 of the segment number 7 to the segment 16 of the segment number 2 that is at a position separated by 180° to form the short-circuit line 17d. Subsequently, after being connected to the segment 16 of the segment number 2, the conducting wire 41 is cut away from the segment 16. The fourth nozzle passes the conducting wire 41 from the segment 16 of the segment number 9 to the segment 16 of the segment number 4 that is at a position separated by 180° to form the short-circuit line 17e. Then, after being connected to the segment 16 of the segment number 4, the conducting wire 41 is cut away from the segment 16. During the second short-circuiting process, the first, second, and fifth nozzles are stopped. After the second short-circuiting process is completed, winding of the armature coils to the armature core 12 is completed. The first cutting process, the first short-circuiting process, the second cutting process, and the second short-circuiting process correspond to the short-circuiting process.

In this manner, since all the inner layer coils 42a to 42e are simultaneously wound in the inner layer coil winding process, the time required for winding the inner layer coils 42a to 42e is reduced. Furthermore, since all the outer layer coils 43a to 43e are simultaneously wound in the outer layer coil winding process, the time required for winding the outer layer coils 43a to 43e is reduced. Thus, the time required for winding the armature coils around the armature core 12 is reduced, which improves the manufacturing speed of the direct-current motor M1. Also, the segments 16 are easily short-circuited since the short-circuit lines 17a to 17e, which short-circuit the segments 16 with each other, are formed by the conducting wires 41 like the inner layer coils 42a to 42e and the outer layer coils 43a to 43e. Furthermore, one of the short-circuit lines 17a to 17e is provided between the segments 16 that are short-circuited with each other. This saves the conducting wire 41 and reduces the manufacturing costs.

In the first cutting process and the second cutting process, half the winding finish ends may be cut away from the corresponding segments 16 among the winding finish ends of the inner layer coils 42a to 42e and the outer layer coils 43a to 43e connected to the segments 16. Then, in the first and second short-circuiting processes, the short-circuit lines 17a to 17e may be formed by the conducting wires 41 continuously from the half of the winding finish ends that are not cut away from the segments 16 such that the segments 16 that are short-circuited with each other are connected by one of the short-circuit lines 17a to 17e.

Figure 28:
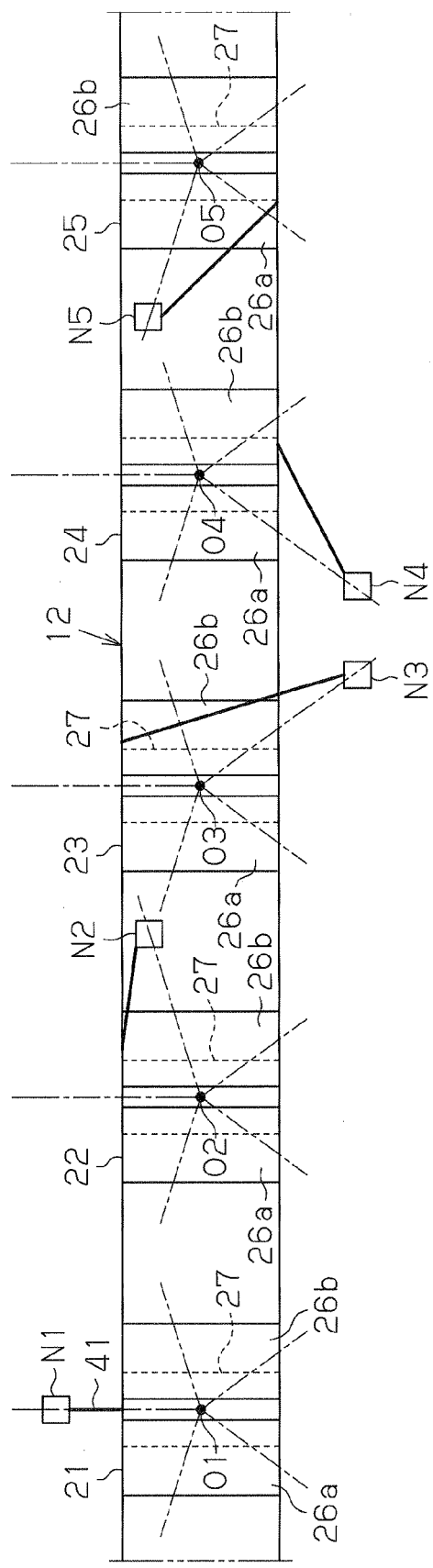
FIG. 28 is a developed view for explaining the method for winding the armature coils according to a modified embodiment.

Also, in the inner layer coil winding process, the first to fifth nozzles N1 to N5 may be rotated with respect to the teeth 21 to 25 from the positions displaced from each other by 360/(the number of teeth))° about the rotational centers 01 to 05 of the nozzles N1 to N5 to wind the conducting wires 41 around the inner winding portions 27 as shown in FIG. 28. FIG. 28 is a diagrammatic developed view of the armature core 12 as seen from the distal ends of the teeth 21 to 25. That is, the first to fifth nozzles N1 to N5 may wind the conducting wires 41 around the corresponding inner winding portions 27 from positions displaced by 72° about the rotational centers 01 to 05 when forming the inner layer coils 42a to 42e by winding the conducting wires 41 around the inner winding portions 27 of the teeth 21 to 25. More specifically, the first to fifth nozzles N1 to N5 may wind the conducting wires 41 around the corresponding inner winding portions 27 in a state where the positions of the nozzles N1 to N5 are displaced in a clockwise direction by 72° about the rotational centers 01 to 05 in order from the first nozzle N1 arranged corresponding to the tooth 21 that is located leftmost in FIG. 28, the second nozzle N2 arranged corresponding to the tooth 22, the third nozzle N3 arranged corresponding to the tooth 23, the fourth nozzle N4 arranged corresponding to the tooth 24, to the fifth nozzle N5 arranged corresponding to the tooth 25. In this case, the nozzles N1 to N5 are prevented from interfering with each other when simultaneously winding all the inner layer coils 42a to 42e. Also, in the outer layer coil winding process, the first to fifth nozzles N1 to N5 may wind the conducting wires 41 around the corresponding teeth 21 to 25 from the positions displaced by (360/(the number of teeth))° from each other about the rotational centers 01 to 05 to form the outer layer coils 43a to 43e. In this case, the nozzles N1 to N5 are prevented from interfering with each other when simultaneously winding all the outer layer coils 43a to 43e.

In the second embodiment, the radial length L1 of the inner slots 31 is set longer than the radial length L2 of the first outer slots 32a and the radial length L3 of the second outer slots 32b. However, the radial length L1 of the inner slots 31 may be the same as the radial length L2 of the first outer slots 32a and the radial length L3 of the second outer slots 32b. The same applies to the direct-current motor M9 of the fifth embodiment.

In the first embodiment, the resistance value of the inner layer coils 42a to 42e is set equal to the resistance value of the outer layer coils 43a to 43e. However, when the number of turns of the inner layer coils 42a to 42e is greater than the number of turns of the outer layer coils 43a to 43e, the resistance value of the inner layer coils 42a to 42e does not need to be equal to the resistance value of the outer layer coils 43a to 43e. In this case also, the advantage (4) of the first embodiment is obtained. The same applies to the direct-current motor M3 of the third embodiment and the direct-current motor M4 of the fourth embodiment.

In the direct-current motor M1 of the first embodiment, the wire diameter of the conducting wire 41 forming the outer layer coils 43a to 43e may be greater than the wire diameter of the conducting wire forming the inner layer coils 42a to 42e. The inner layer coils 42a to 42e are respectively wound around the inner winding portions 27 by concentrated winding at positions radially inward of outer layer coils 43a to 43e. The outer layer coils 43a to 43e are wound around the circumferentially adjacent two branched tooth portions 26a, 26b by distributed winding at positions radially outward of the inner layer coils 42a to 42e. Thus, the circumferential length of the outer layer coils 43a to 43e is longer than the circumferential length of the inner layer coils 42a to 42e. By setting the wire diameter of the conducting wire 41 forming the outer layer coils 43a to 43e to be greater than the wire diameter of the conducting wire 41 forming the inner layer coils 42a to 42e, the resistance value of the outer layer coils 43a to 43e is prevented from being greater than the resistance value of the inner layer coils 42a to 42e. The difference between the current value flowing through the inner layer coils 42a to 42e and the current value flowing through the outer layer coils 43a to 43e is thus reduced. As a result, the torque generated in the direct-current motor M1 is stabilized. The same applies to the second to fifth embodiments.

In the first embodiment, the number of turns of the inner layer coils 42a to 42e may be the same as the number of turns of the outer layer coils 43a to 43e. The same applies to the direct-current motor M3 of the third embodiment and the direct-current motor M4 of the fourth embodiment. Also, in the direct-current motor M2 of the second embodiment, the number of turns of the inner layer coils 102a to 102f may be greater than the number of turns of the outer layer coils 103a to 103f. In this case, the same advantage as the advantage (4) of the first embodiment is obtained. The same applies to the direct-current motor M9 of the fifth embodiment.

In the first embodiment, the magnetic path cross-sectional area S2 of the inner winding portions 27 may be set to a value twice the magnetic path cross-sectional area S1 of the branched tooth portions 26a, 26b. In this case also, the difference between the amount of magnetic flux passing through the inner winding portion 27 and the amount of magnetic flux passing through the branched tooth portions 26a, 26b is reduced in the armature core 12, and the magnetic imbalance between the radially inward part and the radially outward part of the teeth 21 to 25 is reduced. As a result, generation of vibration during activation of the direct-current motor M1 is further inhibited. The same applies to the second to fifth embodiments.

In the direct-current motor M9 of the fifth embodiment, the circumferential width w1 of the positive brushes 501 and the negative brushes 502 (the circumferential width of the sliding portions of the brushes that slide along the segments 16) is set to half the width of the circumferential width w2 of the segments 16. However, the circumferential width w1 may be set to a value less than half the circumferential width w2 of the segments 16, or a value greater than half the circumferential width w2 of the segment 16 as long as the positive brushes 501 and the negative brushes 502 are displaced in the opposite directions along the circumferential direction from the positions (normal positions) on the magnetic pole center lines X3 to X6 that pass through the circumferential center of the magnets 4a to 4d, and rectification is alternately performed in the positive brushes 501 and the negative brushes 502 in accordance with rotation of the armature 81. In this case, since rectification is alternately performed in the positive brushes 501 and the negative brushes 502 in accordance with rotation of the armature 81 as in the fifth embodiment, current ripple is reduced compared to the conventional motor, and the torque ripple is reduced. Thus, a direct-current motor is provided in which generation of vibration and noise is reduced during activation. Also, if the circumferential width of the sliding portions of the positive brushes 501 and the negative brushes 502 that slide along the segments 16 is less than or equal to half the circumferential width w2 of the segments 16, torque is increased in addition to reducing generation of vibration and noise. Furthermore, if the circumferential width of the sliding portions of the positive brushes 501 and the negative brushes 502 is set to half the circumferential width w2 of the segments 16, current supplied to the motor is increased in addition to reducing generation of vibration and noise and increasing torque.

Figure 29:
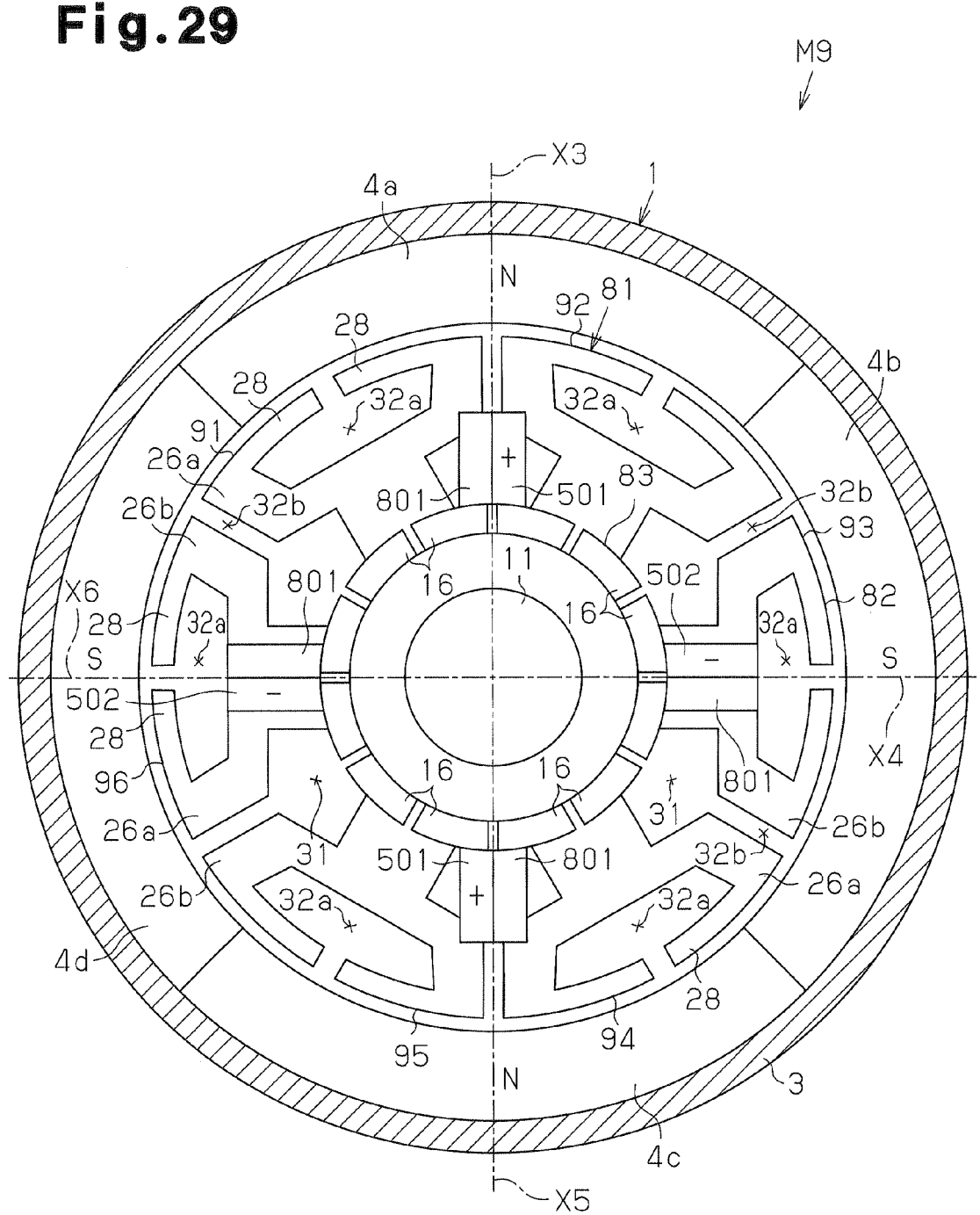
FIG. 29 is a cross-sectional view illustrating a direct-current motor according to a modified embodiment.
Figure 30:
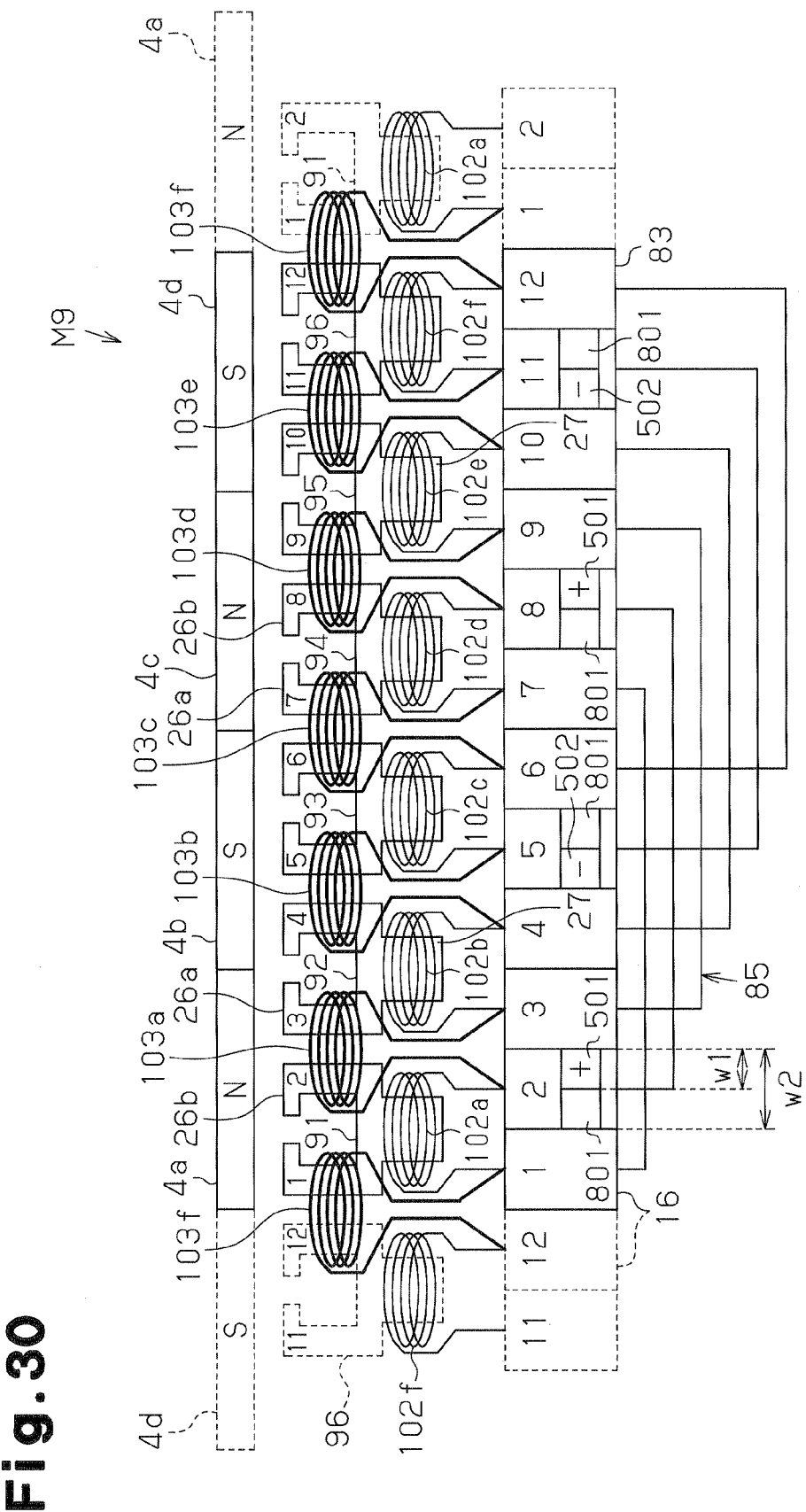
FIG. 30 is a diagrammatic developed view illustrating the direct-current motor according to a modified embodiment.

In the direct-current motor M9 of the fifth embodiment, high-resistance brushes 801, which have a greater resistance than the positive brushes 501 and the negative brushes 502, may be arranged on one of the circumferential sides of the positive brushes 501 and the negative brushes 502 as shown in FIGS. 29 and 30. More specifically, each of the high-resistance brushes 801 is arranged circumferentially adjacent to the distal end face (sliding part) of one of the positive brushes 501 and the negative brushes 502, and is displaced in the opposite direction to the direction in which the corresponding one of the brushes 501, 502 is displaced from the position (normal position) on the associated one of the magnetic pole center lines X3 to X6 of the magnets 4a to 4d. This reduces sparks generated when the positive brushes 501 and the negative brushes 502 contact and separate from the segments 16.

In the direct-current motor including the slots the total number M of which is divisible by the number P of the magnetic poles like the direct-current motor M9 of the fifth embodiment, the inner layer coil that is being rectified may be connected in series with the outer layer coil that is subsequently rectified. In this case, vibration of the armature is further reduced. Also, in the direct-current motor including the slots the total number M of which is divisible by the number P of the magnetic poles, if the positive brushes and the negative brushes are displaced in the opposite directions to each other along the circumferential direction from the positions (normal positions) on the magnetic pole center lines that pass through the circumferential center of the magnets, rectification performed by the positive brushes and the rectification performed by the negative brushes are alternately carried out. This reduces variation of the current value during activation, and further reduces vibration and magnetic noise. Furthermore, the high-resistance brushes are arranged adjacent to the distal end faces (sliding portions) of the positive brushes and the negative brushes, and each of the high-resistance brushes is displaced in the opposite direction to the direction in which the adjacent brush is displaced from the normal position. This reduces sparks generated when the brushes contact and separate from the segments.

Figure 31:
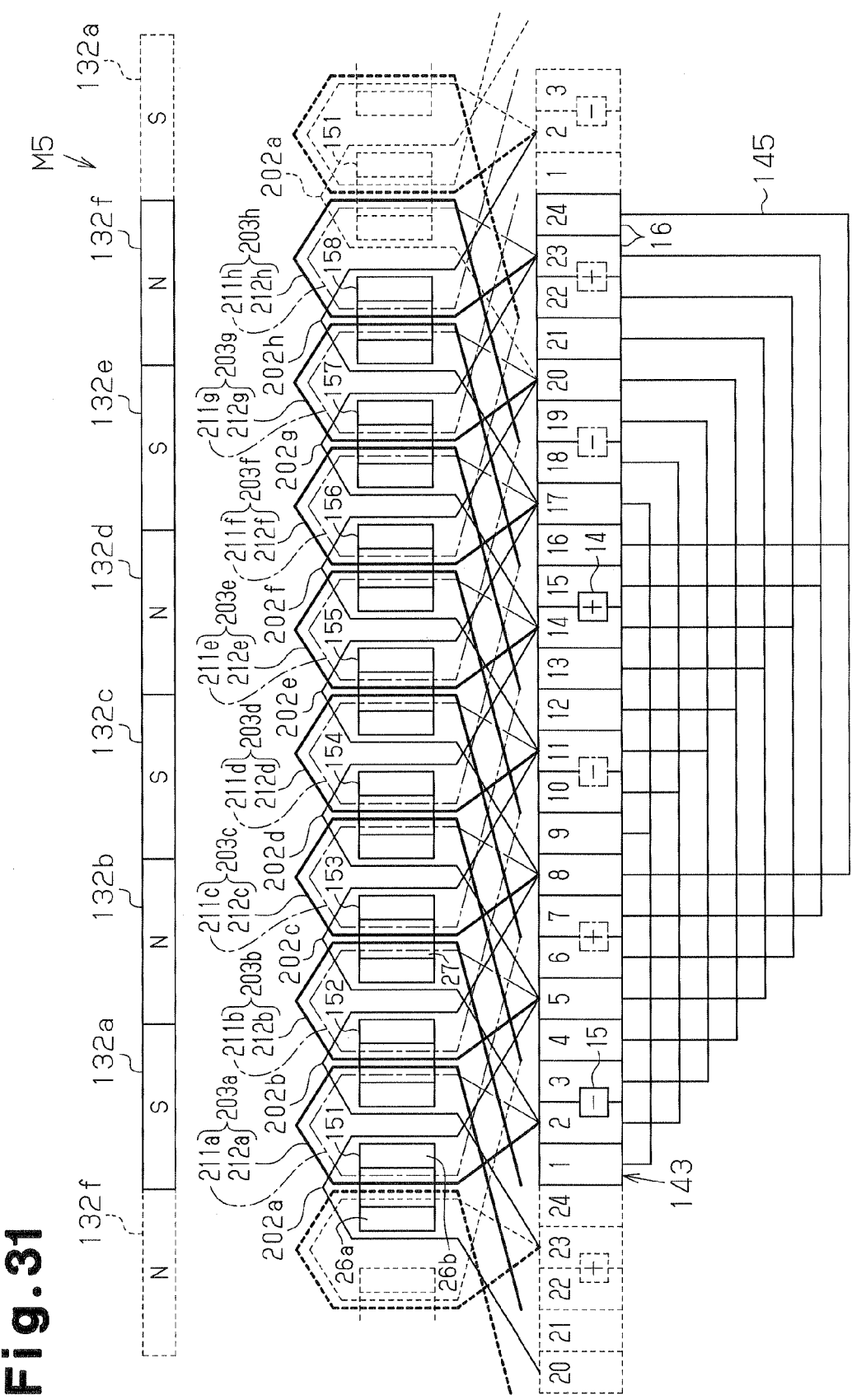
FIG. 31 is a diagrammatic developed view illustrating a direct-current motor according to a modified embodiment.
Figure 32:
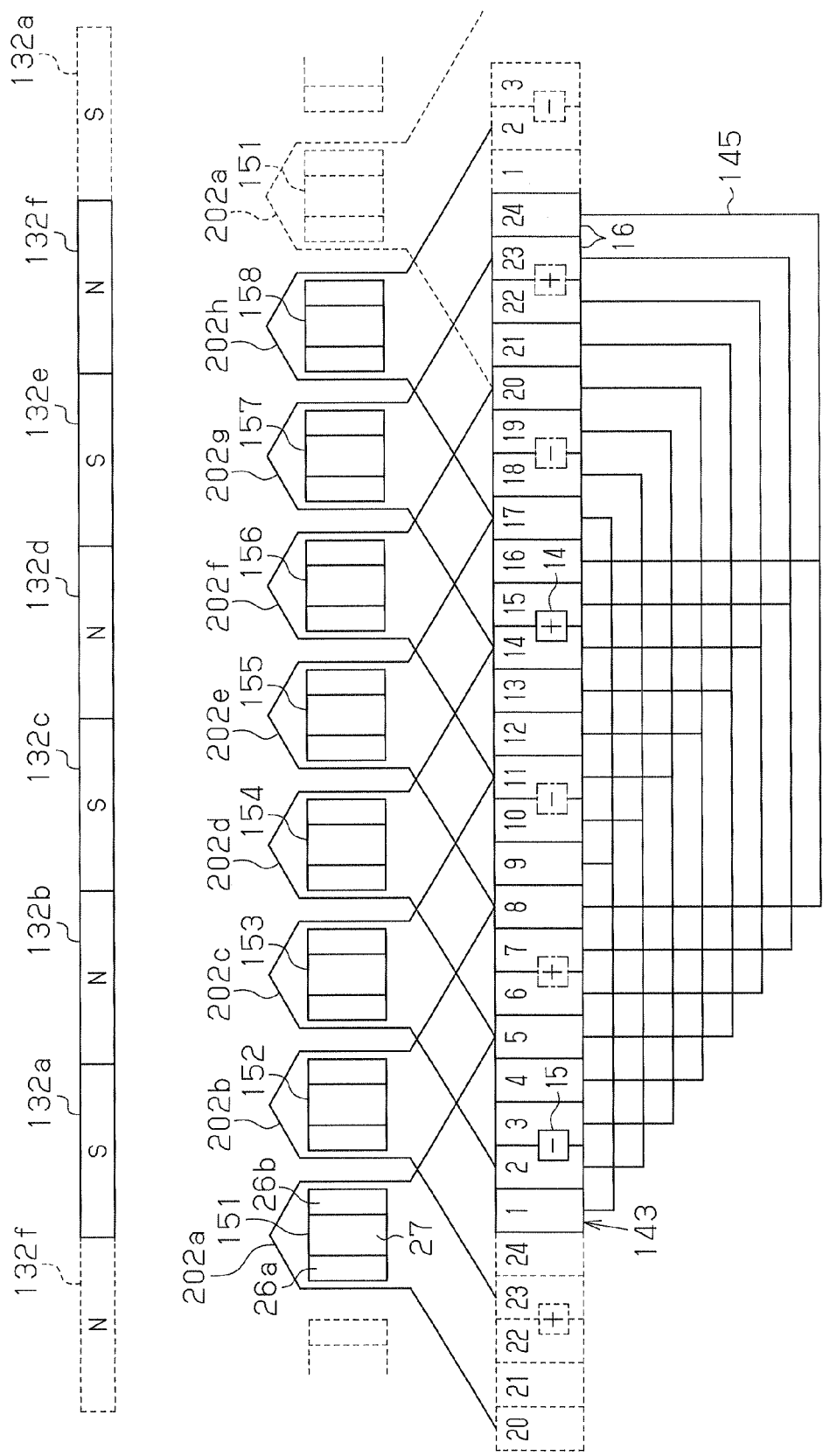
FIG. 32 is a developed view for explaining the state of inner layer coils of the direct-current motor according to a modified embodiment.
Figure 33:
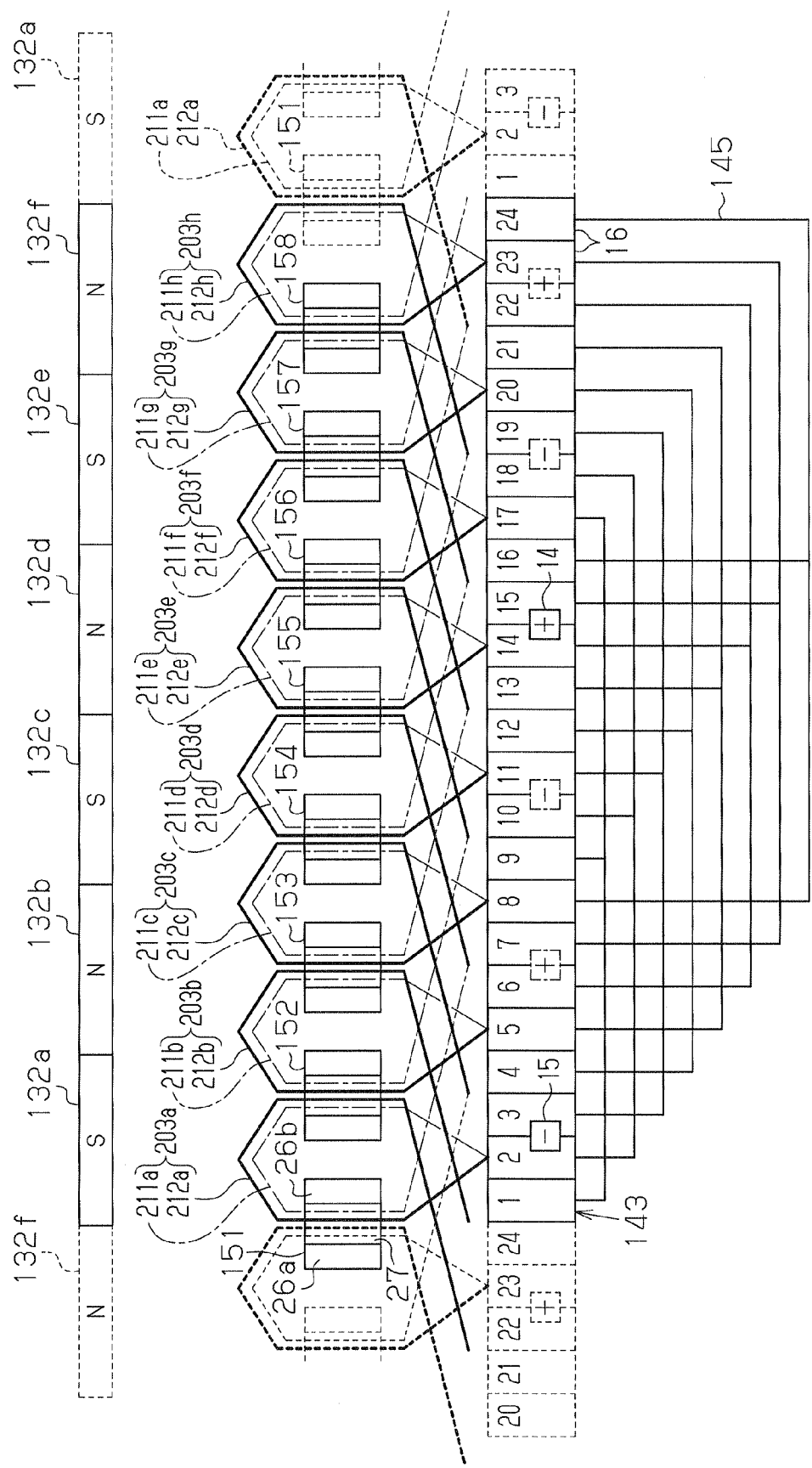
FIG. 33 is a developed view for explaining the state of outer layer coils of the direct-current motor according to a modified embodiment.

When the outer layer coils 203a to 203h are formed of two coils that are the inner coil portions 211a to 211h and the outer coil portions 212a to 212h as in the fourth embodiment, the manner in which the inner layer coils 202a to 202h and the outer layer coils 203a to 203h are connected is not restricted to the manner described in the fourth embodiment. For example, the inner layer coils 202a to 202h may be connected to the outer layer coils 203a to 203h as shown in FIG. 31. In a direct-current motor M5 shown in FIG. 31, the winding start end and the winding finish end of each of the inner layer coils 202a to 202h wound around the inner winding portions 27 of the teeth 151 to 158 are respectively connected to two segments 16 that are arranged in the circumferential direction with eight segments 16 located in between as shown in FIG. 32. Thus, the winding start ends and the winding finish ends of the inner layer coils 202a to 202h are connected to every third one of the segments 16 arranged in the circumferential direction (that is, the segments 16 of the segment numbers 2, 5, 8, 11, 14, 17, 20, 23). Also, the winding direction of the inner coil portions 211a to 211h and the outer coil portions 212a to 212h is opposite to the winding direction of the inner layer coils 202a to 202h as shown in FIG. 33. The winding start ends of the inner coil portions 211a to 211h are connected to every third one of the segments 16 (that is, the segments 16 of the segment numbers 2, 5, 8, 11, 14, 17, 20, 23), and the winding finish ends of the inner coil portions 211a to 211h are respectively connected to the winding start ends of the outer coil portions 212a to 212h located at positions separated by 135° from the inner coil portions 211a to 211h in the circumferential direction. Furthermore, the winding finish end of each of the outer coil portions 212a to 212h is connected to the segment 16 to which the winding start end of the associated one of the inner coil portions 211a to 211h that is wound around the same branched tooth portions 26a, 26b is connected. In this case also, magnetic excitation force is distributed to six locations as in the fourth embodiment.

Figure 34:
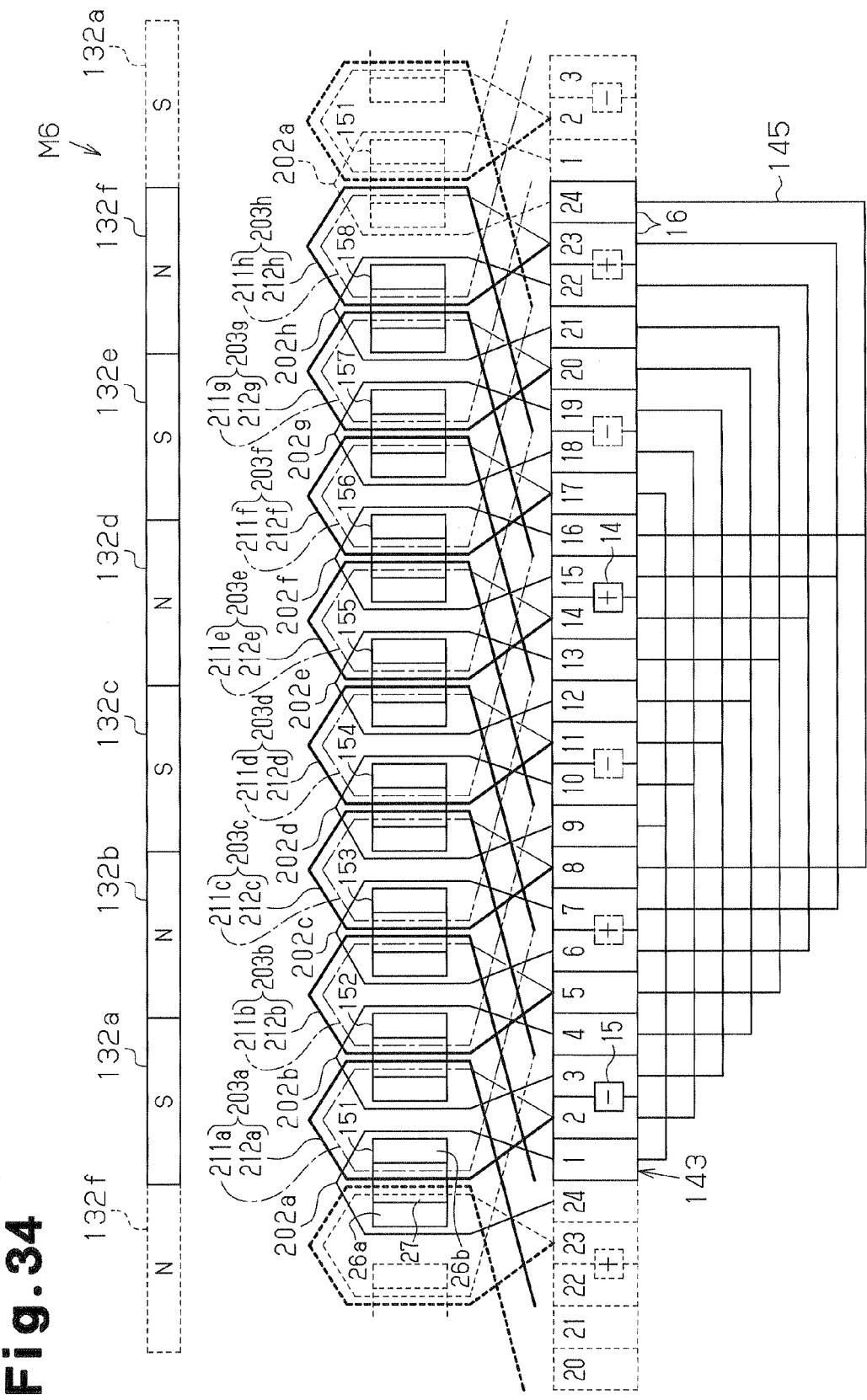
FIG. 34 is a diagrammatic developed view illustrating a direct-current motor according to a modified embodiment.
Figure 35:
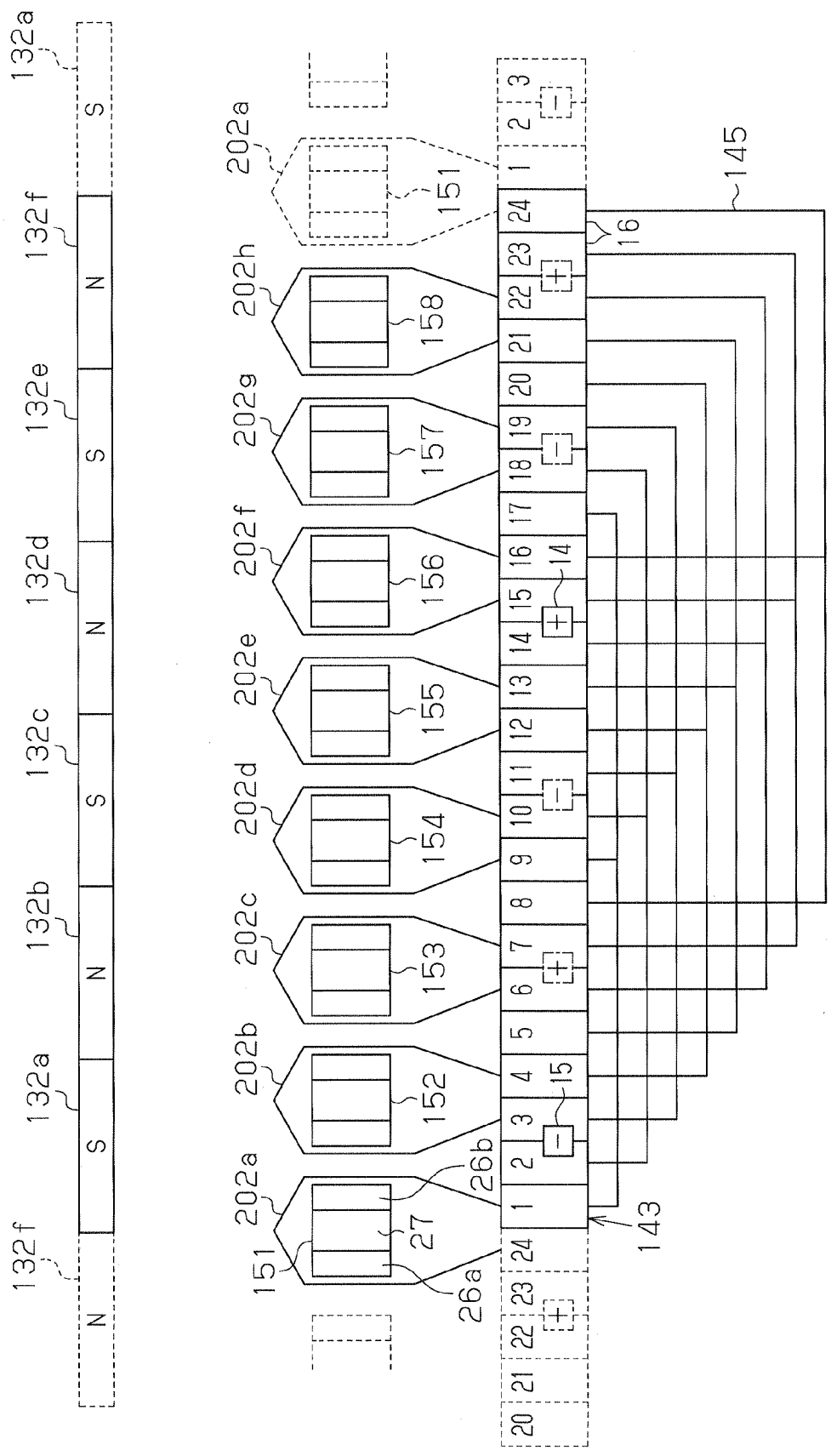
FIG. 35 is a developed view for explaining the state of inner layer coils of the direct-current motor according to a modified embodiment.

Furthermore, for example, in a direct-current motor M6 shown in FIG. 34, the inner coil portions 211a to 211h and the outer coil portions 212a to 212h are wound in the same manner as the example shown in FIG. 33. The winding start end and the winding finish end of each of the inner layer coils 202a to 202h are connected to the circumferentially adjacent two segments 16 as shown in FIG. 35. In this case also, magnetic excitation force is distributed to six locations as in the fourth embodiment.

Figure 36:
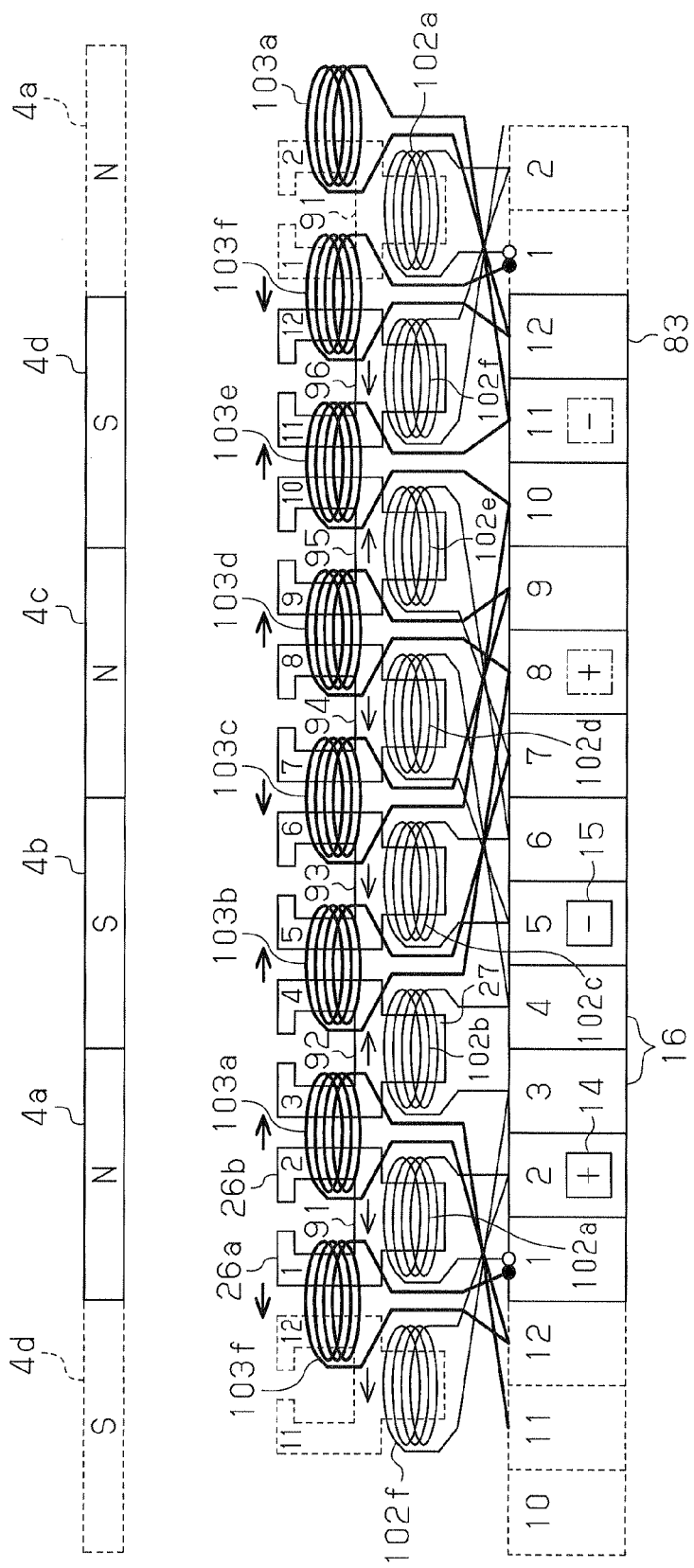
FIG. 36 is a diagrammatic developed view illustrating a direct-current motor according to a modified embodiment.

In the second embodiment, the inner layer coils 102a to 102f and the outer layer coils 103a to 103f are wound around the armature core 82 using two flyers. However, all the inner layer coils 102a to 102f and the outer layer coils 103a to 103f may be wound around the armature core 82 by one conducting wire 41 using one flyer by connecting the ends of the inner layer coils 102a to 102f and the outer layer coils 103a to 103f to the segments 16 as shown in FIG. 36. In this case, after winding all the inner layer coils 102a to 102f, all the outer layer coils 103a to 103f are wound. More specifically, the conducting wire 41 is connected to the segment 16 of the segment number 1 using the flyer. Then, the flyer winds the conducting wire 41 around the inner winding portion 27 of the tooth 91 to form the inner layer coil 102a, and connects the conducting wire 41 to the segment 16 of the segment number 2. Subsequently, the inner layer coil 102f is formed. The inner coil 102f is magnetically equivalent to the outer layer coil 103a, which is wound around the second branched tooth portion 26b of the tooth number 2 and the first branched tooth portion 26a of the tooth number 3. At this time, since the magnetic pole of the inner layer coil 102f is opposite to that of the outer layer coil 103a, the winding direction of the inner layer coil 102f is opposite to that of the outer layer coil 103a. Arrows in FIG. 36 show the winding direction of the inner layer coils 102a to 102f and the outer layer coils 103a to 103f. The conducting wire 41 sequentially forms the inner layer coils 102b, 102d, 102c, 102e, and the inner layer coils 102b, 102d, 102c, 102e. Every time the inner layer coils 102b, 102d, 102c, 102e are formed, the conducting wire 41 is connected to the segments 16 of the segment numbers 3 to 7. Then, the conducting wire 41 connected to the segment 16 of the segment number 7 sequentially forms the outer layer coils 103b, 103d, 103c, 103e, 103a, 103f, and every time the outer layer coils 103b, 103d, 103c, 103e, 103a, 103f are formed, the conducting wire 41 is sequentially connected to the segments 16 of the segment numbers 8 to 12, and 1. When the conducting wire 41 is connected to the segment with the segment number 1 after winding the outer layer coil 103f, winding of all the inner layer coils 102a to 102f and the outer layer coils 103a to 103f is completed. Thus, one end of one of the inner layer coils and one end of one of the outer layer coils are connected to each of two segments 16 (first segment group) among twelve segments, and one end of each of two inner layer coils is connected to one of half (five) segments 16 (second segment group) among the remaining ten segments 16, and one end of each of two outer layer coils is connected to one of the other half (five) segments 16 (third segment group). In this manner, when all the inner layer coils 102a to 102f and the outer layer coils 103a to 103f are continuously wound by one conducting wire 41, the time required for winding the inner layer coils 102a to 102f and the outer layer coils 103a to 103f is reduced, thereby improving the productivity.

As described above, in order to wind all the inner layer coils and the outer layer coils by one conducting wire 41 around the armature core, the number N of the teeth needs to be the odd multiples of the number P of the magnetic poles. Examples include a direct-current motor in which the number P of magnetic poles is four (P=4) and the number N of the teeth is twelve (N=12), and a direct-current motor in which the number P of the magnetic poles is six (P=6) and the number N of the teeth is eighteen (N=18).

Figure 37:
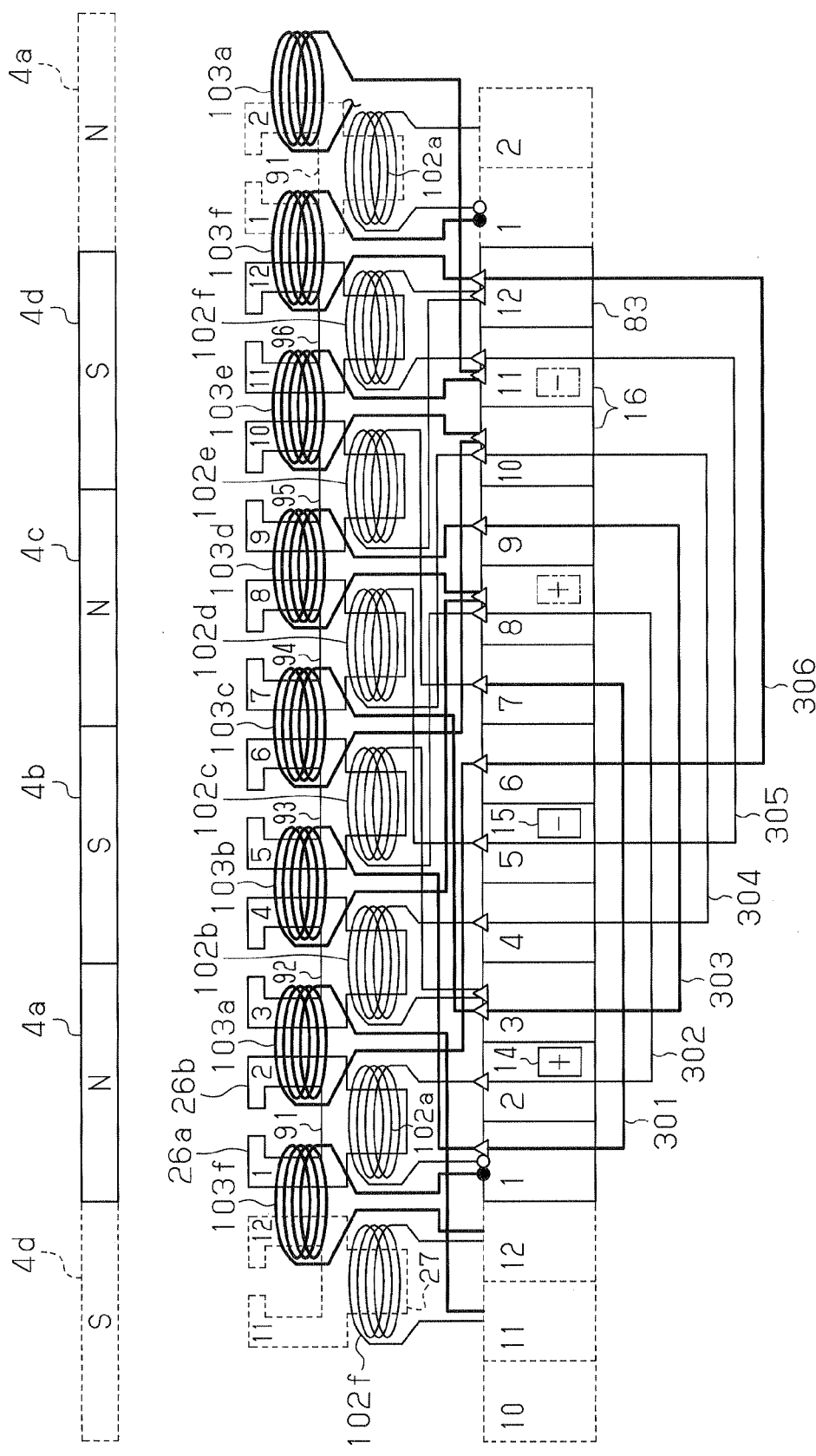
FIG. 37 is a diagrammatic developed view illustrating a direct-current motor according to a modified embodiment.

One end of one of the inner layer coils and one end of one of the outer layer coils may be connected to each of two segments 16 (first segment group) among the segments 16, one end of each of two inner layer coils may be connected to one of half the segments 16 (second segment group) among the remaining segments 16, and one end of each of two outer layer coils may be connected to one of the other half segments 16 (third segment group) via short-circuit lines that short-circuit the segments 16 the number of which is (P/2) located with intervals of (360/(P/2))°. In the example shown in FIG. 37, the short-circuit lines 301 to 306 short-circuit two segments 16 that are located at intervals of 180°. When winding the inner layer coils 102a to 102f and the outer layer coils 103a to 103f, the conducting wire 41 that is connected to the segment 16 of the segment number 1 is hooked on the riser of the segment 16 of the segment number 2 after forming the inner layer coil 102a. Then, while forming the short-circuit line 302, the conducting wire 41 is guided to and hooked on the riser of the segment 16 of the segment number 8, and then forms the inner layer coil 102c. Subsequently, while forming the short-circuit lines 301 and 303 to 306, the conducting wire 41 sequentially and continuously forms the inner layer coils 102c, 102b, 102d, 102f, 102e, and the outer layer coils 103b, 103d, 103c, 103e, 103a, 103f. Thus, one end of one of the inner layer coils and one end of one of the outer layer coils are connected to each of two segments 16 (first segment group) among the twelve segments 16, one end of each of two inner layer coils is connected to one of half (five) the segments 16 (second segment group) among the remaining ten segments 16, and one end of each of two outer layer coils is connected to one of the other half (five) segments 16 (third segment group) via the short-circuit lines 301 to 306. In this case, all the inner layer coils 102a to 102f and the outer layer coils 103a to 103f including the short-circuit lines 301 to 306 are continuously wound by one conducting wire 41. When all the inner layer coils 102a to 102f and the outer layer coils 103a to 103f including the short-circuit lines 301 to 306 are wound continuously by one conducting wire 41, the number of manufacturing processes is reduced compared to a case in which the short-circuiting members are separately formed and arranged since the short-circuit lines 301 to 306 are continuously formed while winding the inner layer coils 102a to 102f and the outer layer coils 103a to 103f. This improves the productivity of the direct-current motor.

In the second embodiment, the inner layer coils 102a to 102f and the outer layer coils 103a to 103f are wound around the armature core 82 using two flyers. However, three or more flyers may be used to wind the inner layer coils 102a to 102f and the outer layer coils 103a to 103f around the armature core 82. In this case, one end of one of the inner layer coils and one end of one of the outer layer coils are connected to each of the segments 16 (first segment group) the number of which is n (n is an even number greater than or equal to two) among segments 16 provided in the commutator, one end of each of two inner layer coils is connected to one of half the segments 16 (second segment group) among the remaining segments 16, and one end of each of two outer layer coils is connected to one of the other half segments 16 (third segment group). When flyers are simultaneously used, the time required for winding the inner layer coils 102a to 102f and the outer layer coils 103a to 103f is reduced, thus improving the productivity of the direct-current motor M2.

Figure 38:
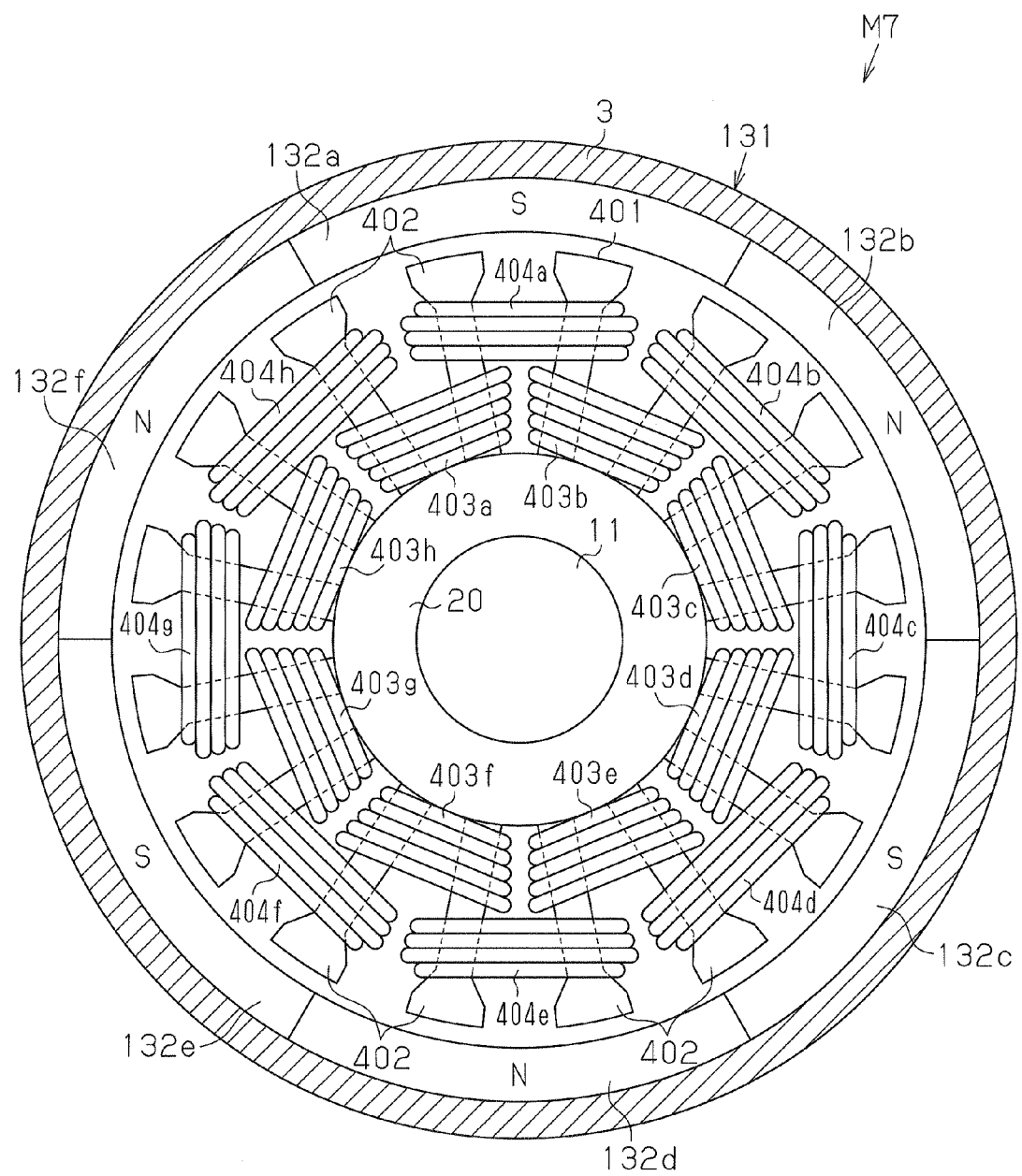
FIG. 38 is a cross-sectional view illustrating a direct-current motor according to a modified embodiment.

In each of the above embodiments, the armature cores 12, 82, 142 include the branched tooth portions 26a, 26b at the distal end portion of each tooth. However, the teeth do not need to have the branched tooth portions 26a, 26b. In this case, the number P of the magnetic poles is an even number greater than or equal to four, the number N of the teeth is N=2×(P±2) (when P=4, N=12), and the number S of the segments 16 is S=((P/2)×N). Each of the inner layer coils is wound around the proximal end portions of the circumferentially adjacent two teeth. Each of the outer layer coils is wound around the distal end portions of the adjacent two teeth at the center among the four teeth around which the adjacent two inner layer coils are wound. Also, the segments 16 the number of which is (P/2) located at intervals of 360/(P/2)° are short-circuited by the short-circuiting members, and one end of one of the inner layer coils and one end of one of the outer layer coils are connected to each of the segments 16 that are arranged in the circumferential direction at an angular interval equal to the angular intervals between the teeth among the segments 16. For example, an armature core 401 of a direct-current motor M7 shown in FIG. 38 includes sixteen teeth 402, which extend radially outward from the outer circumferential surface of the cylindrical core back 20 in a radial pattern. Inner layer coils 403a to 403h are wound around the proximal end portions of the circumferentially adjacent two teeth 402, outer layer coils 404a to 404h are wound around the distal end portions of the adjacent two teeth 402 at the center among the four teeth 402 around which the adjacent two inner layer coils are wound. The ends of the inner layer coils 403a to 403h and the outer layer coils 404a to 404h are connected to the segments 16 of the commutator 83 in the same manner as the inner layer coils 162a to 162h and the outer layer coils 163a to 163h of the third embodiment. In this case, since the number P of the magnetic poles is an even number greater than or equal to four, the number N of the teeth is N=2×(P±2) (when P=4, N=12), and the number S of the segments is S=((P/2)×N), radial force that acts on the armature core 401 during activation of the direct-current motor M7 is minimized, thereby reducing vibration in the direct-current motor M7 (see Japanese Laid-Open Patent Publication Nos. 2004-88916 and 2003-259582).

When manufacturing the direct-current motor M7, the inner layer coils 403a to 403h and the outer layer coils 404a to 404h may be wound by a method that is the same as the method shown in FIGS. 24 to 27. That is, the direct-current motor M7 may be manufactured by performing the inner layer coil winding process, in which the inner layer coils 403a to 403h are simultaneously wound using eight nozzles, which is half the number of the teeth 402 (that is, the same number as the number of the inner layer coils 403a to 403h to be formed), and the outer layer coil winding process, in which the outer layer coils 404a to 404h are simultaneously wound using eight nozzles. In this case, the time required for winding the inner layer coils 403a to 403h and the outer layer coils 404a to 404h is reduced. As a result, the time required for winding the armature coils (that is, the inner layer coils 403a to 403h and the outer layer coils 404a to 404h) around the armature core 401 is reduced, thus improving the manufacturing speed. In the manufactured direct-current motor M7, the outer layer coils 404a to 404h do not overlap the inner layer coils 403a to 403h in the axial direction since the outer layer coils 404a to 404h are wound around the teeth 402 at positions radially outward of the inner layer coils 403a to 403h. Thus, the coil end portions of the inner layer coils 403a to 403h and the outer layer coils 404a to 404h are prevented from being enlarged in the axial direction, thus preventing the manufactured direct-current motor M7 from being enlarged in the axial direction. Since it is not necessary to reduce the number of turns of the inner layer coils 403a to 403h and the outer layer coils 404a to 404h to reduce the axial length of the coil end portions, the direct-current motor M7 is prevented from being enlarged in the axial direction without reducing the power output. Furthermore, when the size is equal to the conventional direct-current motor including the armature coils wound by distributed winding, the number of turns of the inner layer coils 403a to 403h and the outer layer coils 404a to 404h is increased to increase the space factor. Thus, the power output of the direct-current motor M7 is increased. Furthermore, since the circumferential center of the inner layer coils 403a to 403h is displaced from the circumferential center of the outer layer coils 404a to 404h in the circumferential direction, the fluctuation of magnetic flux is reduced as compared to the direct-current motor including the armature coils wound by concentrated winding. Thus, vibration generated during activation of the direct-current motor M7 is reduced.

Also, in the inner layer coil winding process when manufacturing the direct-current motor M7, the conducting wire 41 may be wound around the proximal end portions of the teeth 402 to form the inner layer coils 403a to 403h by rotating eight nozzles with respect to the teeth 21 to 25 from the positions displaced from each other by (360/(the number of teeth/2))° about the rotational center of the nozzles like the example shown in FIG. 28. The same applies to the outer layer coil winding process. In this case, the nozzles are prevented from interfering with each other when simultaneously winding all the inner layer coils 403a to 403h, and the nozzles are prevented from interfering with each other when simultaneously winding all the outer layer coils 404a to 404h.

In the first to fourth embodiments, the direct-current motors M1 to M4 include one positive brush 14 and one negative brush 15. However, the direct-current motors M1 to M4 may include a number of positive brushes 14 and the negative brushes 15.

Figure 39:
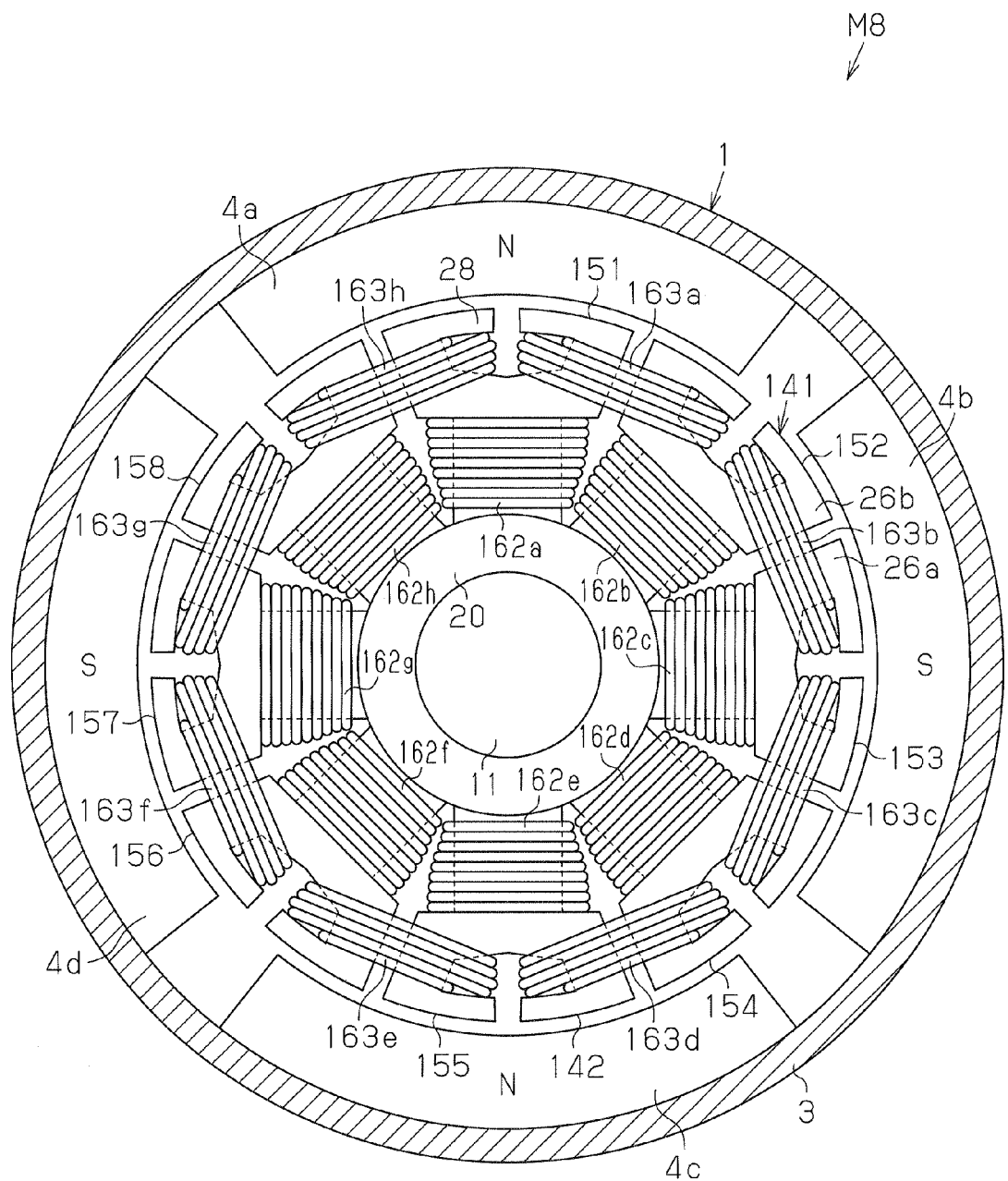
FIG. 39 is a cross-sectional view illustrating a direct-current motor according to a modified embodiment.

The number P of the magnetic poles (magnets) of the stators 1, 131 and the number N of the teeth of the armature cores 12, 82, 142 may be changed as needed. When N=P±2, vibration is further reduced (see Japanese Laid-Open Patent Publication Nos. 2004-88916 and 2003-259582). For example, a direct-current motor M8 shown in FIG. 39 includes the stator 1 of the first embodiment and the armature 141 of the third embodiment, so that the number P of the magnetic poles is P=4 and the number N of the teeth is N=8.

The invention claimed is:
1. A direct-current motor, comprising:
a plurality of magnetic poles arranged in a circumferential direction;
an armature core including a plurality of teeth arranged in the circumferential direction, the teeth extending in a radial pattern, distal ends of the teeth face the magnetic poles in a radial direction;
plurality of armature coils wound around the teeth;

a commutator, which is rotatable integrally with the armature core, the commutator including a plurality of segments arranged in the circumferential direction; and plurality of power supply brushes pressed against the segments, wherein the armature coils include a plurality of inner layer coils and a plurality of outer layer coils, each of the inner layer coils being wound around radially proximal end portions of two circumferentially adjacent teeth or a radially proximal end portion of one of the teeth, the inner layer coils being arranged in the circumferential direction without overlapping each other in the radial direction, each of the outer layer coils being wound around radially distal end portions of two circumferentially adjacent teeth by distributed winding, the outer layer coils being arranged radially outward of the inner layer coils and arranged in the circumferential direction without overlapping each other in the radial direction, and the circumferential centers of the inner layer coils and the circumferential centers of the outer layer coils are displaced in the circumferential direction, wherein each of the teeth includes an inner winding portion formed at the radially proximal end portion, and a first branched tooth portion and a second branched tooth portion, which extend from the radially distal end of the inner winding portion to separate from each other in the circumferential direction, wherein each of the inner layer coils is wound around the inner winding portion of one of the teeth by concentrated winding, and wherein each of the outer layer coils is wound around the first branched tooth portion of one of two circumferentially adjacent teeth and the second branched tooth portion of the other one of the teeth that is circumferentially adjacent to the first branched tooth portion, wherein the number of segments is equal to the sum of the number of the first branched tooth portions and the number of the second branched tooth portions.

2. The motor according to claim 1, wherein one end of one of the inner layer coils and one end of one of the outer layer coils are connected to each of the segments.

3. The motor according to claim 1, wherein, when segments the number of which is n (n is an even number greater than or equal to two) among the segments are referred to a first segment group, half the segments among the segments other than the first segment group are referred to as a second segment group, and the segments other than the first and second segment groups are referred to as a third segment group, one end of one of the inner layer coils and one end of one of the outer layer coils are connected to each of the segments of the first segment group, one end of each of two inner layer coils is connected to each of the segments of the second segment group, and one end of each of two outer layer coils is connected to each of the segments of the third segment group.

4. The motor according to claim 3, further comprising a short-circuit line, which short-circuits segments the number of which is (P/2) located at an interval of (360/(P/2))°, wherein P is the number of the magnetic poles and is an even number, and wherein the number of the segments forming the first segment group is two.

5. The motor according claim 1, further comprising it short-circuit line, which short-circuits segments the number of which is two located an interval of 180°, wherein the number of the magnetic poles is four, wherein the number N of the teeth is six, wherein the number S of the segments is twelve, and wherein one end of one of the inner layer coils and one and of one of the outer layer coils are connected to each of segments the number of which is equal to the number of the teeth and that are arranged at equal angular intervals in the circumferential direction.

6. The motor according to claim 1, wherein the magnetic path cross-sectional area at each of the inner winding portions is greater than twice the magnetic path cross-sectional area at each of the branched tooth portions.

7. The motor according to claim 1, wherein the number of turns of the inner layer cols is greater than the number of turns of the outer layer coils.

8. The motor according to claim 1, wherein the wire diameter of a conducting wire forming the outer layer coils is greater than the wire diameter of a conducting wire forming the inner layer coils.

9. The motor according to claim 1, wherein the number of turns of the inner layer coils is greater than the number of turns of the outer layer coils, and wherein the wire diameter of a conducting wire forming the outer layer coils is greater than the wire diameter of a conducting wire forming the inner layer coils.

10. The motor according to claim 1, wherein a resistance value of the inner layer coils is equal to a resistance value of the outer layer coils.

11. The motor according to claim 1, wherein the armature core includes inner slots each located between circumferentially adjacent inner winding portions, and outer slots each located between first and second branched tooth portions around Which each of the outer layer coils is wound, and the radial length of the inner slots is greater than the radial length of the outer slots.

12. The direct-current motor according to claim 1, wherein the number of the segments is an integral multiple of the number of the magnetic poles, wherein the armature core includes inner slots each located between circumferentially adjacent inner winding portions, and outer slots each located between first and second branched tooth portions around which each of the outer layer coils is wound, wherein the armature core includes inner slots each located between circumferentially adjacent inner winding portions, and outer slots each located between first and second branched tooth portions around which each of the outer layer coils is wound, wherein the number of the inner slots is equal to the number of the outer slots, wherein the sum of the number of the inner slots and the number of the outer slots is equal to the number of the segments, wherein the power supply brushes include a positive brush and a negative brush, the positive brush and the negative brush being displaced in opposite directions to each other along the circumferential direction from the positions on magnetic pole center lines extending through the circumferential center of the magnetic poles, and wherein rectification is performed alternately in the positive brush and the negative brush as the armature core rotates.

13. The direct-current motor according to claim 12, wherein the positive brush and the negative brush respectively include sliding portions, which slide along the segments, and wherein the direct-current motor, further includes a high-resistance brush having a resistance greater than those of the positive brush and the negative, brush, the high-resistance brush being arranged circumferentially adjacent to the sliding portion of the corresponding one of the positive brush and the negative brush, and the high-resistance brush is displaced in the opposite direction to the direction in which the corresponding one of the positive brush and the negative brush is displaced from the position on the magnetic pole center line.

14. A method for manufacturing the direct-current motor according to claim 1, the method comprising:
- preparing a plurality of winding jigs, which supply conducting wires for foaming coils, wherein the number of the winding jigs is equal to the number of the teeth;
- forming the inner layer coils by simultaneously winding the conducting wires around the corresponding inner winding portions by concentrated winding using the winding jigs; and
- forming the outer layer coils by simultaneously winding the conducting wires using the winding jigs, each conducting wire being wound around the first branched tooth portion of one of two circumferentially adjacent teeth and the second branched tooth portion of the other one of the teeth that is circumferentially adjacent to the one of the teeth by distributed winding.

15. The method according t claim 14,
wherein said forming the inner layer coils includes rotating the winding jigs in a state where the winding jigs are displaced from each other by (360/the number of the teeth)° about the rotational center of the winding jigs with respect to the corresponding inner winding portions, thereby winding the conducting wires around the corresponding inner winding portions; and
wherein said forming the outer layer coils includes rotating the winding jigs in a state where the winding jigs are displaced from each other by (360/the number of the teeth)° about the rotational center of the winding jigs with respect to the corresponding first and second branched tooth portions, thereby winding the conducting wires around the corresponding first and second branched tooth portions.

16. The method according, to claim 14, further comprising forming a short-circuit line by extending the conducting, wire between the segments to be short-circuited using at least one of the winding jigs after at least one of said forming the inner layer coils and said forming the outer layer coils.

17. The method according to claim 16,
wherein, in said forming the inner layer coils, the winding jigs connect the winding finish ends of the inner layer coils to the segments different from one another after forming the corresponding inner layer coils,
wherein, in said forming the outer layer coils, the winding jigs connect the winding finish ends of the outer layer coils to the segments different from one another after forming the corresponding outer layer coils, and
wherein, in said forming the short-circuit line, among the winding finish ends of the inner layer coils and the outer layer coils connected to the segments, half the winding finish ends are cut away, and wherein the short-circuit line is continuously formed by the conducting wire extending from each of the other half of the winding finish ends that are not cut away such that the segments that are to be short-circuited are electrically connected by the short-circuit line.

* * * * *